United States Patent
Nishikawa et al.

(10) Patent No.: US 6,785,055 B2
(45) Date of Patent: Aug. 31, 2004

(54) ZOOM LENS SYSTEM

(75) Inventors: Jun Nishikawa, Kawanishi (JP); Tomoko Nakagawa, Sakai (JP)

(73) Assignee: Minolta Co. Ltd., Osaka (JP)

( * ) Notice: Subject to any disclaimer, the term of this patent is extended or adjusted under 35 U.S.C. 154(b) by 0 days.

(21) Appl. No.: 10/147,016

(22) Filed: May 16, 2002

(65) Prior Publication Data
US 2003/0103268 A1 Jun. 5, 2003

(30) Foreign Application Priority Data

May 23, 2001 (JP) .............................. 2001-153718

(51) Int. Cl.$^7$ ............................................ G02B 15/14
(52) U.S. Cl. ....................... 359/681; 359/680; 359/683
(58) Field of Search ............................. 359/683, 680, 359/681, 682

(56) References Cited

U.S. PATENT DOCUMENTS

| | | | | |
|---|---|---|---|---|
| 6,137,638 A | 10/2000 | Yamagishi et al. | ......... | 359/682 |
| 6,633,436 B2 * | 10/2003 | Wada et al. | ............. | 359/681 |
| 2001/0050818 A1 * | 12/2001 | Wada et al. | ............... | 359/649 |
| 2002/0176058 A1 * | 11/2002 | Yasui et al. | ............... | 353/100 |

FOREIGN PATENT DOCUMENTS

| | | |
|---|---|---|
| JP | 11-101940 | 4/1999 |
| JP | 11-190821 | 7/1999 |
| JP | 2000-137165 | 5/2000 |
| JP | 2000-292701 | 10/2000 |
| JP | 2001-108900 | 4/2001 |
| JP | 2001-235679 | * 8/2001 |

* cited by examiner

Primary Examiner—Scott J. Sugarman
Assistant Examiner—Deborah Raizen
(74) Attorney, Agent, or Firm—Sidley Austin Brown & Wood LLP

(57) ABSTRACT

A zoom lens system has, in order from an enlargement side, a first lens unit having negative optical power, a second lens unit having positive optical power, a third lens unit having positive optical power, a fourth lens unit having negative optical power, including an aperture stop, a fifth lens unit having positive or negative optical power, and a sixth lens unit having positive optical power. Zooming is achieved by varying the first to fifth variable distances between the lens units. The third and fifth lens units move from the enlargement side to the reduction side during zooming from the telephoto end to the wide-angle end. The zoom lens system is substantially telecentric toward the reduction side.

19 Claims, 48 Drawing Sheets

SPHERICAL SINE CONDITION ABERRATION

ASTIGMATISM

% DISTORTION

LATERAL CHROMATIC ABERRATION

SPHERICAL SINE CONDITION
ABERRATION

ASTIGMATISM

% DISTORTION

LATERAL CHROMATIC ABERRATION

SPHERICAL SINE CONDITION ABERRATION

ASTIGMATISM

% DISTORTION

LATERAL CHROMATIC ABERRATION

SPHERICAL SINE CONDITION ABERRATION

ASTIGMATISM

% DISTORTION

LATERAL CHROMATIC ABERRATION

SPHERICAL SINE CONDITION
ABERRATION

ASTIGMATISM

% DISTORTION

LATERAL CHROMATIC ABERRATION

SPHERICAL SINE CONDITION
ABERRATION

ASTIGMATISM

% DISTORTION

LATERAL CHROMATIC ABERRATION

SPHERICAL SINE CONDITION ABERRATION

ASTIGMATISM

% DISTORTION

LATERAL CHROMATIC ABERRATION

SPHERICAL SINE CONDITION ABERRATION

ASTIGMATISM

% DISTORTION

LATERAL CHROMATIC ABERRATION

SPHERICAL SINE CONDITION
ABERRATION

ASTIGMATISM

% DISTORTION

LATERAL CHROMATIC ABERRATION

SPHERICAL SINE CONDITION
ABERRATION

ASTIGMATISM

% DISTORTION

LATERAL CHROMATIC ABERRATION

SPHERICAL SINE CONDITION ABERRATION

ASTIGMATISM

DISTORTION

LATERAL CHROMATIC ABERRATION

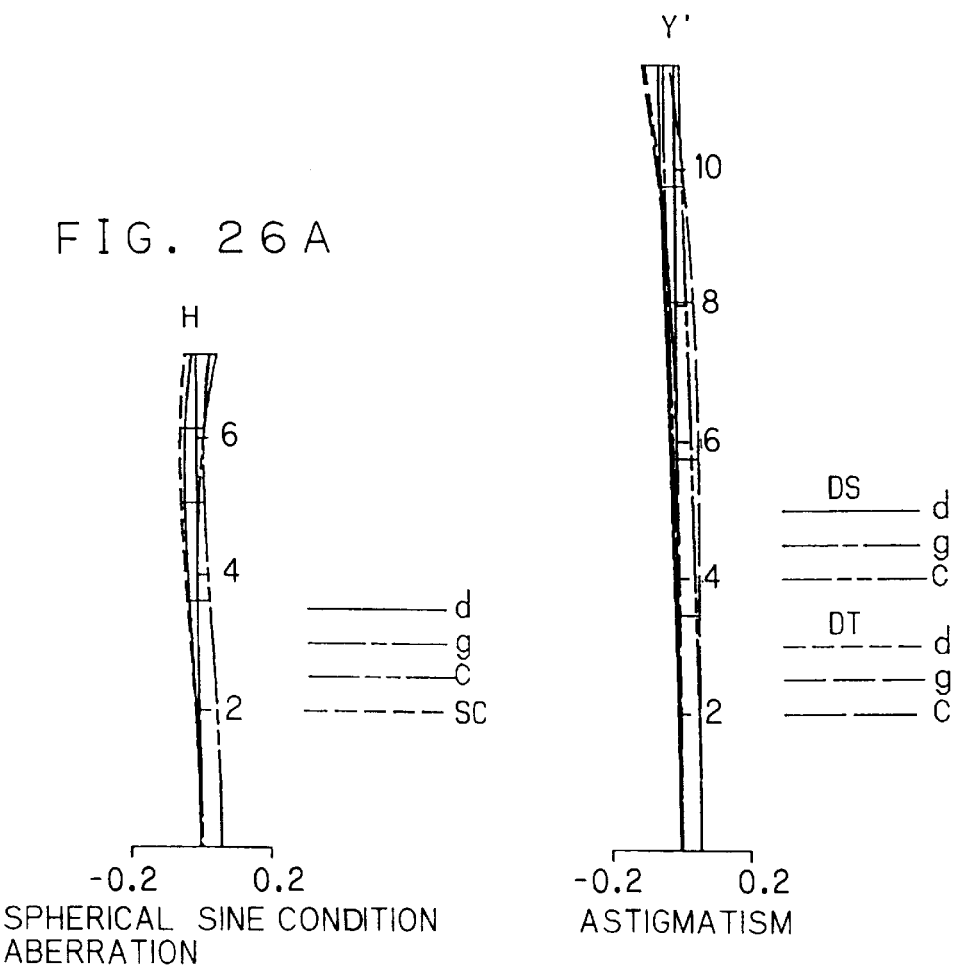
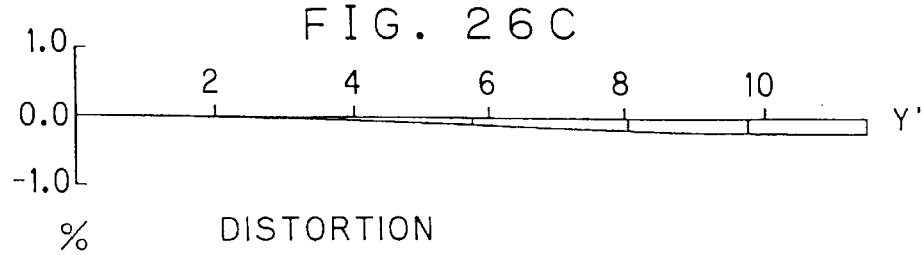
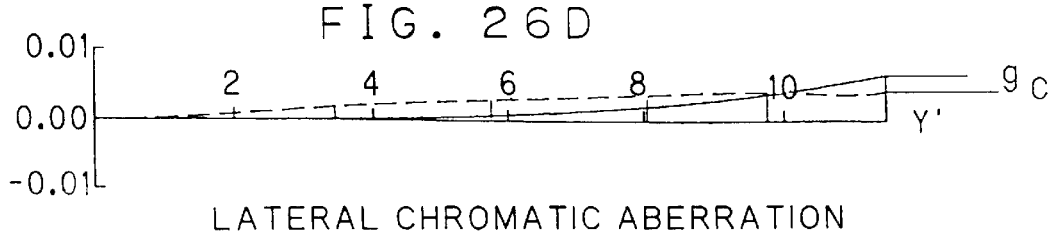

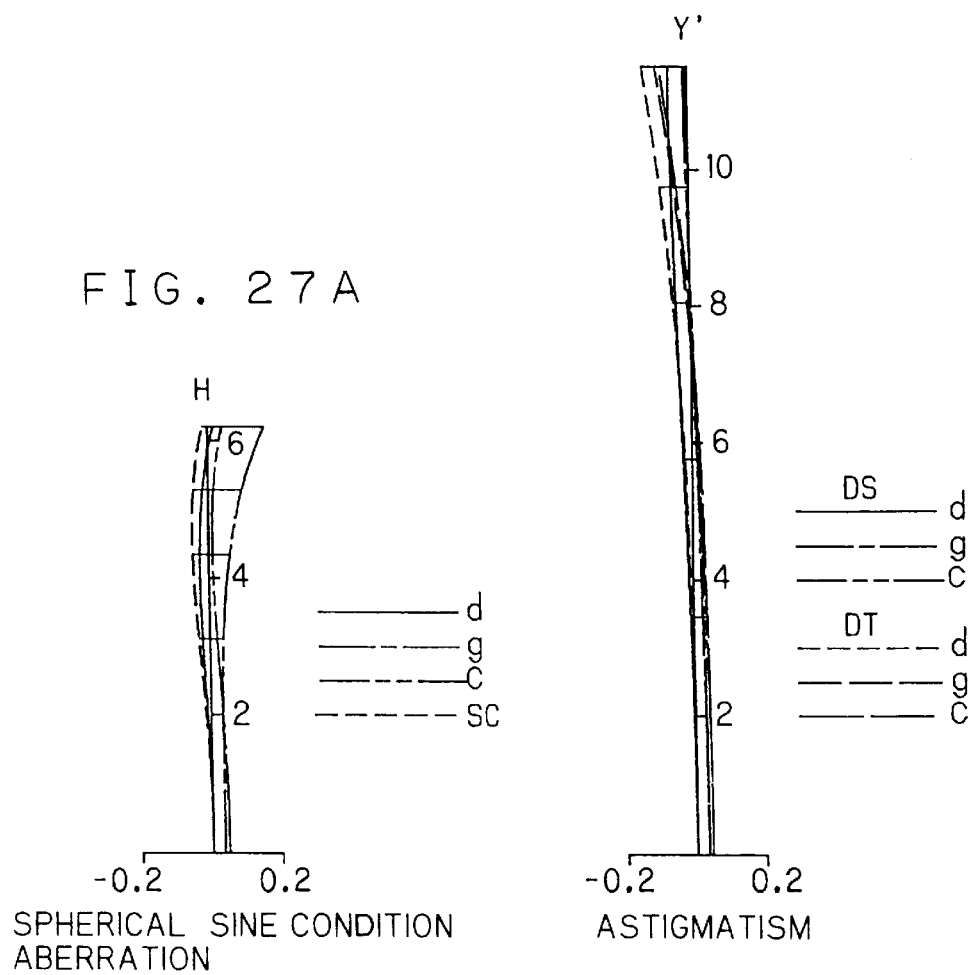
FIG. 27A  SPHERICAL SINE CONDITION ABERRATION
FIG. 27B  ASTIGMATISM
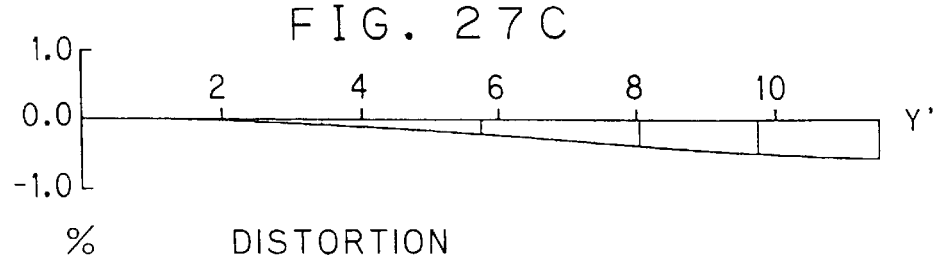
FIG. 27C  % DISTORTION
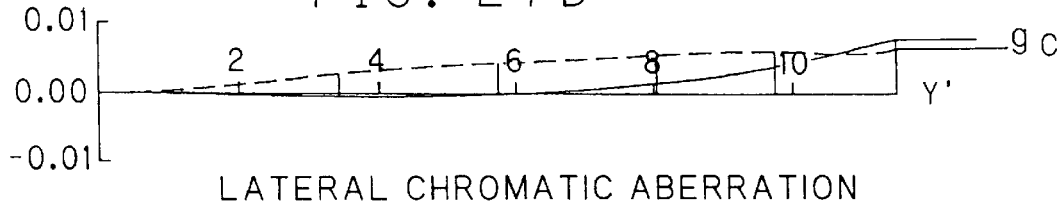
FIG. 27D  LATERAL CHROMATIC ABERRATION

SPHERICAL SINE CONDITION ABERRATION

ASTIGMATISM

% DISTORTION

LATERAL CHROMATIC ABERRATION

SPHERICAL SINE CONDITION
ABERRATION

ASTIGMATISM

% DISTORTION

LATERAL CHROMATIC ABERRATION

SPHERICAL SINE CONDITION ABERRATION

ASTIGMATISM

% DISTORTION

LATERAL CHROMATIC ABERRATION

SPHERICAL SINE CONDITION ABERRATION

ASTIGMATISM

% DISTORTION

LATERAL CHROMATIC ABERRATION

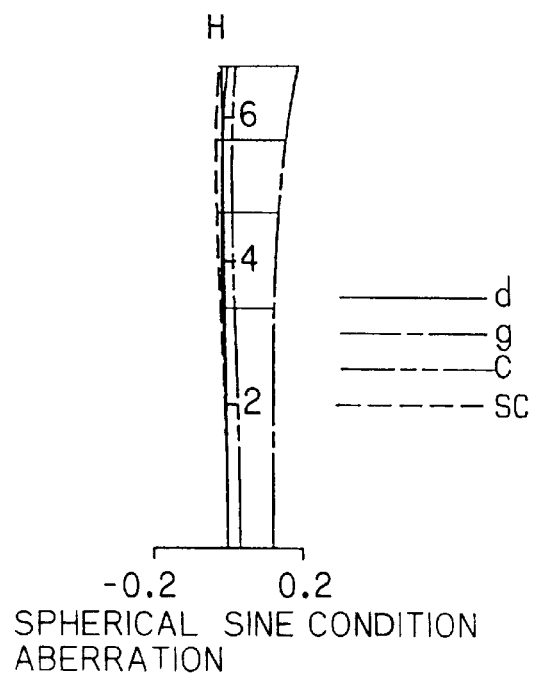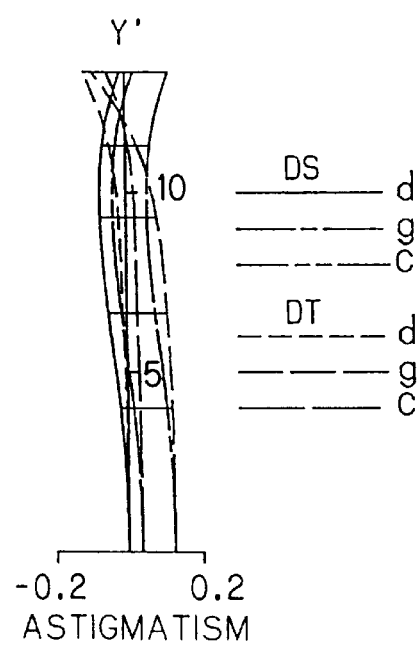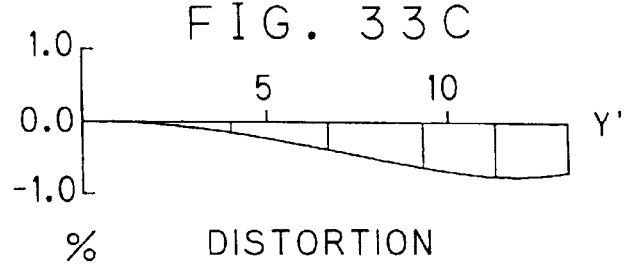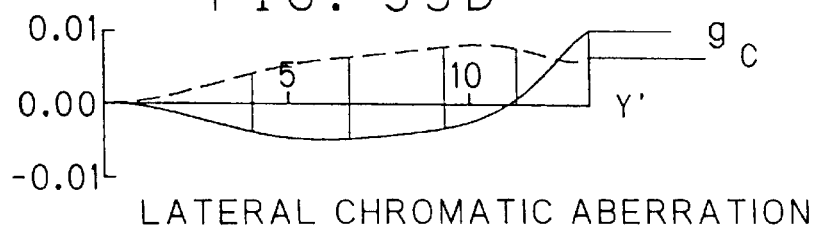

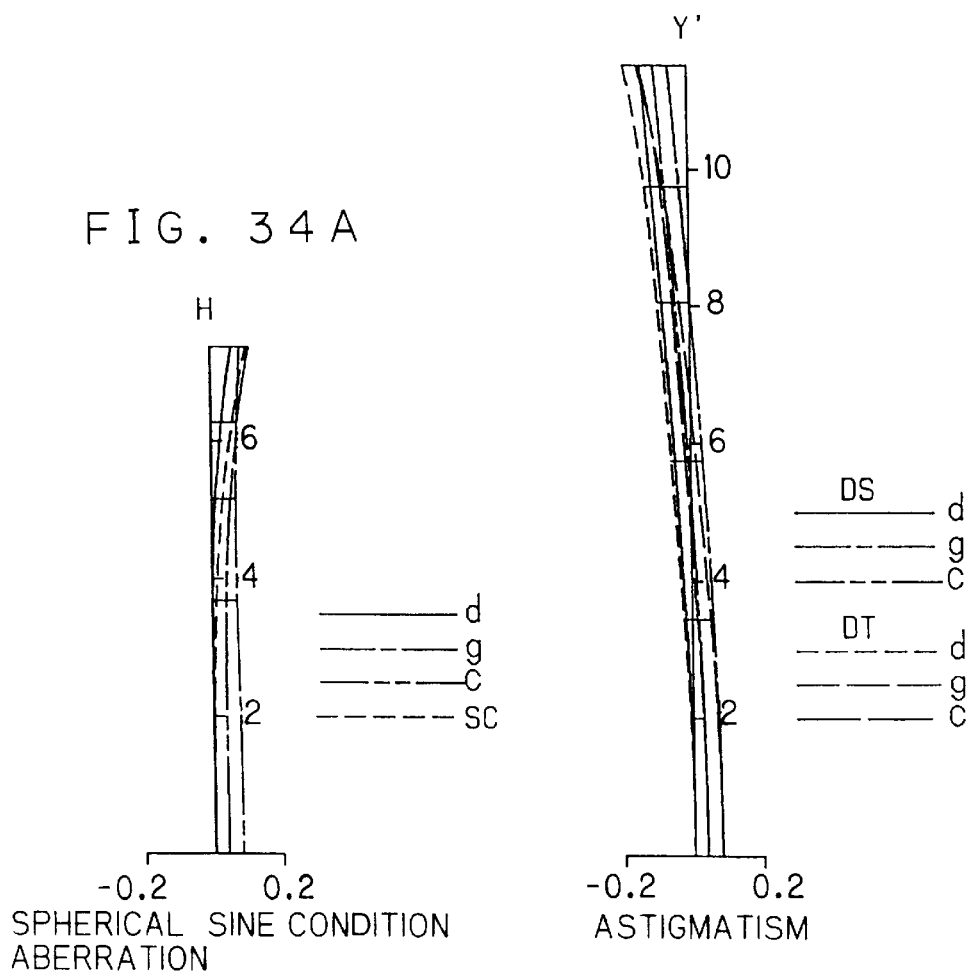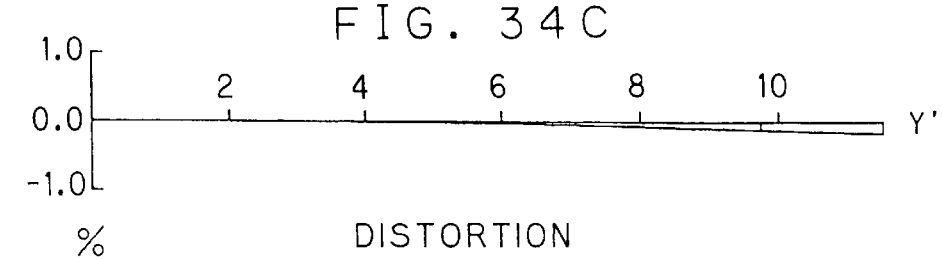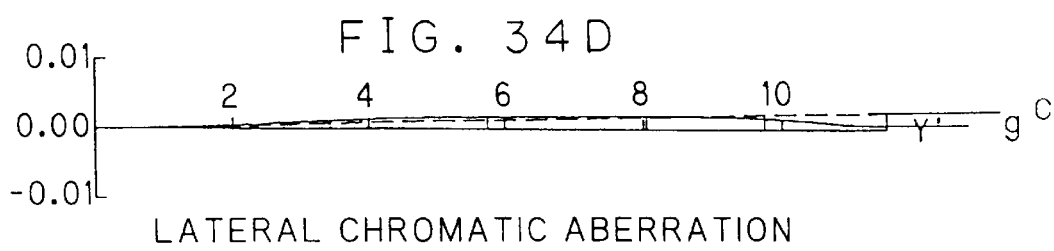

SPHERICAL SINE CONDITION
ABERRATION

ASTIGMATISM

DISTORTION

LATERAL CHROMATIC ABERRATION

SPHERICAL SINE CONDITION ABERRATION

ASTIGMATISM

DISTORTION

LATERAL CHROMATIC ABERRATION

SPHERICAL ABERRATION SINE CONDITION

ASTIGMATISM

DISTORTION

LATERAL CHROMATIC ABERRATION

SPHERICAL SINE CONDITION ABERRATION

ASTIGMATISM

% DISTORTION

LATERAL CHROMATIC ABERRATION

FIG. 39A
FIG. 39B
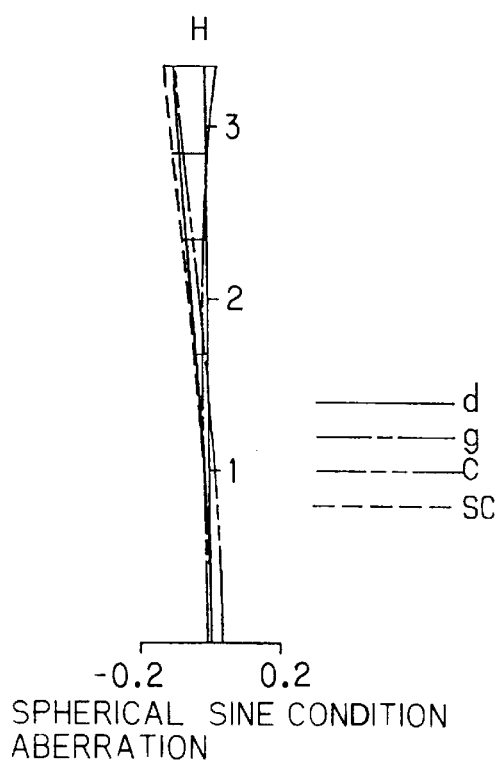
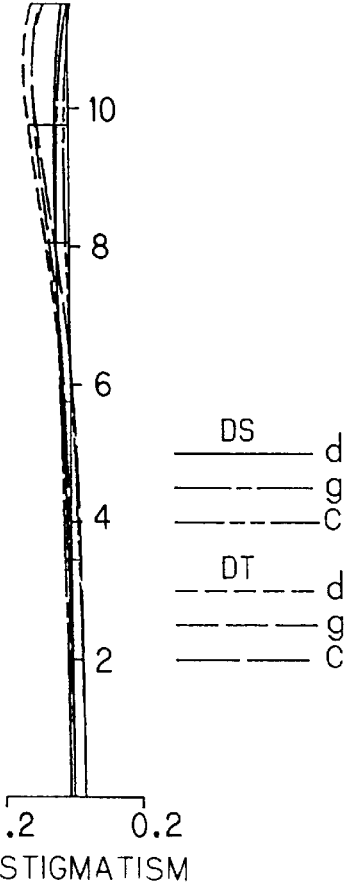
FIG. 39C
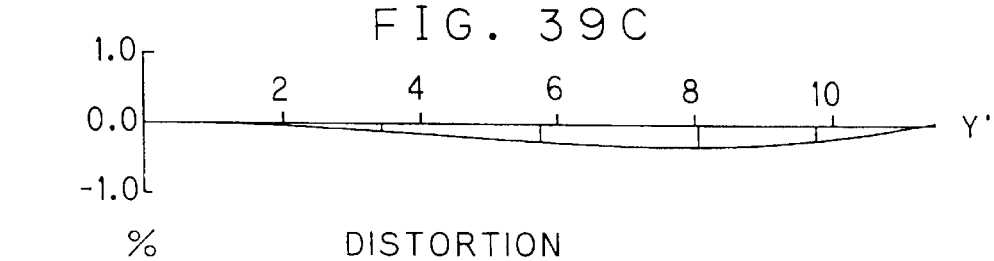
FIG. 39D
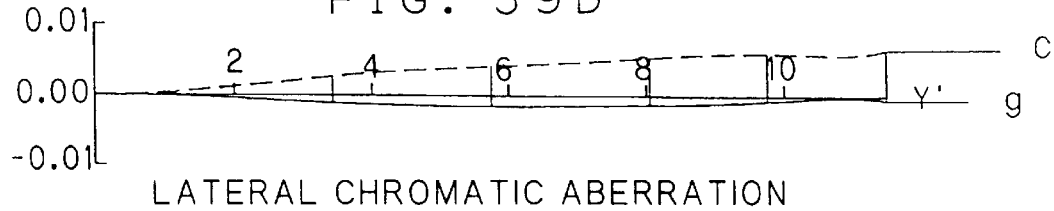

SPHERICAL SINE CONDITION ABERRATION

ASTIGMATISM

% DISTORTION

LATERAL CHROMATIC ABERRATION

SPHERICAL SINE CONDITION
ABERRATION

ASTIGMATISM

% DISTORTION

LATERAL CHROMATIC ABERRATION

SPHERICAL SINE CONDITION
ABERRATION

ASTIGMATISM

% DISTORTION

LATERAL CHROMATIC ABERRATION

SPHERICAL SINE CONDITION ABERRATION

ASTIGMATISM

% DISTORTION

LATERAL CHROMATIC ABERRATION

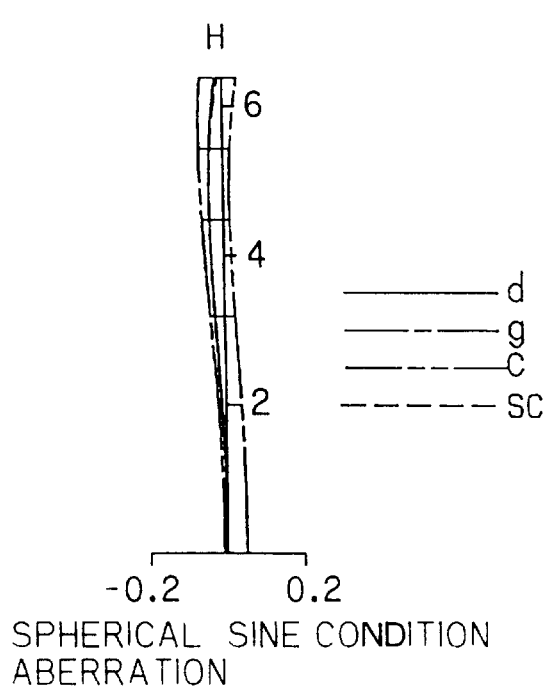
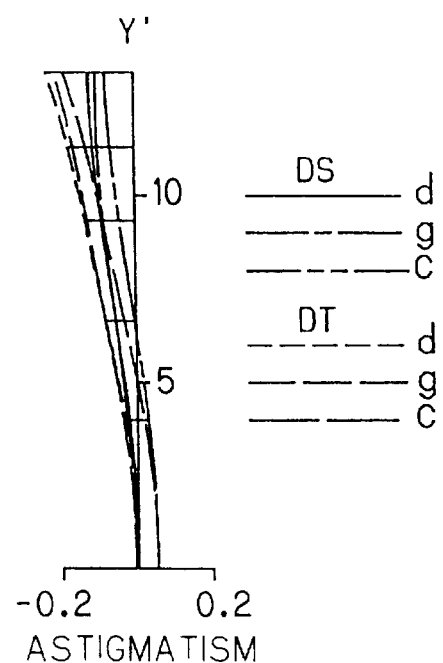
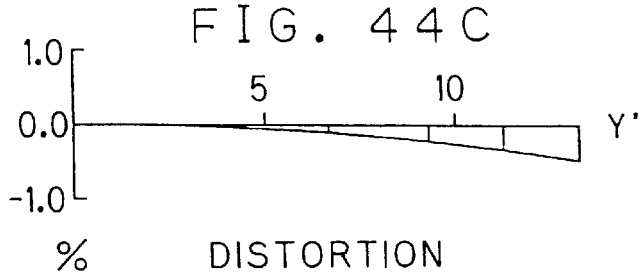
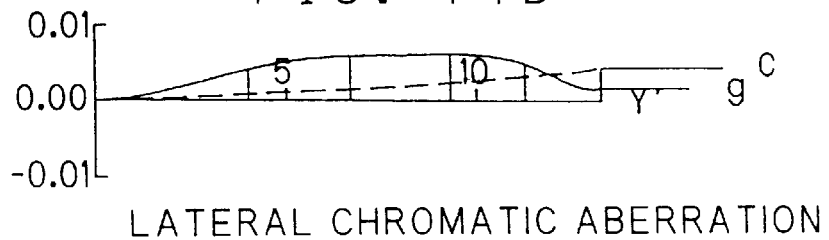

SPHERICAL SINE CONDITION
ABERRATION

ASTIGMATISM

% DISTORTION

LATERAL CHROMATIC ABERRATION

SPHERICAL SINE CONDITION
ABERRATION

ASTIGMATISM

DISTORTION

LATERAL CHROMATIC ABERRATION

SPHERICAL SINE CONDITION ABERRATION

ASTIGMATISM

% DISTORTION

LATERAL CHROMATIC ABERRATION

ZOOM LENS SYSTEM

This application is based on Japanese Patent Application No. 2001-153718 filed on May 23, 2001, the contents of which are hereby incorporated by reference.

BACKGROUND OF THE INVENTION

1. Field of the Invention

The present invention relates to a zoom lens system, and particularly to a zoom lens system suitable as a projection optical system for use in a projector in which an image formed by, for example, a digital micromirror device (hereinafter referred to as a "DMD") serving as a display device is projected onto a screen.

2. Description of the Prior Art

These days, compact, high-performance projectors employing a DMD as a display device are rapidly becoming widespread for the purposes of presentation at meetings, viewing of BS (broadcast satellite) digital broadcasts and commercially available movie software in households (the so-called home theater), and the like. As display devices become increasingly compact and high-resolution through the adaptation of DMDs, zoom lens systems for projection are required to be accordingly compact and high-performance. However, it is generally believed that a zoom lens system for projecting an image formed by a DMD needs to have a long back focal length to permit the insertion of a TIR (total internal reflection) prism for separating light beams. In addition, such a zoom lens system needs to be compact but satisfactorily corrected for various aberrations (such as lateral chromatic aberration), and is often required to be wide-angle to offer a large screen in a narrow room.

For use in projectors, various types of five-unit zoom lens system have been proposed. For example, Japanese Patent Application Laid-Open No. H11-101940 proposes a zoom lens system composed of a negative, a positive, a positive, a negative, and a positive lens unit. Here, the second to fourth lens units move during zooming, with the fourth lens unit moving toward the screen during zooming from the telephoto end to the wide-angle end. U.S. Pat. No. 6,137,638 proposes a zoom lens system composed of a negative, a positive, a positive, a negative, and a positive lens unit. Here, the second and third lens units move toward the display device and the fourth lens unit moves toward the screen during zooming from the telephoto end to the wide-angle end. Japanese Patent Application Laid-Open No. H11-190821 proposes a zoom lens system composed of a negative, a positive, a negative, a positive, and a positive lens unit. Here, mainly the second to fourth lens units move during zooming. Japanese Patent Application Laid-Open No. 2000-137165 proposes a zoom lens system composed of a negative, a positive, a positive, a negative, and a positive lens unit. Here, the second to fourth lens units move during zooming, with the fourth lens unit moving together with an aperture stop toward the reduction side during zooming from the telephoto end to the wide-angle end. Japanese Patent Application Laid-Open 2000-292701 proposes a zoom lens system composed of a negative, a positive, a positive, a negative, and a positive lens unit. Here, the second to fourth lens units move during zooming, with the fourth lens unit, which is composed of a single negative meniscus lens element, moving toward the reduction side during zooming. Moreover, Japanese Patent Application Laid-Open 2001-108900 proposes a six-unit zoom lens system composed of a negative, a positive, a positive, a negative, a positive, and a positive lens unit. Here, an aperture stop is provided in the third lens unit, and the second, third, and fifth lens units move during zooming.

All of these conventional examples are zoom lens systems designed chiefly to project an image formed by a liquid crystal display device, and therefore they are compact, indeed, but are insufficiently corrected for distortion, lateral chromatic aberration, and other aberrations, and in addition have a short back focal length. For example, the zoom lens system proposed in Japanese Patent Application Laid-Open No. H11-101940 is unsatisfactory in the correction of distortion, high-order lateral chromatic aberration, astigmatic difference, and other aberrations. The zoom lens system proposed in U.S. Pat. No. 6,137,638, despite its unimpressive zoom ratio of 1.25×, suffers from large variation of distortion accompanying zooming and large astigmatic difference.

The zoom lens system proposed in Japanese Patent Application Laid-Open No. H11-190821 is unsatisfactory in the correction of lateral chromatic aberration, distortion, and other aberrations, and is unsuitable for use with a compact, high-resolution display device such as a DMD. Another problem is that, since the fourth lens unit has a high positive optical power and an aperture stop is provided in the second lens unit, which is the main zoom unit, increasing the zoom ratio makes it difficult to maintain a telecentric construction. The zoom lens system proposed in Japanese Patent Application Laid-Open No. 2000-137165 suffers from large astigmatic difference and is unsatisfactory in the correction of distortion and lateral chromatic aberration. The zoom lens system proposed in Japanese Patent Application Laid-Open 2000-292701 achieves the correction of lateral chromatic aberration by using four or five lens elements made of high-refractive-index, high-dispersion glass out of the total 13 constituent lens elements. Such glass, however, exhibits poor coloring properties, and making heavy use of it leads to low transmittance to blue light. Thus, this type of glass is unsuitable for use in projection optical systems that are expected to offer high-quality images. Moreover, this zoom lens system, despite its unimpressive zoom ratio, suffers from large variation of distortion accompanying zooming.

The zoom lens system proposed in Japanese Patent Application Laid-Open 2001-108900 has the disadvantage of large lateral chromatic aberration and distortion. It suffers also from large astigmatic difference, and is thus unsuitable for use in projection optical systems that employ a DMD as a display device. Another problem is that, since the fifth lens unit has a high positive optical power and the aperture stop moves together with the third lens unit, it is difficult to match the front-side focal length position of the rear lens unit, i.e. the lens system formed by all the lens elements arranged to the rear of the aperture stop, with the aperture position during zooming. Still another problem is that, since the first to fourth lens units have high negative optical powers and the overall construction is not quite afocal, it is difficult, with this construction, to obtain a long back focal length while maintaining satisfactory off-axial performance.

SUMMARY OF THE INVENTION

An object of the present invention is to provide a compact zoom lens system having a long back focal length and satisfactorily corrected for various aberrations.

To achieve the above object, according to the present invention, a zoom lens system is provided with, from an enlargement side, a first lens unit having a negative optical power, a second lens unit having a positive optical power and disposed on the image side of the first lens unit with a first variable distance secured in between, a third lens unit having a positive optical power and disposed on the image side of the second lens unit with a second variable distance secured in between, a fourth lens unit having a negative optical power, disposed on the image side of the third lens unit with a third variable distance secured in between, and including an aperture stop, a fifth lens unit having a positive or negative optical power and disposed on the image side of the fourth lens unit with a fourth variable distance secured in between, and a sixth lens unit having a positive optical power and disposed on the image side of the fifth lens unit with a fifth variable distance secured in between. Here, zooming is achieved by varying the first to fifth variable distances. Moreover, the third and fifth lens units move from the enlargement side to the reduction side during zooming from the telephoto end to the wide-angle end. Moreover, the zoom lens system is substantially telecentric toward the reduction side.

BRIEF DESCRIPTION OF THE DRAWINGS

This and other objects and features of the present invention will become clear from the following description, taken in conjunction with the preferred embodiments with reference to the accompanying drawings in which:

FIGS. 26A to 26D are aberration diagrams obtained at the middle in Example 5;

FIGS. 27A to 27D are aberration diagrams obtained at the wide-angle end in Example 5;

FIGS. 33A to 33D are aberration diagrams obtained at the wide-angle end in Example 7;

FIGS. 34A to 34D are aberration diagrams obtained at the telephoto end in Example 8;

FIGS. 39A to 39D are aberration diagrams obtained at the wide-angle end in Example 9;

FIGS. 44A to 44D are aberration diagrams obtained at the middle in Example 11;

DESCRIPTION OF THE PREFERRED EMBODIMENTS

Figure 1:
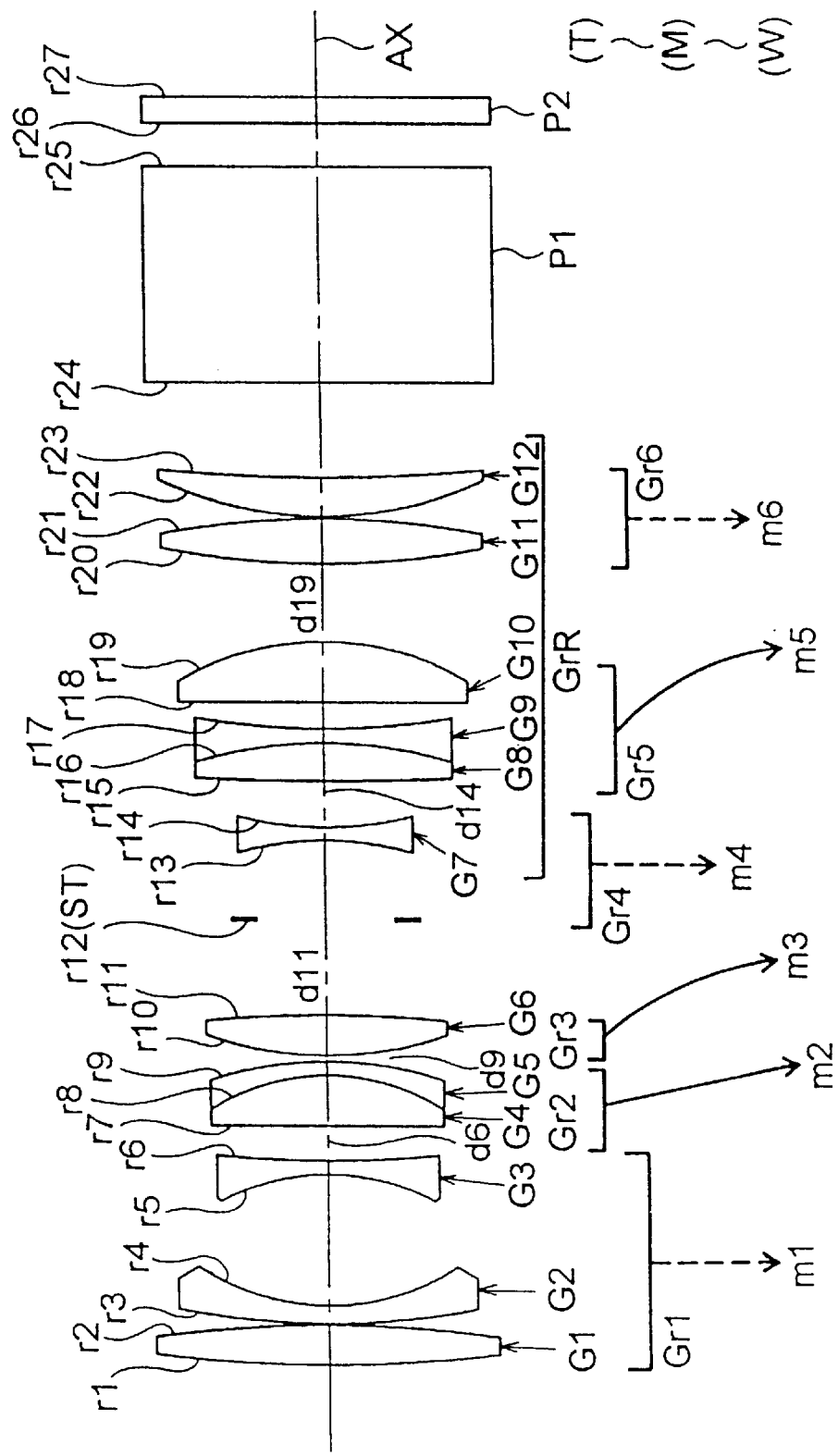
FIG. 1 is a lens construction diagram of a first embodiment (Example 1) of the invention.
Figure 2:
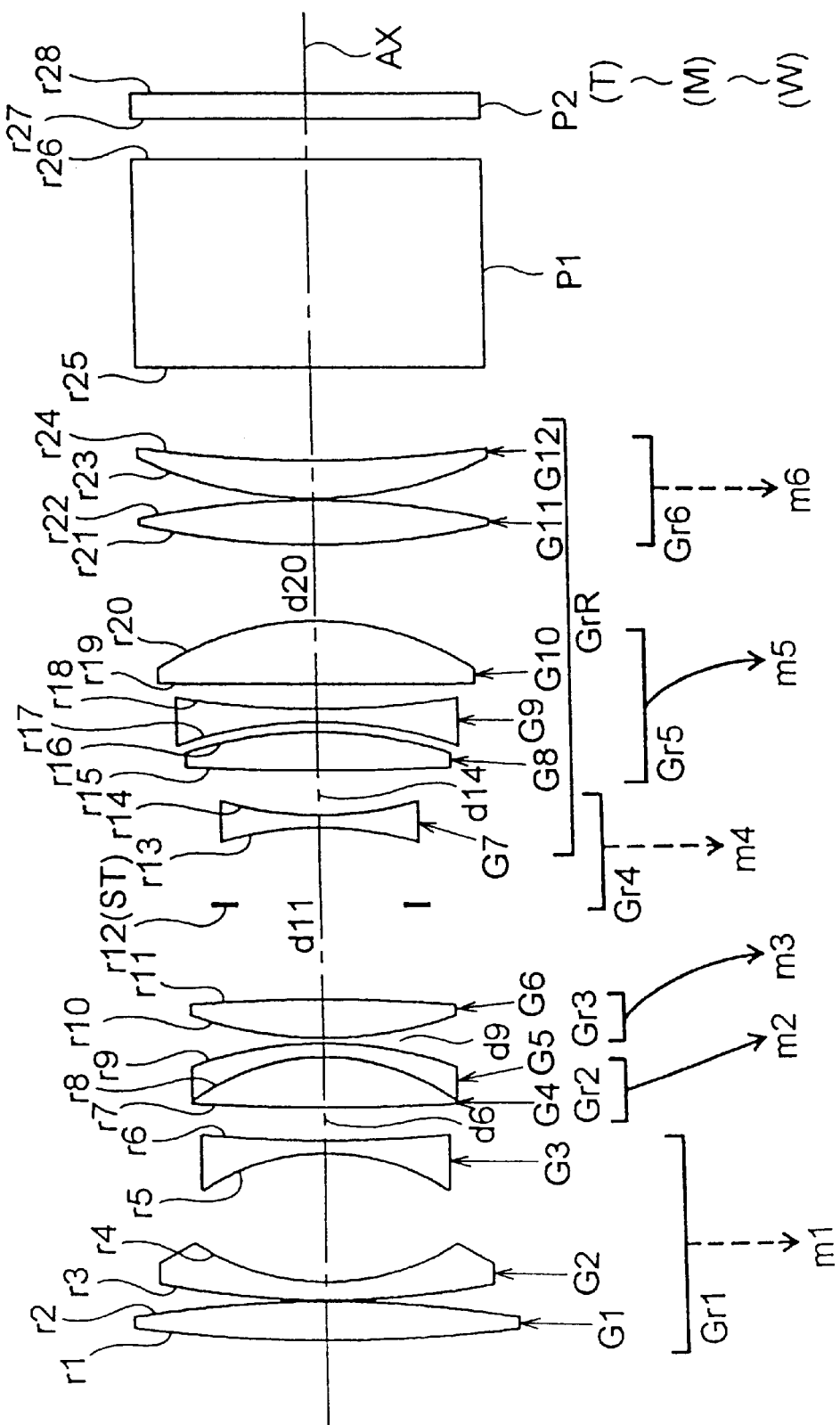
FIG. 2 is a lens construction diagram of a second embodiment (Example 2) of the invention.
Figure 3:
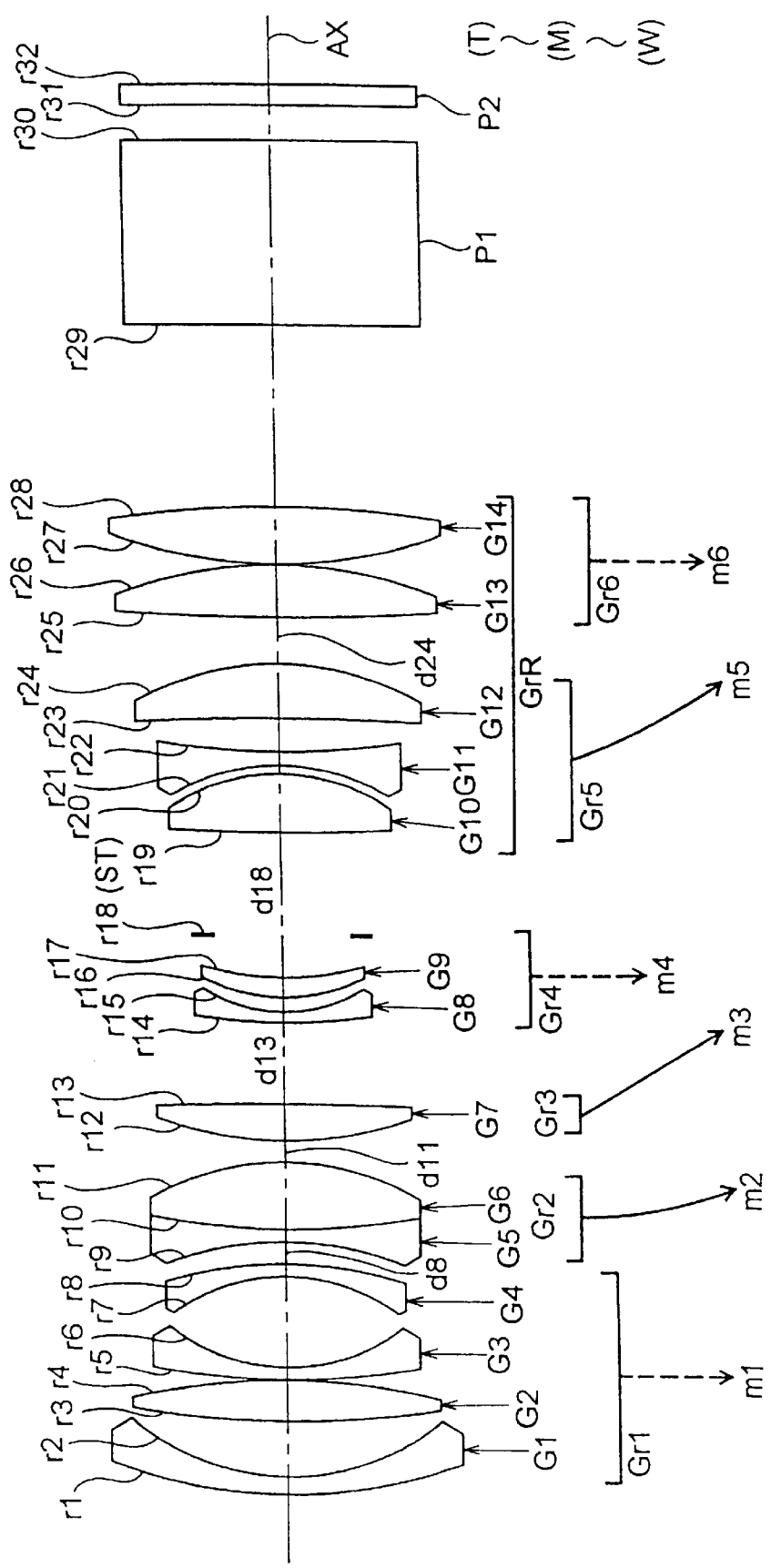
FIG. 3 is a lens construction diagram of a third embodiment (Example 3) of the invention.
Figure 4:
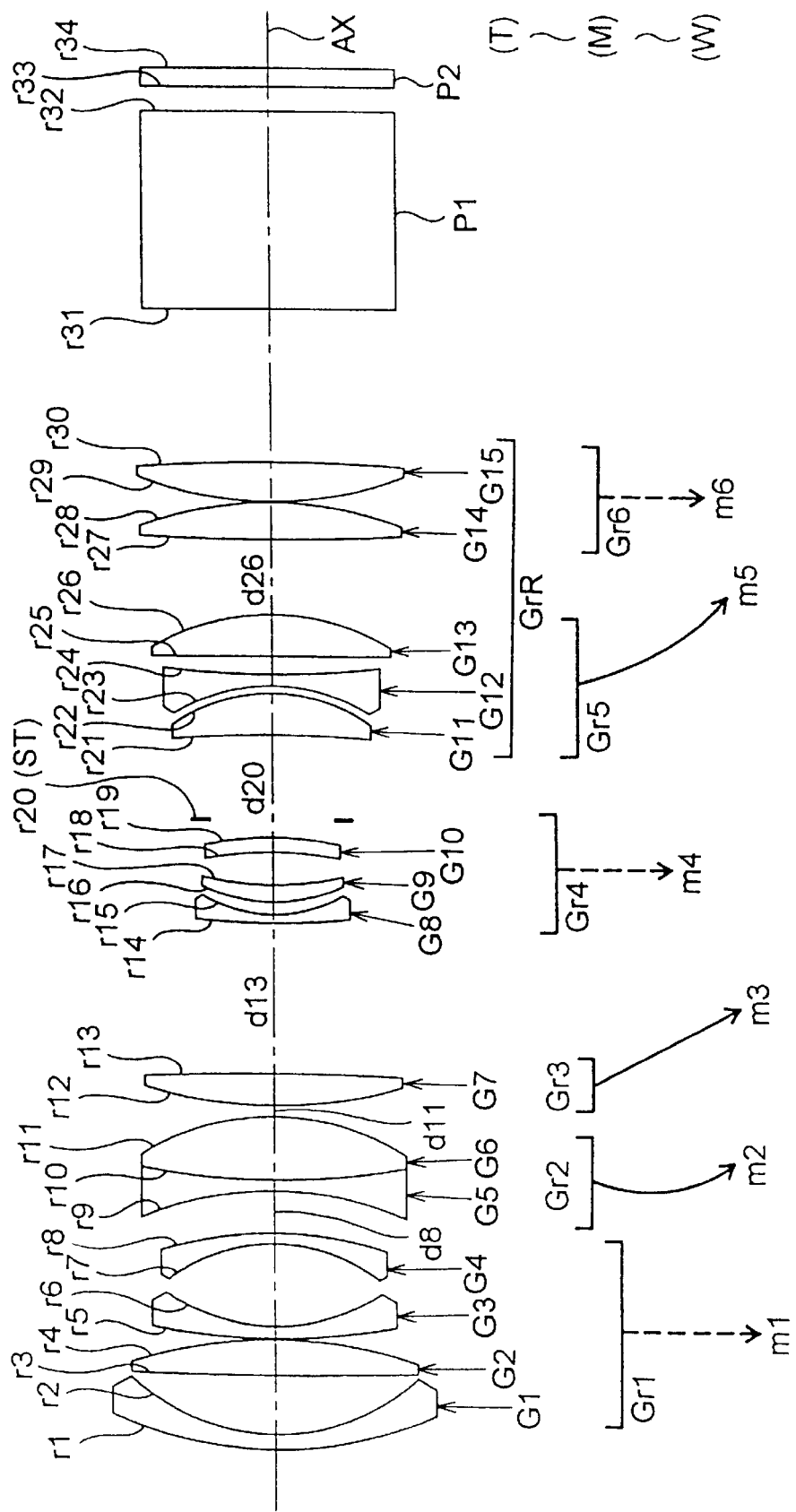
FIG. 4 is a lens construction diagram of a fourth embodiment (Example 4) of the invention.
Figure 5:
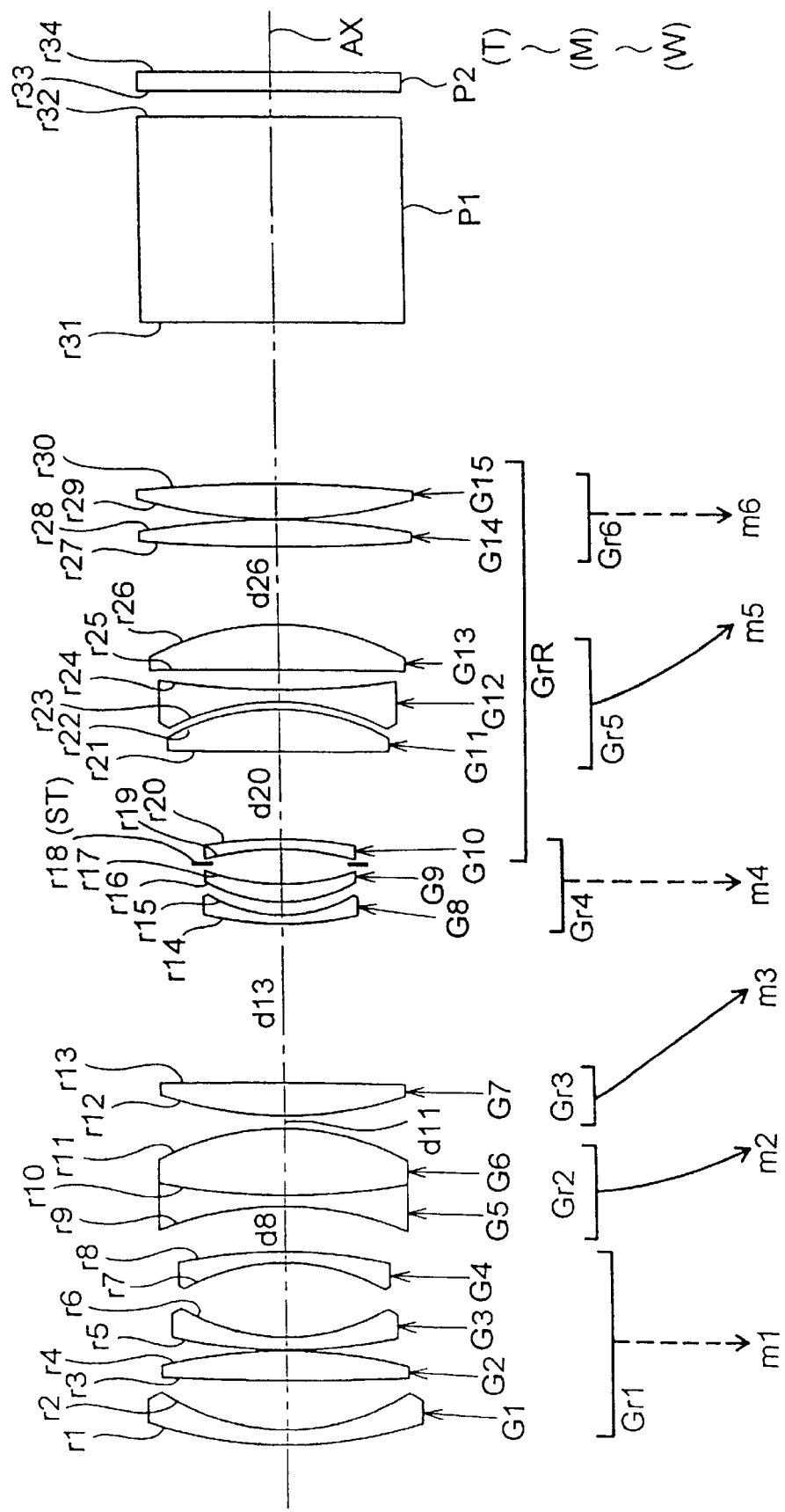
FIG. 5 is a lens construction diagram of a fifth embodiment (Example 5) of the invention.
Figure 6:
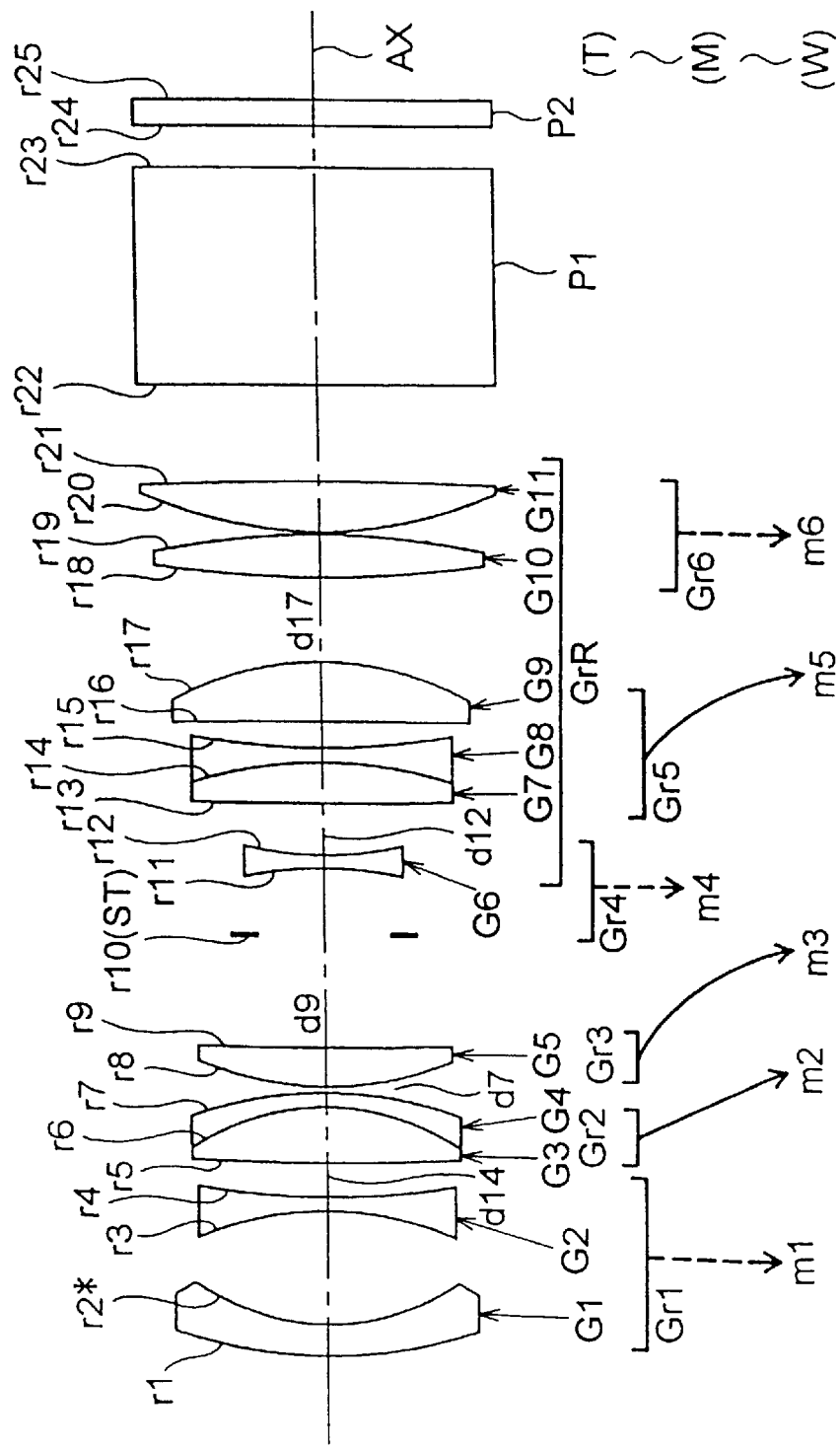
FIG. 6 is a lens construction diagram of a sixth embodiment (Example 6) of the invention.
Figure 7:
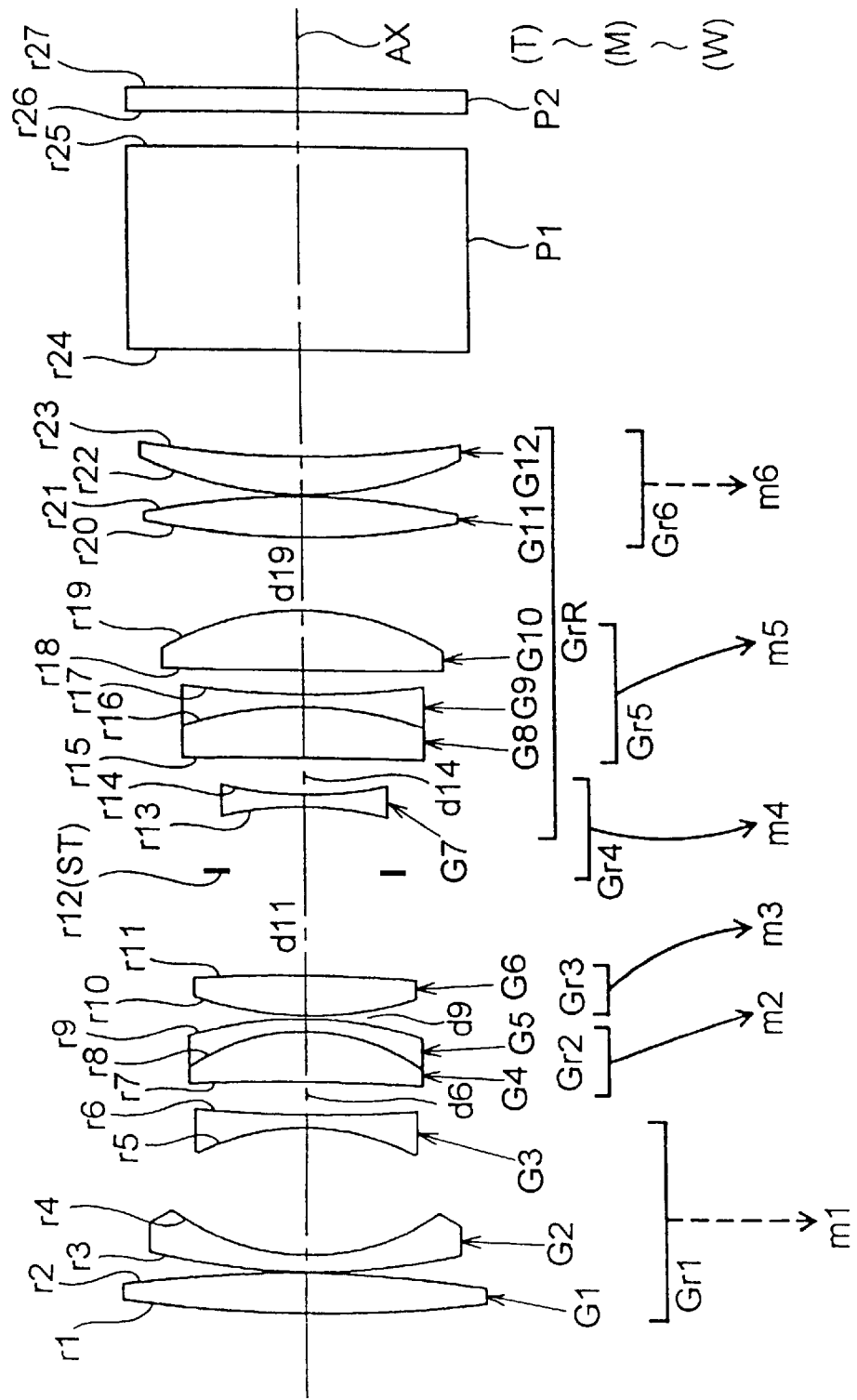
FIG. 7 is a lens construction diagram of a seventh embodiment (Example 7) of the invention.

Hereinafter, zoom lens systems embodying the present invention will be described with reference to the drawings. It is to be understood that, although all the embodiments described below deal with zoom lens systems suitable for use as projection optical systems (i.e. enlargement optical systems) in projecting apparatus (in particular, single-panel projectors employing a DMD), these zoom lens systems can be used also as image-taking optical systems (i.e. reduction optical systems) in image-taking apparatus (for example, video cameras, digital cameras, and digital video unit).

FIGS. 1 to 12 are lens construction diagrams of a first to a twelfth embodiment of the invention, each showing the lens construction at the telephoto end (T) in the form of an optical section. In each lens construction diagram, an arrow mj (j=1, 2, 3, . . . ) schematically indicates the movement of the j-th lens unit (Grj) along the optical axis (AX) during zooming from the telephoto end (the longest-focal-length end, T) to the wide-angle end (the shortest-focal length end, W), with a broken-line arrow mj indicating that the corresponding j-th lens unit is kept in a fixed position during zooming. Moreover, in each lens construction diagram, ri (i=1, 2, 3, . . . ) represents the i-th surface as counted from the enlargement side (i.e. the screen side) (a surface ri marked with an asterisk (*) is an aspherical surface), and di (i=1, 2, 3, . . . ) represents the i-th axial distance as counted from the enlargement side, although only those which vary with zooming are shown here. Gi (i=1, 2, 3, . . . ) represents the i-th lens element as counted from the enlargement side.

In any of these embodiments, the zoom lens system is composed of six units, specifically, from the enlargement side, a first lens unit (Gr1) having a negative optical power, a second lens unit (Gr2) having a positive optical power, a third lens unit (Gr3) having a positive optical power, a fourth lens unit (Gr4) having a negative optical power, a fifth lens unit (Gr5) having a positive or negative optical power, and a sixth lens unit (Gr6) having a positive optical power. Moreover, the zoom lens system is so constructed as to be substantially telecentric toward the reduction side (i.e. the display device side). The fourth lens unit (Gr4) includes an aperture stop (ST), and a prism (P1) and a plane parallel plate (P2) are arranged on the reduction side of the sixth lens unit (Gr6). The prism (P1) corresponds to a TIR prism for separating light beams, and the plane parallel plate (P2) corresponds to the cover glass of a display device (such as a DMD). It is to be noted that, in a case where the zoom lens system of any of the embodiments is used in a three-panel projector, the prism (P1) includes also a color-separating/color-integrating optical system (such as a cross dichroic prism).

In any of the embodiments, zooming is achieved by varying the distances between the individual lens units, with at least the third and fifth lens units (Gr3 and Gr5) moving from the enlargement side (the screen side) to the reduction side (the display device side) during zooming from the telephoto end (T) to the wide-angle end (W). Table 1 shows the distribution of the optical powers among the zoom units in each embodiment. In Table 1, zoom units of which the optical powers are enclosed in brackets ([ ]) are lens units that are kept in fixed positions during zooming, and the other zoom units are movable lens units.

In the first embodiment (FIG. 1), during zooming from the telephoto end (T) to the wide-angle end (W), the second, third, and fifth lens units (Gr2, Gr3, and Gr5) move from the enlargement side to the reduction side. Here, the second lens unit (Gr2) moves linearly, and the third and fifth lens units (Gr3 and Gr5) move at the same rate so as to describe a gentle curve bulging toward the reduction side.

In the second embodiment (FIG. 2), during zooming from the telephoto end (T) to the wide-angle end (W), the second, third, and fifth lens units (Gr2, Gr3, and Gr5) move from the enlargement side to the reduction side. Here, the second lens unit (Gr2) moves linearly, and the third and fifth lens units (Gr3 and Gr5) each move so as to describe a gentle curve bulging toward the reduction side.

In the third embodiment (FIG. 3), during zooming from the telephoto end (T) to the wide-angle end (W), the second, third, and fifth lens units (Gr2, Gr3, and Gr5) move from the enlargement side to the reduction side. Here, the third lens unit (Gr3) moves linearly, and the second and fifth lens units (Gr2 and Gr5) each move so as to describe a gentle curve bulging toward the enlargement side.

In the fourth embodiment (FIG. 4), during zooming from the telephoto end (T) to the wide-angle end (W), the third and fifth lens units (Gr3 and Gr5) move from the enlargement side to the reduction side, and the second lens unit (Gr2) makes a U turn. Here, the third lens unit (Gr3) moves linearly, and the second and fifth lens units (Gr2 and Gr5) each move so as to describe a gentle curve bulging toward the enlargement side, with the second lens unit (Gr2) moving in such a way that the distance (d8) between the first and second lens units (Gr1 and Gr2) is narrowest at the middle (the middle-focal-length point, M).

In the fifth embodiment (FIG. 5), during zooming from the telephoto end (T) to the wide-angle end (W), the second, third, and fifth lens units (Gr2, Gr3, and Gr5) move from the enlargement side to the reduction side. Here, the third lens unit (Gr3) moves linearly, and the second and fifth lens units (Gr2 and Gr5) each move so as to describe a gentle curve bulging toward the enlargement side.

In the sixth embodiment (FIG. 6), during zooming from the telephoto end (T) to the wide-angle end (W), the second, third, and fifth lens units (Gr2, Gr3, and Gr5) move from the enlargement side to the reduction side. Here, the second lens unit (Gr2) moves linearly, and the third and fifth lens units (Gr3 and Gr5) each move so as to describe a gentle curve bulging toward the reduction side.

In the seventh embodiment (FIG. 7), during zooming from the telephoto end (T) to the wide-angle end (W), the second, third, and fifth lens units (Gr2, Gr3, and Gr5) move from the enlargement side to the reduction side, and the fourth lens unit (Gr4) makes a U turn so as to describe a gentle curve bulging toward the enlargement side. Here, the second lens unit (Gr2) moves linearly, and the third and fifth lens units (Gr3 and Gr5) each move so as to describe a gentle curve bulging toward the reduction side.

In the eighth embodiment (FIG. 8), during zooming from the telephoto end (T) to the wide-angle end (W), the second, third, and fifth lens units (Gr2, Gr3, and Gr5) move from the enlargement side to the reduction side. Here, the third lens unit (Gr3) moves linearly, the second lens unit (Gr2) moves so as to describe a gentle curve bulging toward the enlargement side, and the fifth lens unit (Gr5) moves so as to describe a gentle curve bulging toward the reduction side.

In the ninth embodiment (FIG. 9), during zooming from the telephoto end (T) to the wide-angle end (W), the first and second lens units (Gr1 and Gr2) move from the reduction side to the enlargement side, and the third and fifth lens units (Gr3 and Gr5) move from the enlargement side to the reduction side. Here, the first and third lens units (Gr1 and Gr3) move linearly, the second lens unit (Gr2) moves so as to describe a gentle curve bulging toward the enlargement side, and the fifth lens unit (Gr5) moves so as to describe a gentle curve bulging toward the reduction side.

In the tenth embodiment (FIG. 10), during zooming from the telephoto end (T) to the wide-angle end (W), the second lens unit (Gr2) moves from the reduction side to the enlargement side, and the third and fifth lens units (Gr3 and Gr5) move from the enlargement side to the reduction side. Here, the third lens unit (Gr3) moves linearly, and the second and fifth lens units (Gr2 and Gr5) each move so as to describe a gentle curve bulging toward the enlargement side in such a way that the distance (d8) between the first and second lens units (Gr1 and Gr2) decreases during zooming from the telephoto end (T) to the wide-angle end (W).

In the eleventh embodiment (FIG. 11), during zooming from the telephoto end (T) to the wide-angle end (W), the second, third, and fifth lens units (Gr2, Gr3, and Gr5) move from the enlargement side to the reduction side. Here, the third lens unit (Gr3) moves linearly, the second lens unit (Gr2) moves so as to describe a gentle curve bulging toward the enlargement side, and the fifth lens unit (Gr5) moves so as to describe a gentle curve bulging toward the reduction side.

In the twelfth embodiment (FIG. 12), during zooming from the telephoto end (T) to the wide-angle end (W), the second, third, and fifth lens units (Gr2, Gr3, and Gr5) move from the enlargement side to the reduction side. Here, the third lens unit (Gr3) moves linearly, the second lens unit (Gr2) moves so as to describe a gentle curve bulging toward the enlargement side, and the fifth lens unit (Gr5) moves so as to describe a gentle curve bulging toward the reduction side.

As described earlier, a projection optical system for projecting an image formed by a DMD onto a screen needs to have a sufficiently long back focal length to permit the insertion of a TIR prism. In addition, such a projection optical system needs to be compact and satisfactorily corrected for various aberrations (such as lateral chromatic aberration). In any of the embodiments, a zoom lens system that is substantially telecentric toward the reduction side is composed of six units, specifically, from the enlargement side, a negative, a positive, a positive, a negative, a positive or negative, and a positive lens unit, and this zoom lens system is further improved in the respects (i) to (iv) described below to realize a projection optical system that is compact but nevertheless has a sufficiently long back focal length to permit the insertion of a TIR prism and is satisfactorily corrected for various aberrations (such as lateral chromatic aberration).

(i) During zooming from the telephoto end (T) to the wide-angle end (W), the distance between the second and third lens units (Gr2 and Gr3) is increased so that the third lens unit (Gr3) is moved from the enlargement side to the reduction side. This causes the third lens unit (Gr3) to approach the aperture stop (ST), and thus permits the off-axial principal rays entering the third lens unit (Gr3) to travel low relative to the optical axis (AX). This helps reduce the positive optical power acting on the off-axial principal rays as compared with a case where the second and third lens units (Gr2 and Gr3) are moved together, and thus helps reduce high-order lateral chromatic aberration.

(ii) During zooming from the telephoto end (T) to the wide-angle end (W), the distance between the fourth and fifth lens units (Gr4 and Gr5) is increased so that the fifth lens unit (Gr5) is moved from the enlargement side to the reduction side. This causes the fifth lens unit (Gr5) to approach the display device, and thus permits the off-axial principal rays entering the fifth lens unit (Gr5) to travel high relative to the optical axis (AX). Since the positive optical power acting on the off-axial principal rays is higher at the wide-angle end (W) than at the telephoto end (T), this helps strongly shift the g-line, which tends to deflect particularly greatly away from the optical axis (AX), back toward the optical axis (AX). Moreover, by using a lens material that exhibits high anomalous dispersion in a positive lens element included in the fifth lens unit (Gr5), it is possible to correct lateral chromatic aberration more effectively.

(iii) The fourth lens unit (Gr4) includes the aperture stop (ST), and the aperture stop (ST) is disposed substantially at the enlargement-side (i.e. front-side) focal length position of the rear lens unit (GrR), i.e. the lens system formed by all the lens elements arranged on the reduction side of the aperture stop (ST). By giving the fifth lens unit (Gr5) a low (positive or negative) optical power, it is possible to reduce the variation of the composite focal length of the rear lens unit (GrR) accompanying the movement of the fifth lens unit (Gr5). The fourth lens unit (Gr4) including the aperture stop (ST) is either kept in a fixed position or moved only slightly during zooming.

(iv) The lens system formed by the first through fourth lens units (Gr1 through Gr4) constitutes a substantially afocal optical system, and the distance between the fourth and fifth lens units (Gr4 and Gr5) is determined appropriately. These make it possible to obtain a long back focal length easily while maintaining satisfactory off-axial performance.

From the viewpoints of (i) and (ii) described above, it is preferable, during zooming from the telephoto end (T) to the wide-angle end (W), that the distance between the second and third lens units (Gr2 and Gr3) increase, that the distance between the fourth and fifth lens units (Gr4 and Gr5) increase, and that the following conditional formulae (1) to (5) be fulfilled:

$$0.1 < \phi2/\phi3 < 1.1 \tag{1}$$

$$-0.6 < \phi5/\phi4 < 0.5 \tag{2}$$

$$-0.3 < \phi5/\phi3 < 0.5 \tag{3}$$

$$1.3 < |\phi1|/\phi2 < 20 \tag{4}$$

$$0.1 < fw \cdot \phi3 < 0.9 \tag{5}$$

wherein $\phi1$ represents the optical power of the first lens unit (Gr1);

$\phi2$ represents the optical power of the second lens unit (Gr2);

$\phi3$ represents the optical power of the third lens unit (Gr3);

$\phi4$ represents the optical power of the fourth lens unit (Gr4);

$\phi5$ represents the optical power of the fifth lens unit (Gr5); and fw represents the focal length of the zoom lens system as a whole at the wide-angle end (W).

If the lower limit of formula (1) is transgressed, the astigmatism and other aberrations produced by the third lens unit (Gr3) are so large that it is difficult to correct them with the other lens units. If the upper limit of formula (1) is transgressed, the movement stroke of the third lens unit (Gr3) is so long that the total length of the zoom lens system is unduly long.

If the upper or lower limit of formula (2) is transgressed, the lateral chromatic aberration produced by the fifth lens unit (Gr5) is overcorrected to such a degree that it is difficult to correct it with the other lens units.

The image plane is corrected mainly by the third lens unit (Gr3), and lateral chromatic aberration is corrected for mainly by the fifth lens unit (Gr5). Thus, by setting the ratio between the optical powers of the third and fifth lens units (Gr3 and Gr5) so as to fulfill formula (3), it is possible to strike a proper balance between astigmatism and lateral chromatic aberration. If the optical power of the fifth lens unit (Gr5) is so high that the upper or lower limit of formula (3) is transgressed, the lateral chromatic aberration produced by the fifth lens unit (Gr5) is so large that the variation of aberrations accompanying zooming cannot be corrected properly with the other lens units. Moreover, high-order lateral chromatic aberration is larger. If the optical power of the third lens unit (Gr3) is so low that the upper or lower limit of formula (3) is transgressed, the movement stroke of the third lens unit (Gr3) during zooming is so long that the total length of the zoom lens system is unduly long.

By setting the optical powers of the first and second lens units (Gr1 and Gr2) so as to fulfill formula (4), it is possible to reduce the variation of aberrations such as astigmatism accompanying focusing using the first lens unit (Gr1). If the upper limit of formula (4) is transgressed, the optical power of the first lens unit (Gr1) is relatively so strong as to produce particularly large distortion, making it difficult to strike a proper balance between distortion and other aberrations. If the lower limit of formula (4) is transgressed, an unduly long movement stroke is required for focusing, making it difficult to correct astigmatism and other aberrations. Moreover, an unduly large lens diameter is required in the first lens unit (Gr1).

Formula (5) defines the proper range of the optical power of the third lens unit (Gr3), which is the main zoom unit. If the upper limit of formula (5) is transgressed, the movement stroke of the third lens unit (Gr3) is shorter, but the variation of aberrations accompanying zooming is so large that it is difficult to correct them. If the lower limit of formula (5) is transgressed, it is easier to correct aberrations, but the movement stroke of the third lens unit (Gr3) is so long that the total length of the zoom lens system is unduly long.

From the viewpoints of (iii) and (iv) described earlier, it is preferable that the aperture stop (ST) included in the fourth lens unit (Gr4) be disposed substantially at the enlargement-side focal length position of the rear lens unit (GrR), which is a lens system formed by all the lens elements arranged on the reduction side of the aperture stop (ST), that the first through fourth lens units (Gr1 through Gr4) constitute a substantially afocal optical system, and that the following conditional formulae (6) to (10) be fulfilled:

$$0.5 < Tsp/(fa-FH) < 1.4 \quad (6)$$

$$-0.1 < fw \cdot \phi 5 < 0.3 \quad (7)$$

$$-0.2 < fw \cdot \phi 1\text{-}4 < 0.3 \quad (8)$$

$$0.2 < T4\text{-}5/Bf < 1.0 \quad (9)$$

$$0.8 < Bf/fw < 3.0 \quad (10)$$

where

Tsp represents the axial distance from the aperture stop (ST) to the vertex of the lens surface arranged immediately on the reduction side of the aperture stop (ST) at the wide-angle end (W);

fa represents the focal length of the rear lens unit (GrR) at the wide-angle end (W);

FH represents the axial distance from the vertex of the lens surface arranged immediately on the reduction side of the aperture stop (ST) to the enlargement-side principal point position (i.e. front-side principal point position) of the rear lens unit (GrR) at the wide-angle end (W);

fw represents the focal length of the zoom lens system as a whole at the wide-angle end (W);

$\phi 5$ represents the optical power of the fifth lens unit (Gr5);

$\phi 1\text{-}4$ represents the composite optical power of the first through fourth lens units (Gr1 through Gr4) at the wide angle end (W);

T4-5 represents the lens surface distance between the fourth and fifth lens units (Gr4 and Gr5) at the wide-angle end (W); and Bf represents the back focal length converted to an equivalent length in air.

If the upper or lower limit of formula (6) is transgressed, the aperture stop (ST) is located too far away from the front-side focal length position of the rear lens unit (GrR), i.e. the lens system formed by all the lens elements arranged on the reduction side of the aperture stop (ST). This makes the zoom lens system as a whole insufficiently telecentric.

If the upper or lower limit of formula (7) is transgressed, the front-side focal length position of the rear lens unit (GrR) varies greatly during zooming. This makes the zoom lens system as a whole insufficiently telecentric.

If the lower limit of formula (8) is transgressed, the composite optical power of the first through fourth lens units (Gr1 through Gr4) is too far into the negative region. As a result, the sixth lens unit (Gr6) needs to be given a high positive optical power, and thus it produces larger lateral chromatic aberration and other aberrations. Moreover, the back focal length is longer than necessary, making the zoom lens system as a whole unduly large. If the upper limit of formula (8) is transgressed, the composite optical power of the first through fourth lens units (Gr1 through Gr4) is too far into the positive region. This makes it difficult to maintain the back focal length.

If the upper limit of formula (9) is transgressed, off-axial rays travel too far out, i.e. away from the optical axis (AX). This requires unduly large lens diameters in the fifth and sixth lens units (Gr5 and Gr6), and thus makes the zoom lens system as a whole unduly large. If the lower limit of condition (9) is transgressed, it is difficult to keep the zoom lens system as a whole telecentric.

If the lower limit of formula (10) is transgressed, there is no space in which to insert the TIR prism. If the upper limit of formula (10) is transgressed, the back focal length is longer than necessary, and unduly large lens diameters are required in the fifth and sixth lens units (Gr5 and Gr6).

In a six-unit zoom lens system, like those of the embodiments, composed of a negative, a positive, a positive, a negative, a positive or negative, and a positive lens unit of which at least the third and fifth lens units (Gr3 and Gr5) move from the enlargement side to the reduction side during zooming from the telephoto end (T) to the wide-angle end (W), the distance between the first and second lens units (Gr1 and Gr2) may be increased (FIG. 1, etc.) or decreased (FIG. 10) during zooming from the telephoto end (T) to the wide-angle end (W). Moreover, from the viewpoint of (iii) described earlier, the aperture stop (ST) may be kept in a fixed position together with the fourth lens unit (Gr4) (FIG. 1, etc.) or moved together with the fourth lens unit (Gr4) (FIG. 7) during zooming. In any of the embodiments, focusing is achieved mainly with the first lens unit (Gr1).

However, it is also possible to achieve focusing with one or more of the other lens units (Gr2 to Gr6), or even with the zoom lens system as a whole.

From the viewpoint of (ii) described earlier, with respect to the lens materials used in the fifth and sixth lens units (Gr5 and Gr6), it is preferable that the fifth lens unit (Gr5) include at least one positive lens element that fulfills the following conditional formulae (11) and (12), and it is further preferable that the sixth lens unit (Gr6) be composed solely of positive lens elements and fulfill the following conditional formula (13).

$$0.7 < \Delta P5 < 6.0 \quad (11)$$

$$60 < \nu(5) < 100 \quad (12)$$

$$50 < \nu(6') < 100 \quad (13)$$

where $\Delta P5 = [\Theta - (0.6444 - 0.001689) \cdot \nu(5)] \times 100$;

$\Theta = (ng - nF)/(nF - nC)$;

ng represents the refractive index for the g-line (having a wavelength of 435.84 nm);

nF represents the refractive index for the F-line (having a wavelength of 486.13 nm);

nd represents the refractive index for the d-line (having a wavelength of 587.56 nm);

nC represents the refractive index for the C-line (having a wavelength of 656.28 nm);

$\nu(5)$ represents the Abbe number vd of the positive lens element included in the fifth lens unit (Gr5); and $\nu(6')$ represents the average value of the Abbe numbers vd of the positive lens elements constituting the sixth lens unit (Gr6).

$vd = (nd-1)/(nF-nC)$.

Formula (11) quantitatively defines the anomalous partial dispersion of the lens material for the g- and F-lines as $\Delta P5$, which represents deviations from a standard line obtained by tracing through normal glass (deviations from a partial dispersion norm line). Specifically, $\Theta$ in $\Delta P5$ represents the ratio of the partial dispersion of the lens material between for the g- and F-lines, and (0.6444−0.001689) in $\Delta P5$ represents the same ratio of the partial dispersion calculated for normal glass (norm glass) having the same vd. If the lower limit of formula (11) is transgressed, the anomalous dispersion for the g- and F-lines is too low, resulting in unacceptable lateral chromatic aberration. If the upper limit of formula (11) is transgressed, the anomalous dispersion is satisfactorily high; however, no such lens material exists to be readily available, and, if one does, it is extremely expensive.

If the lower limit of formula (12) is transgressed, longitudinal chromatic aberration is unacceptable. If the upper limit of formula (12) is transgressed, chromatic aberrations are satisfactorily corrected for; however, no such lens material exists at present.

If the lower limit of formula (13) is transgressed, longitudinal chromatic aberration is unacceptable. If the upper limit of formula (13) is transgressed, chromatic aberrations are satisfactorily corrected for; however, no such lens material exists at present.

Figure 8:
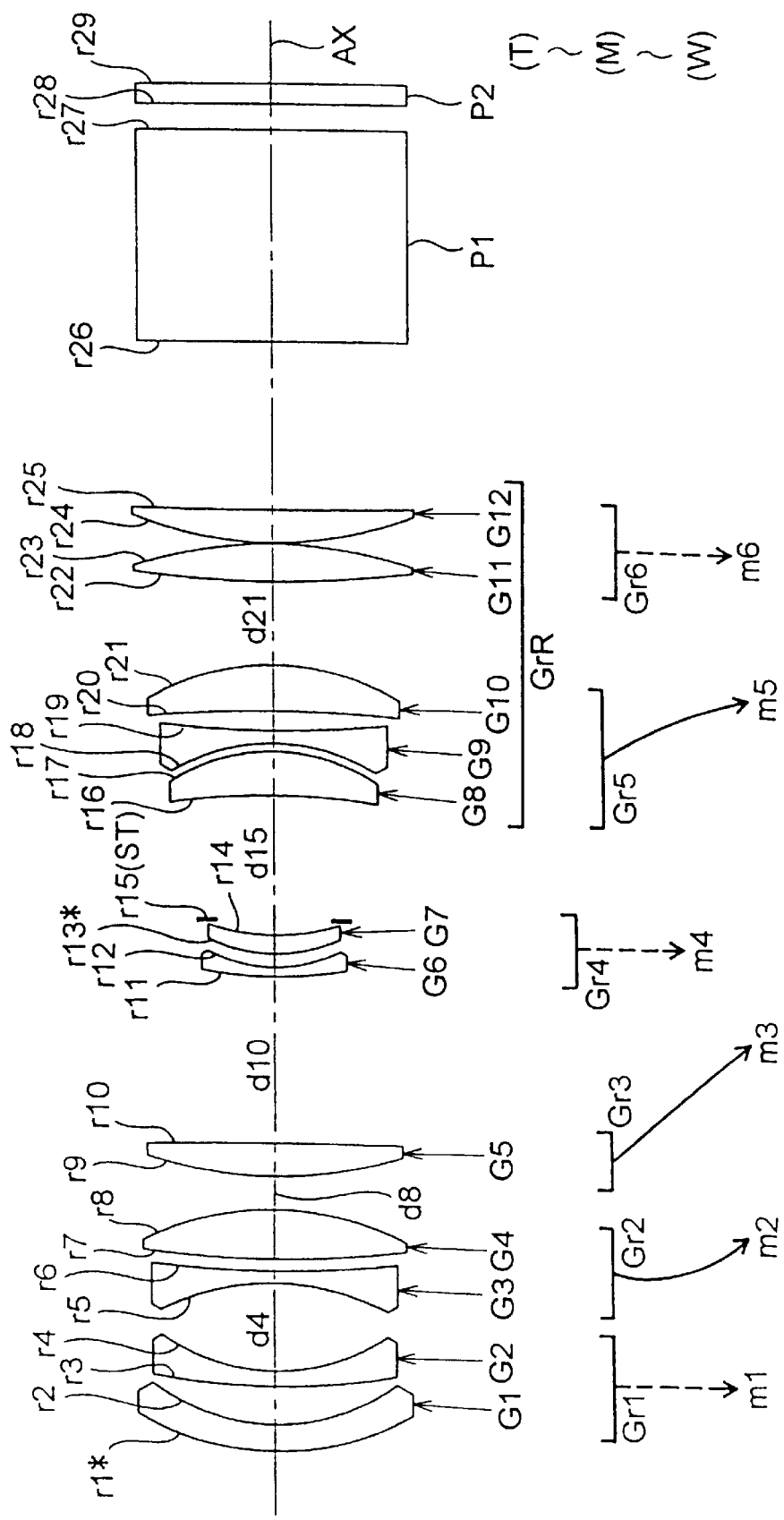
FIG. 8 is a lens construction diagram of an eighth embodiment (Example 8) of the invention.
Figure 9:
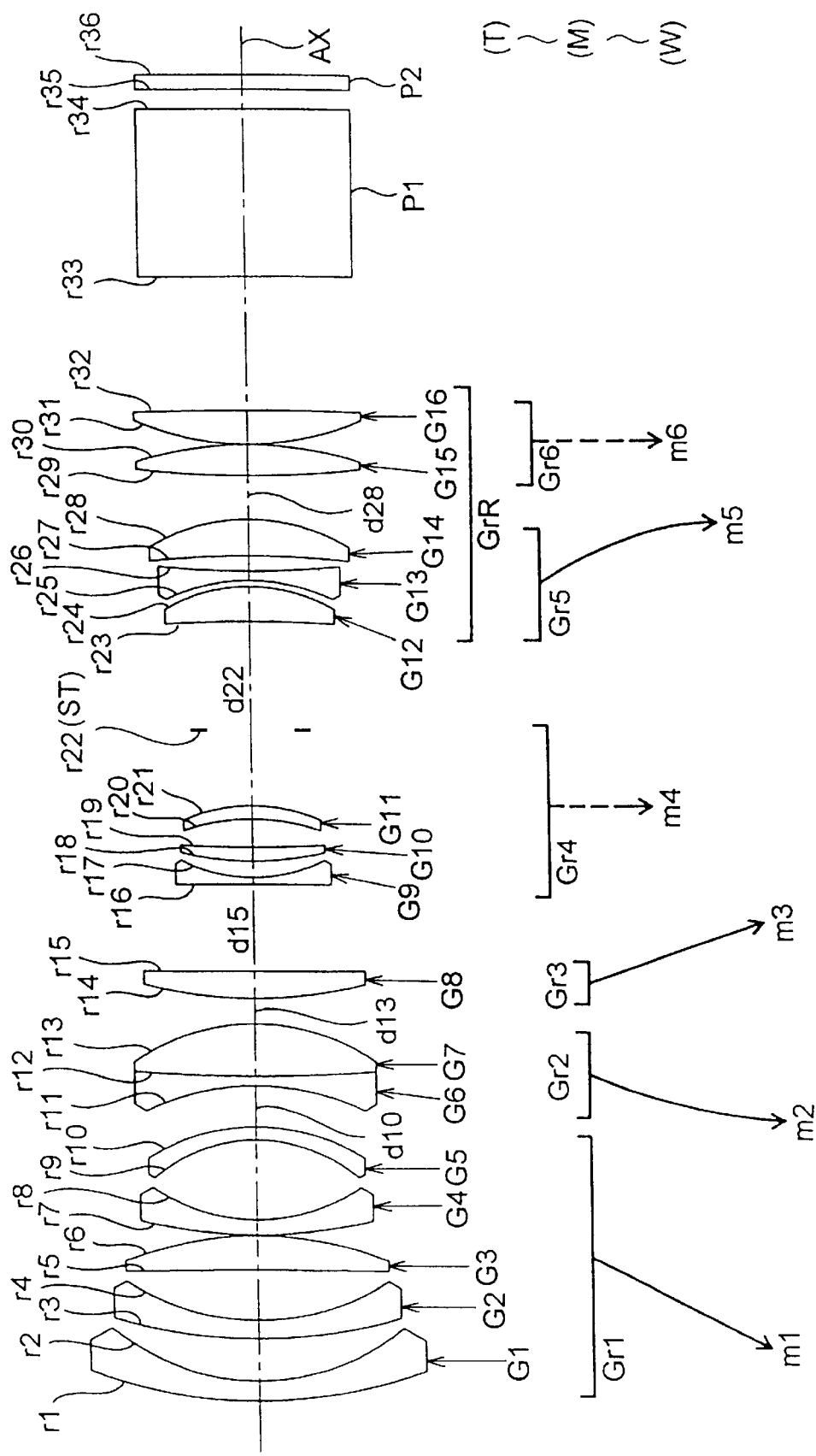
FIG. 9 is a lens construction diagram of a ninth embodiment (Example 9) of the invention.
Figure 10:
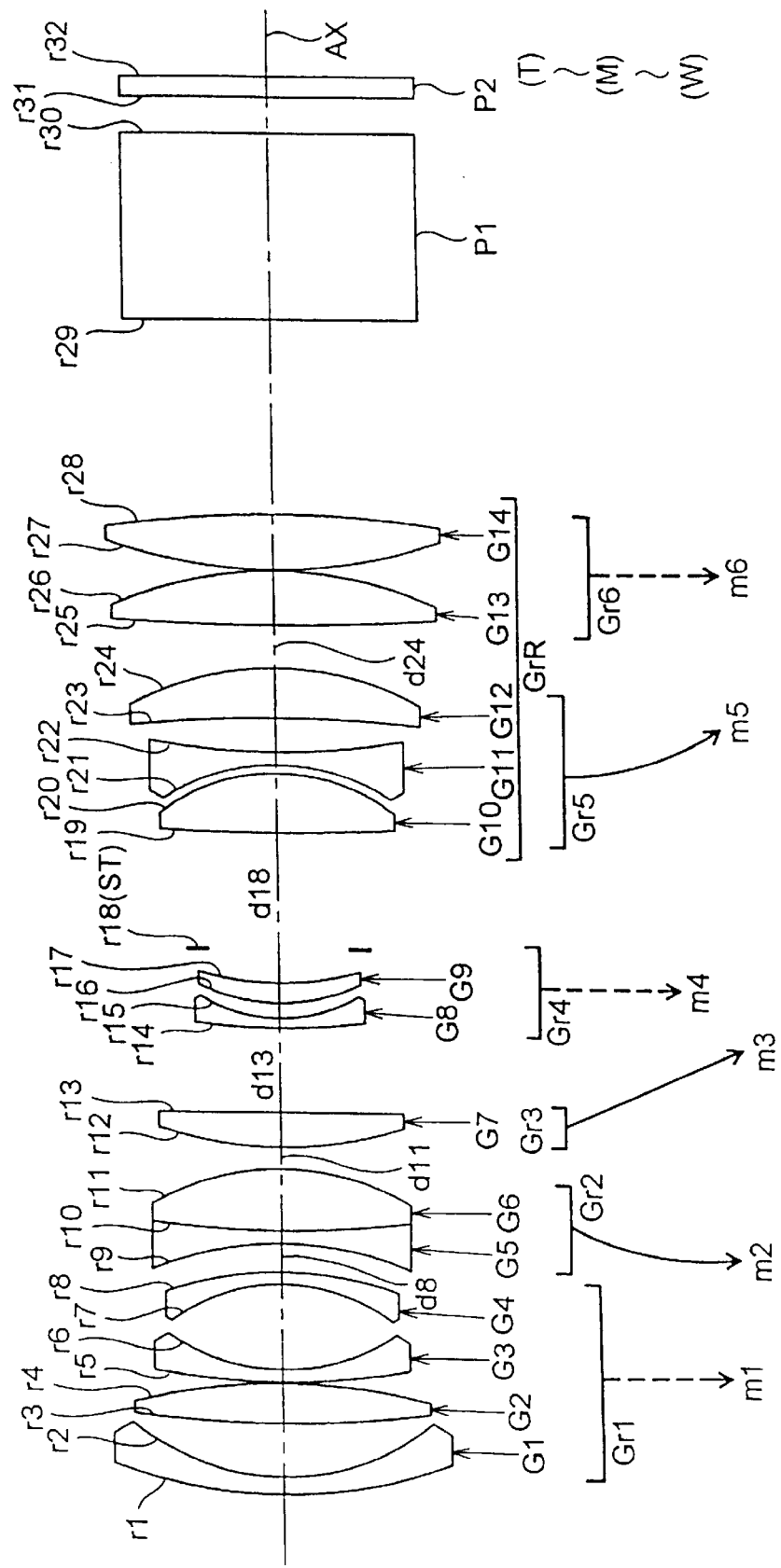
FIG. 10 is a lens construction diagram of a tenth embodiment (Example 10) of the invention.
Figure 11:
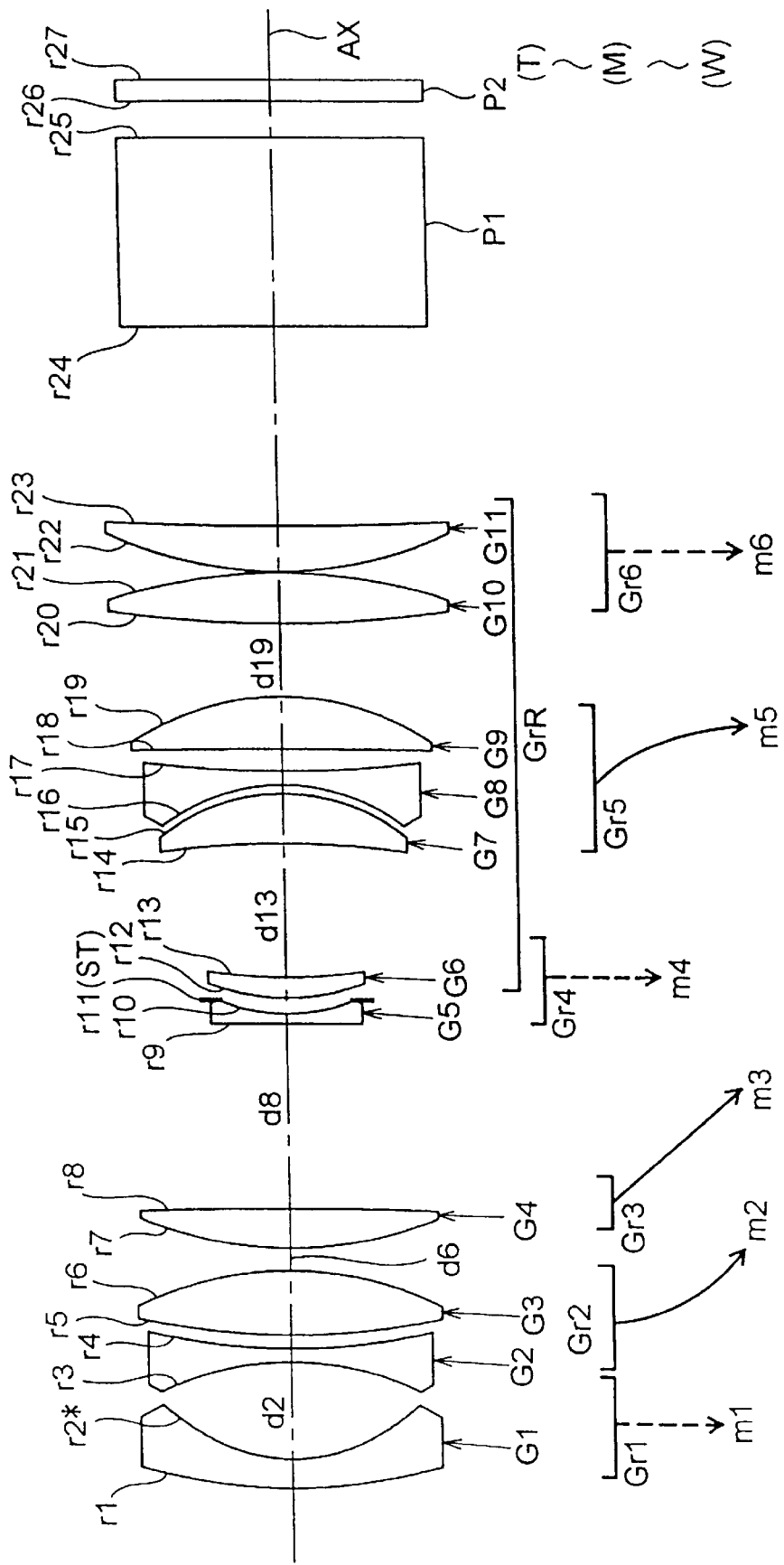
FIG. 11 is a lens construction diagram of an eleventh embodiment (Example 11) of the invention.
Figure 12:
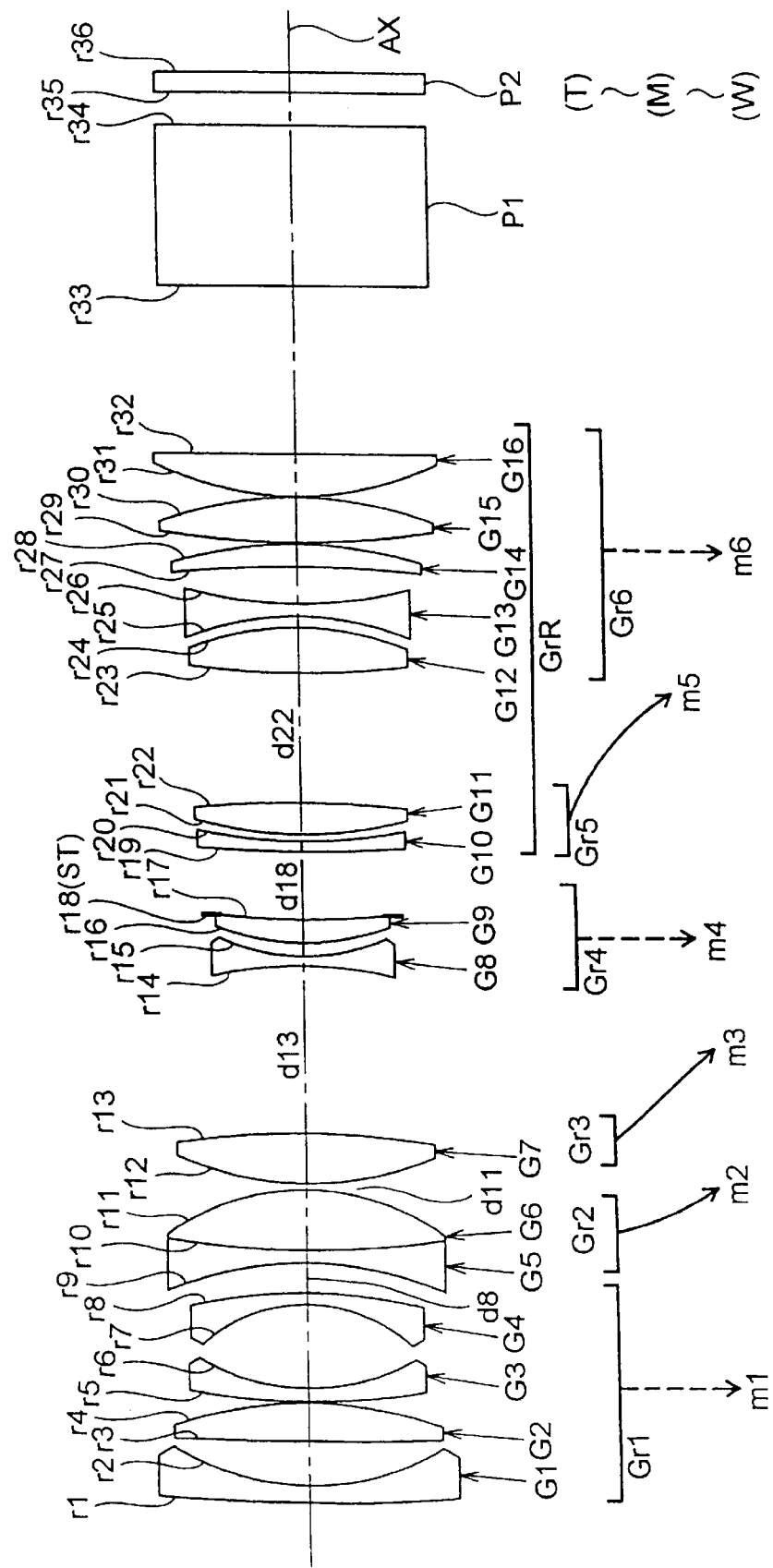
FIG. 12 is a lens construction diagram of a twelfth embodiment (Example 12) of the invention.
Figure 13A:
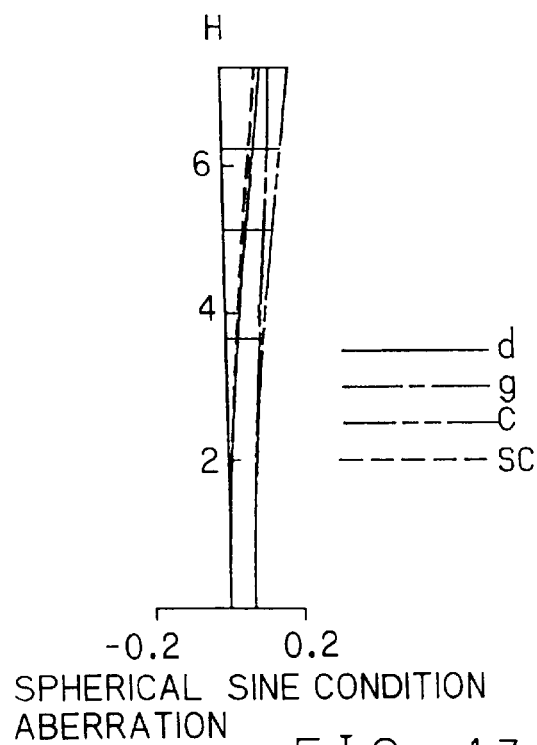
FIGS. 13A to 13D are aberration diagrams obtained at the telephoto end in Example 1.
Figure 13B:
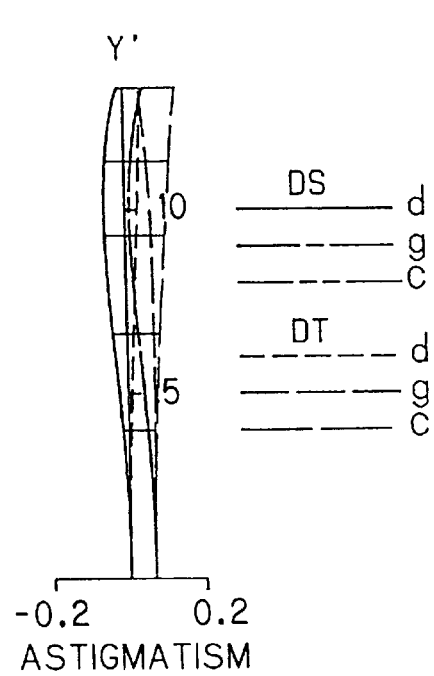
Figure 13C:
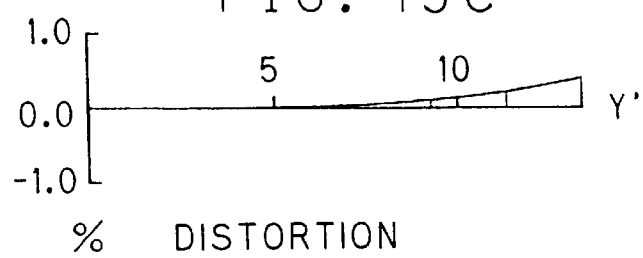
Figure 13D:
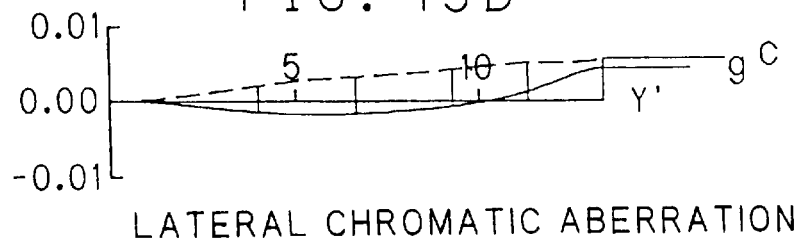
Figure 14A:
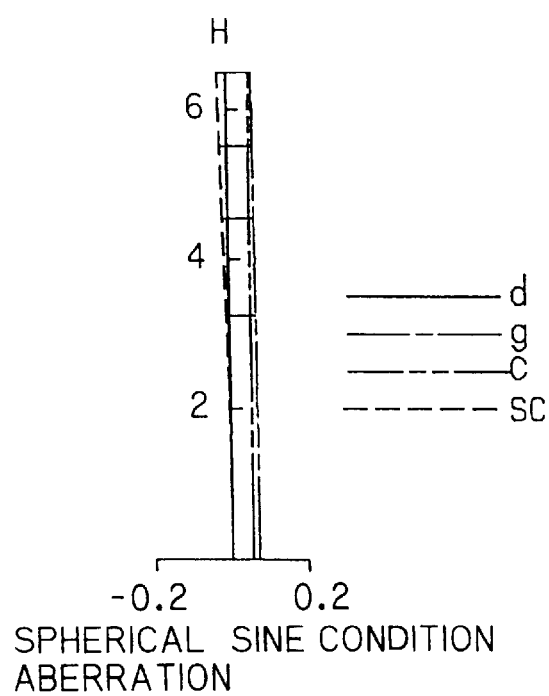
FIGS. 14A to 14D are aberration diagrams obtained at the middle in Example 1.
Figure 14B:
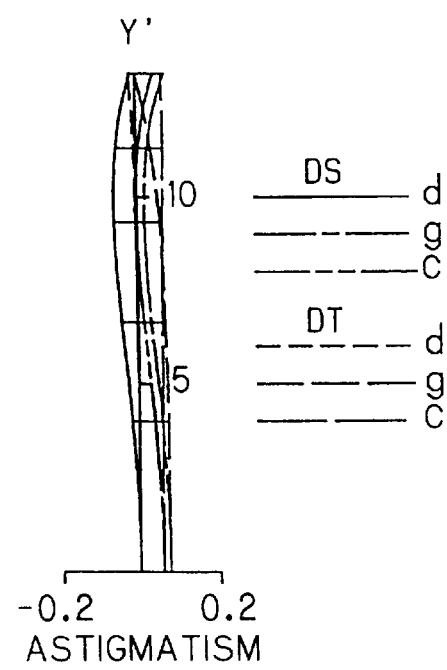
Figure 14C:
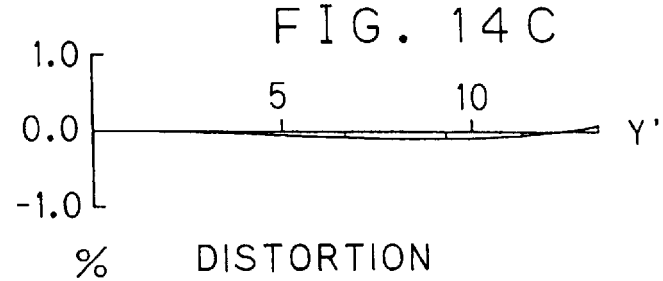
Figure 14D:
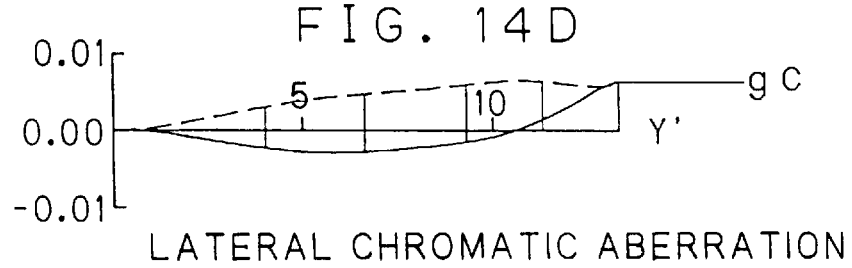
Figure 15A:
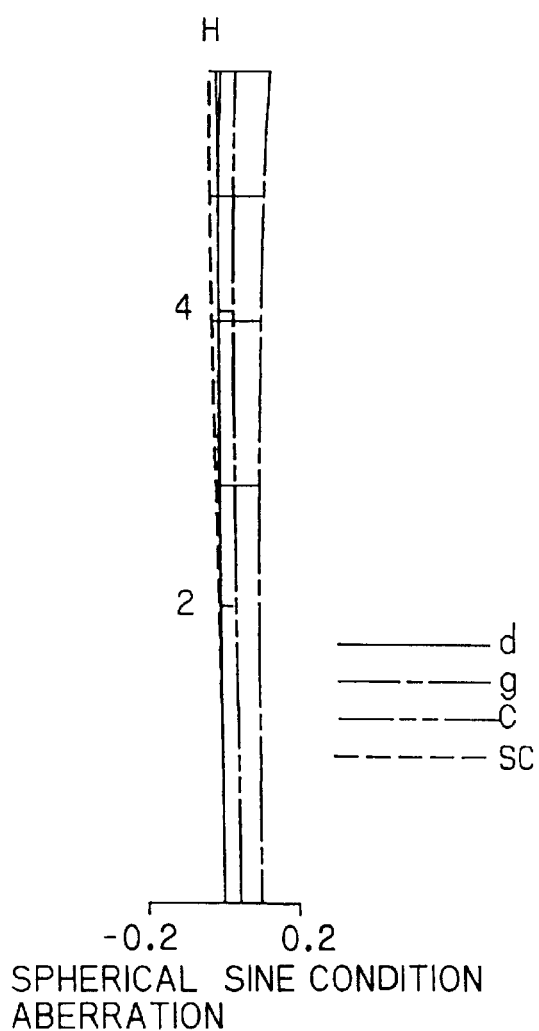
FIGS. 15A to 15D are aberration diagrams obtained at the wide-angle end in Example 1.
Figure 15B:
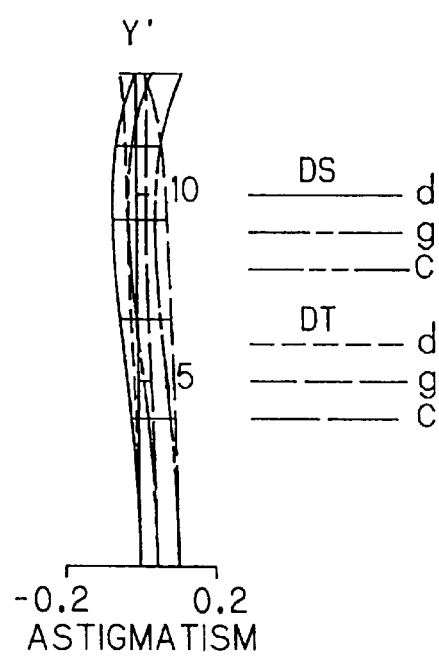
Figure 15C:
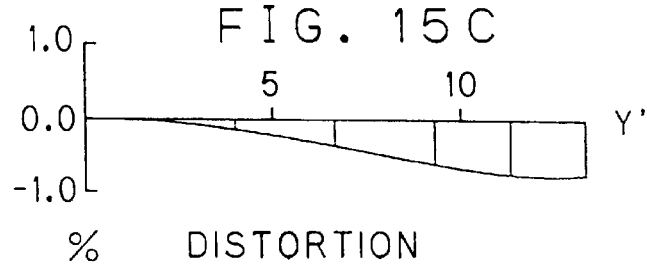
Figure 15D:
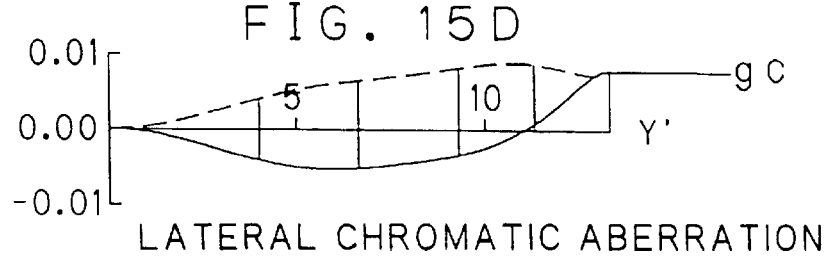
Figure 16A:
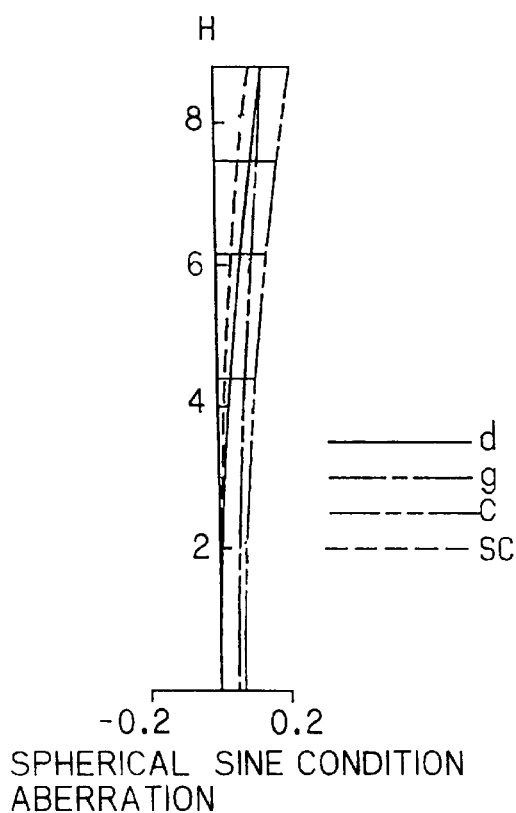
FIGS. 16A to 16D are aberration diagrams obtained at the telephoto end in Example 2.
Figure 16B:
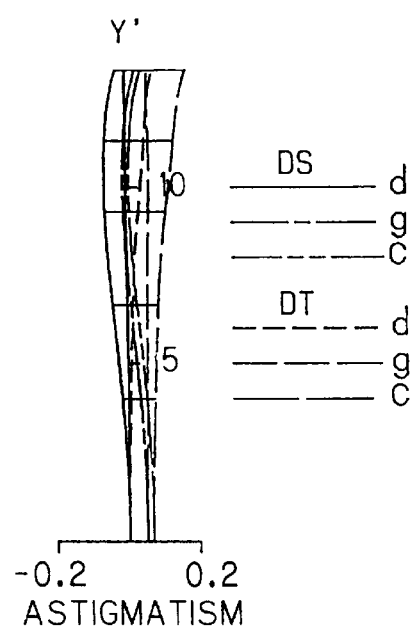
Figure 16C:
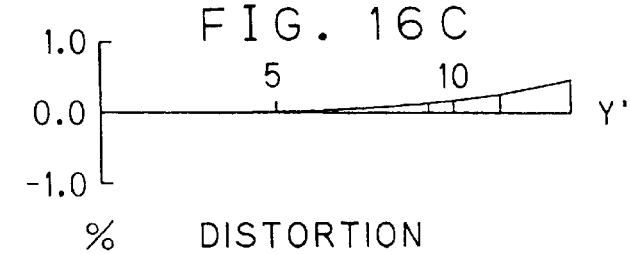
Figure 16D:
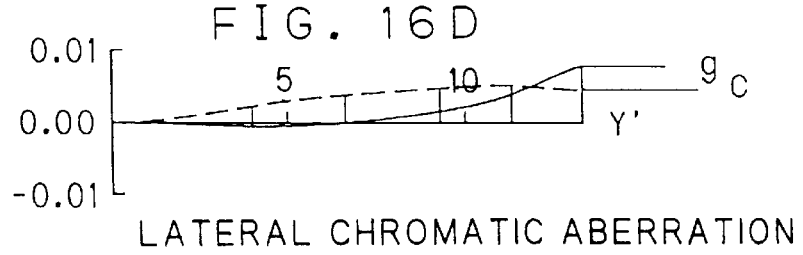
Figure 17A:
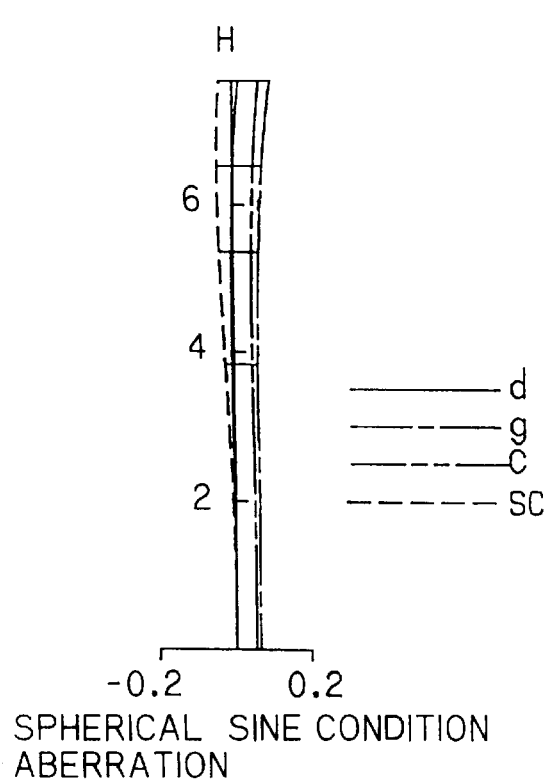
FIGS. 17A to 17D are aberration diagrams obtained at the middle in Example 2.
Figure 17B:
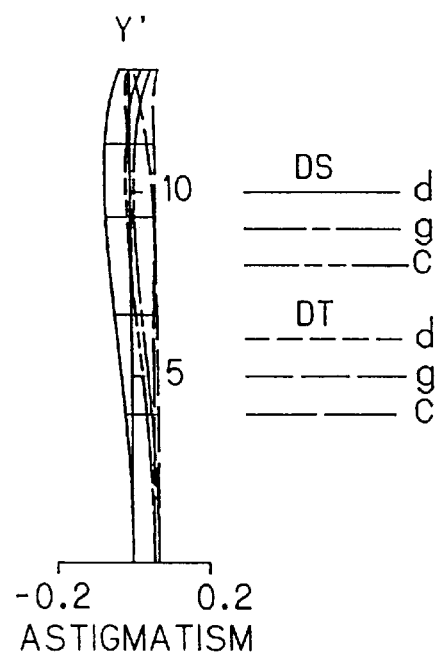
Figure 17C:
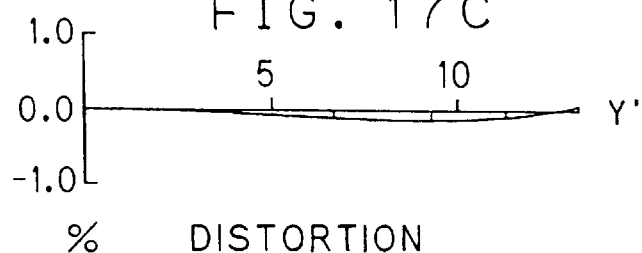
Figure 17D:
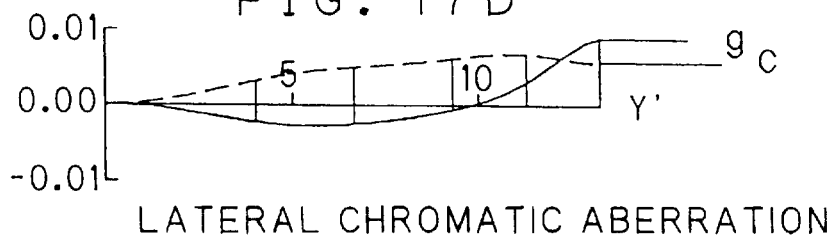
Figure 18A:
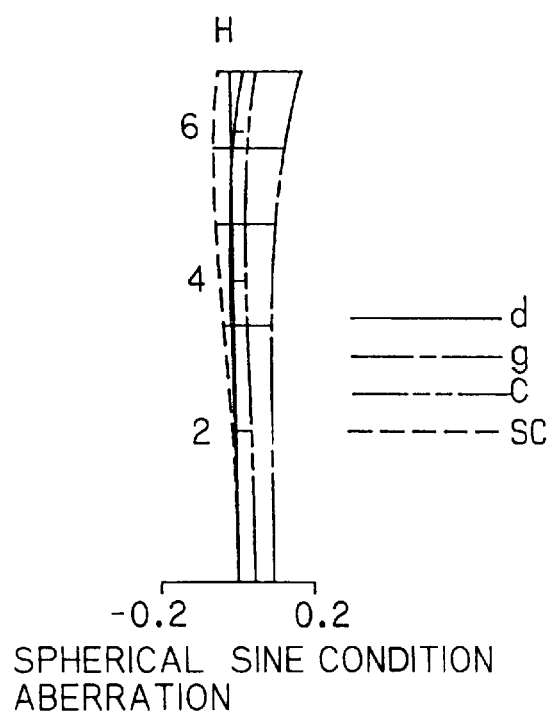
FIGS. 18A to 18D are aberration diagrams obtained at the wide-angle end in Example 2.
Figure 18B:
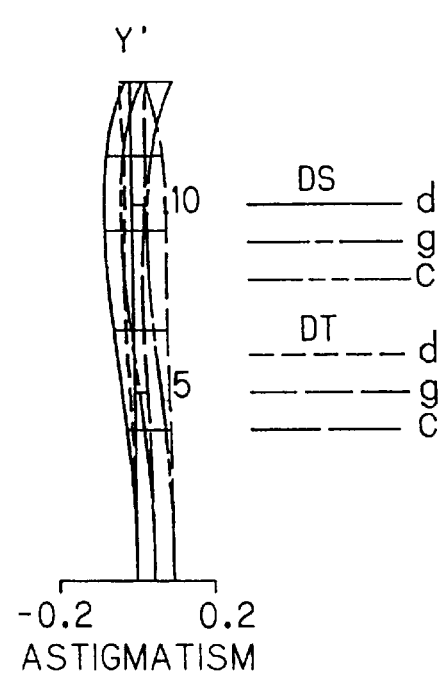
Figure 18C:
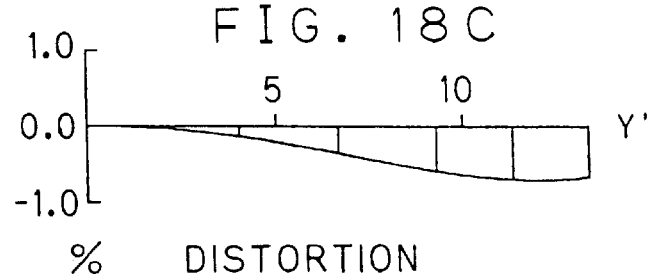
Figure 18D:
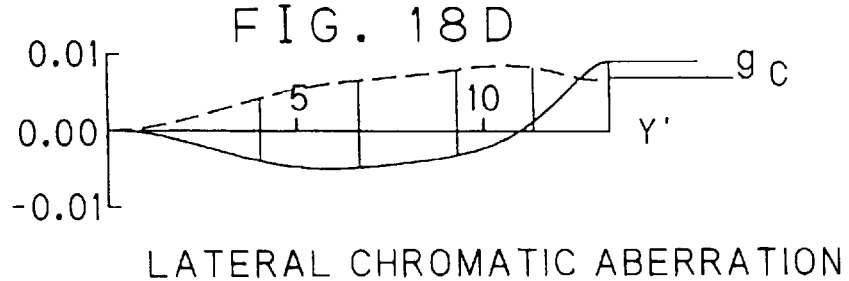
Figure 19A:
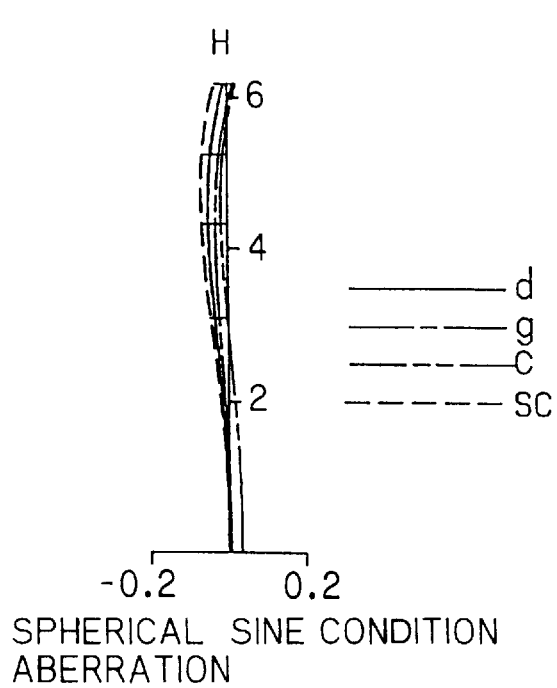
FIGS. 19A to 19D are aberration diagrams obtained at the telephoto end in Example 3.
Figure 19B:
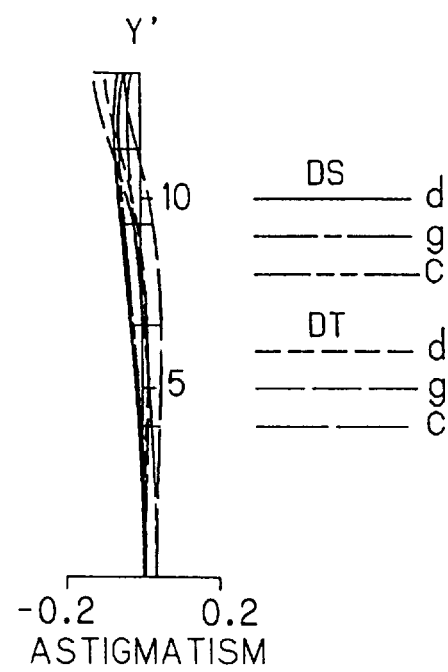
Figure 19C:
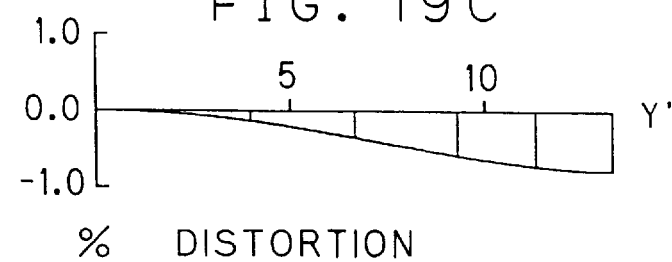
Figure 19D:
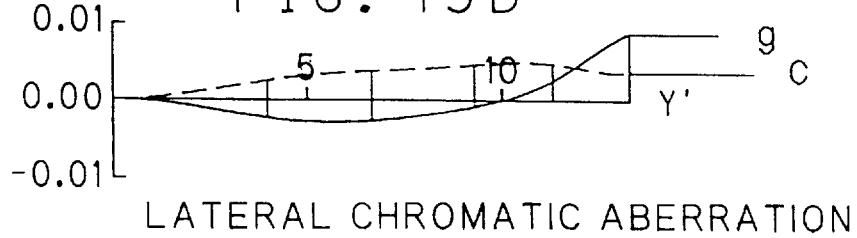
Figure 20A:
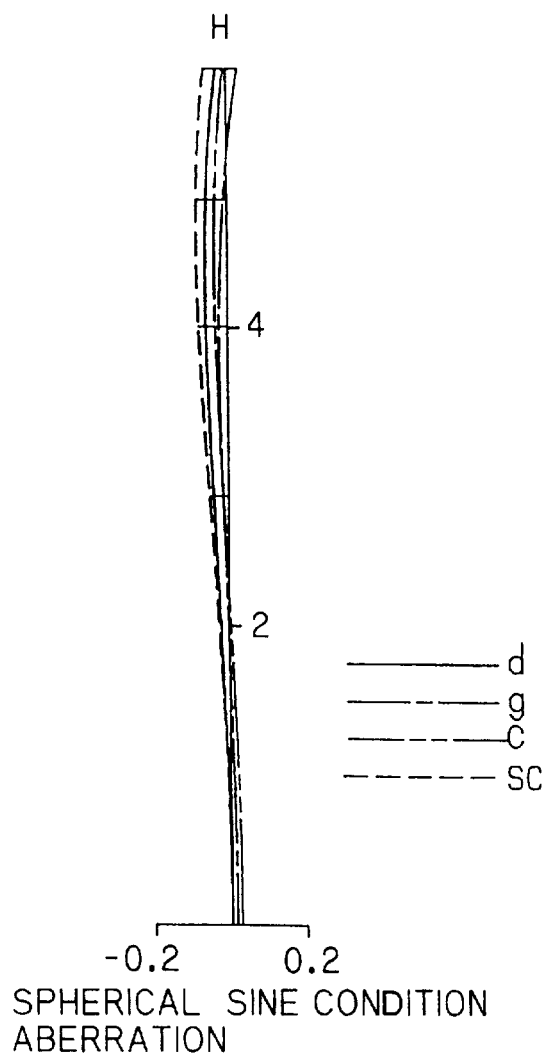
FIGS. 20A to 20D are aberration diagrams obtained at the middle in Example 3.
Figure 20B:
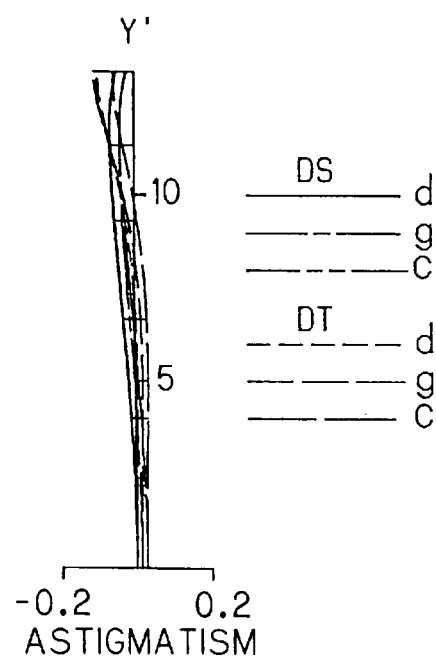
Figure 20C:
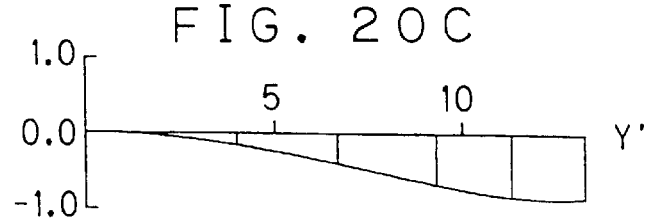
Figure 20D:
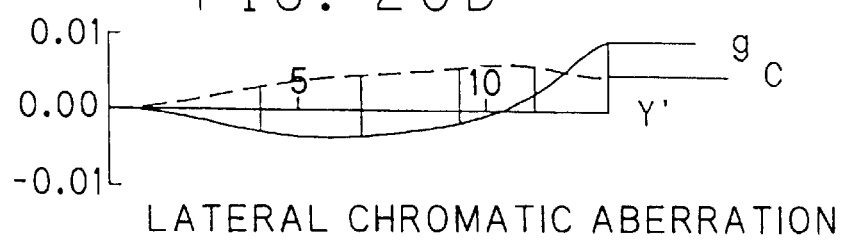
Figure 21A:
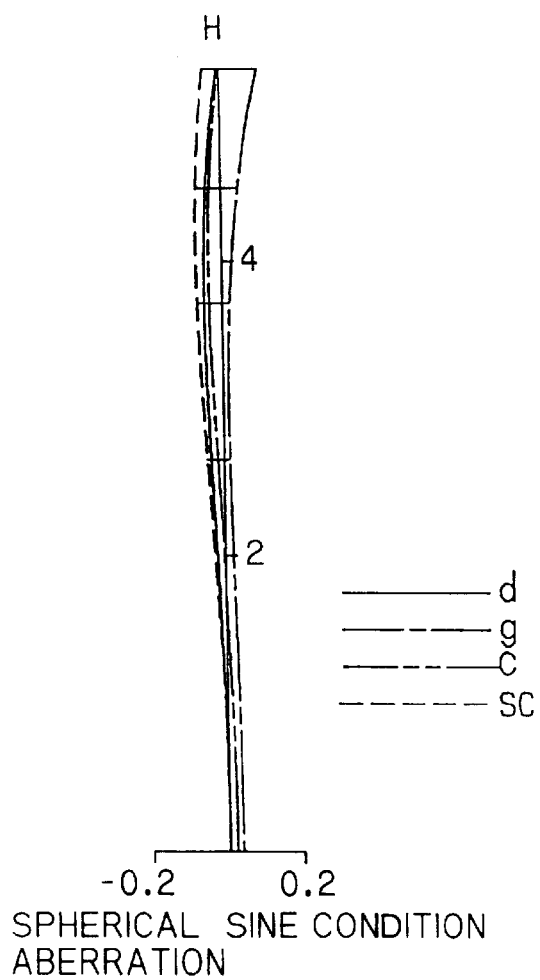
FIGS. 21A to 21D are aberration diagrams obtained at the wide-angle end in Example 3.
Figure 21B:
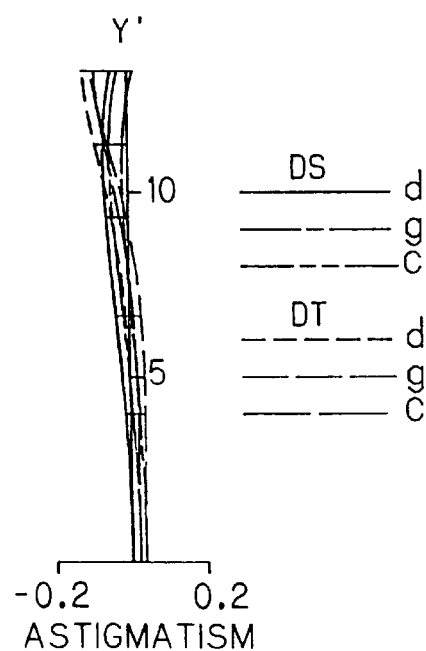
Figure 21C:
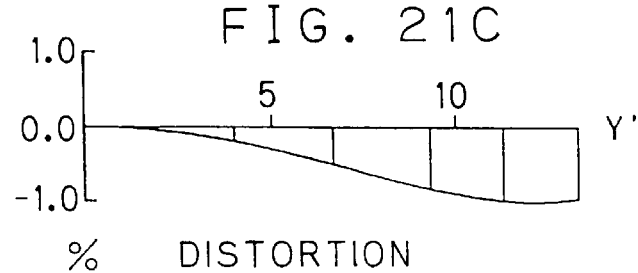
Figure 21D:
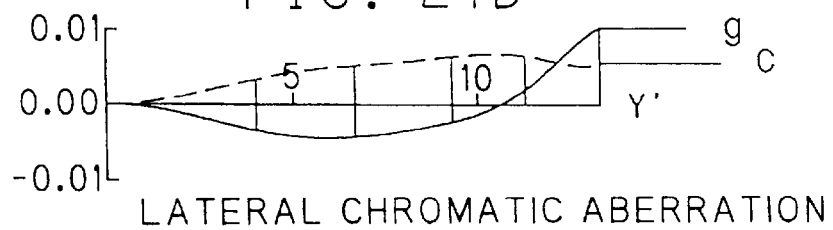
Figure 22A:
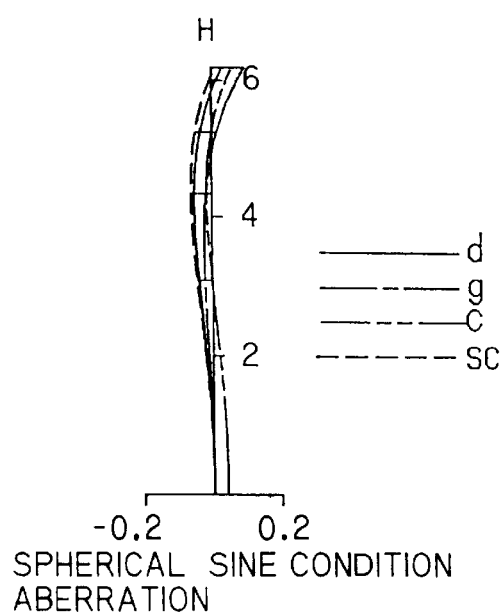
FIGS. 22A to 22D are aberration diagrams obtained at the telephoto end in Example 4.
Figure 22B:
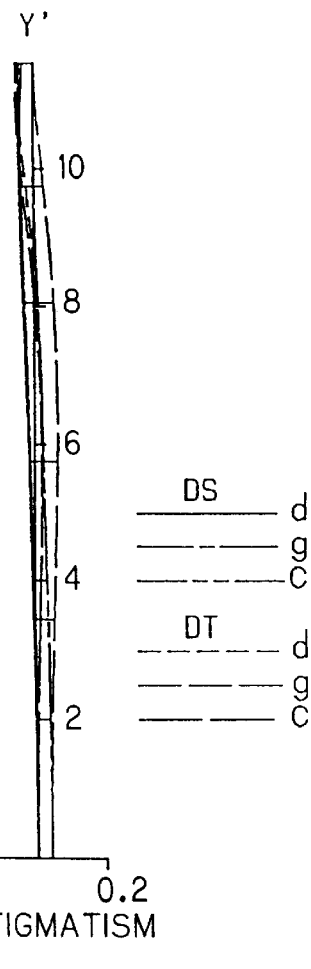
Figure 22C:
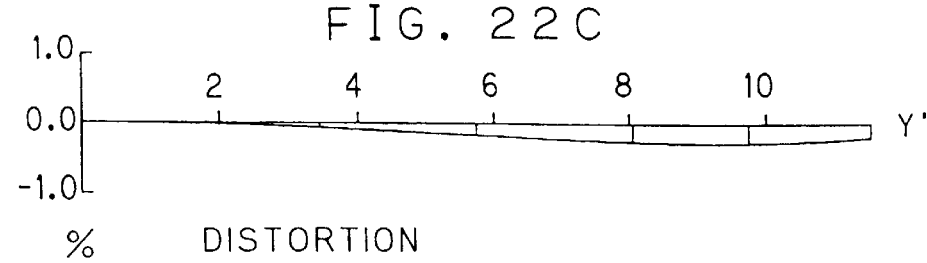
Figure 22D:
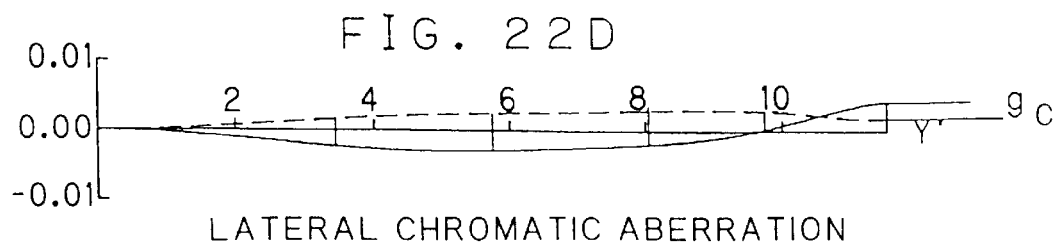
Figure 23A:
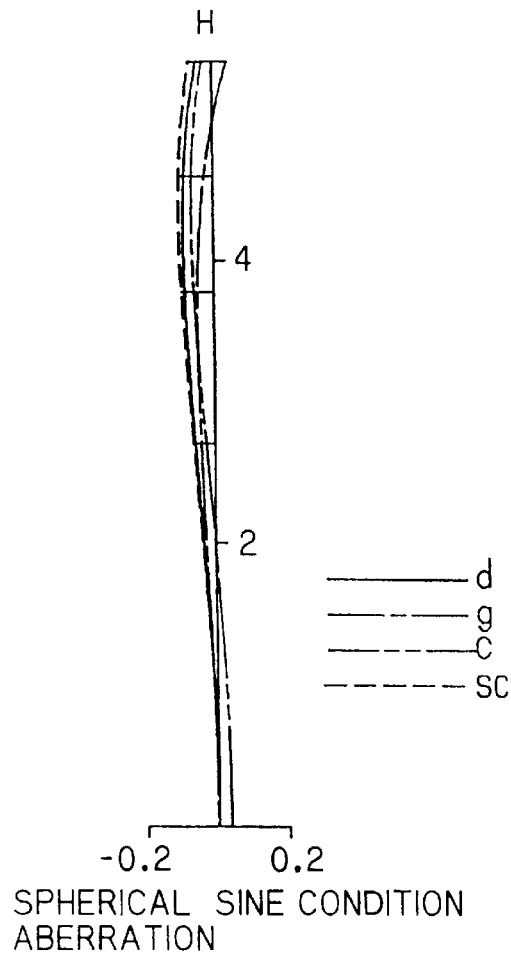
FIGS. 23A to 23D are aberration diagrams obtained at the middle in Example 4.
Figure 23B:
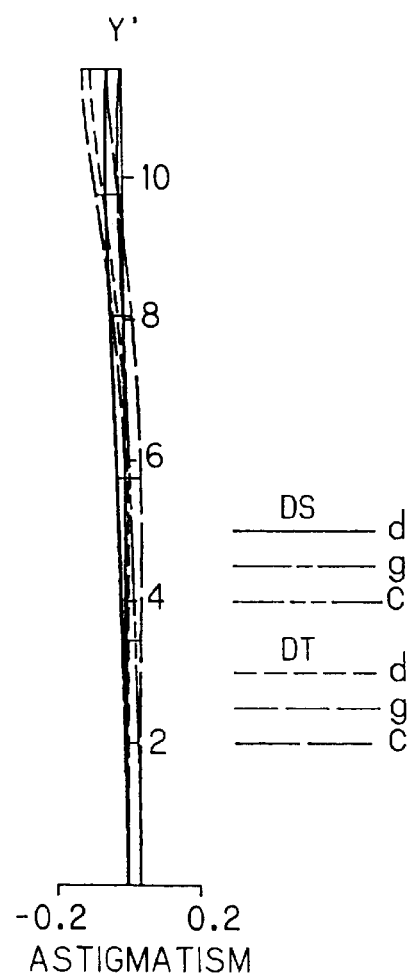
Figure 23C:
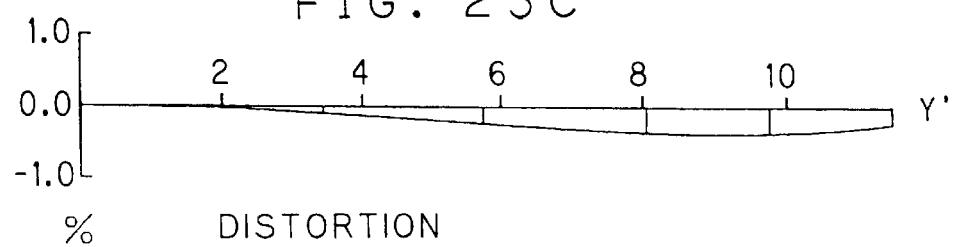
Figure 23D:
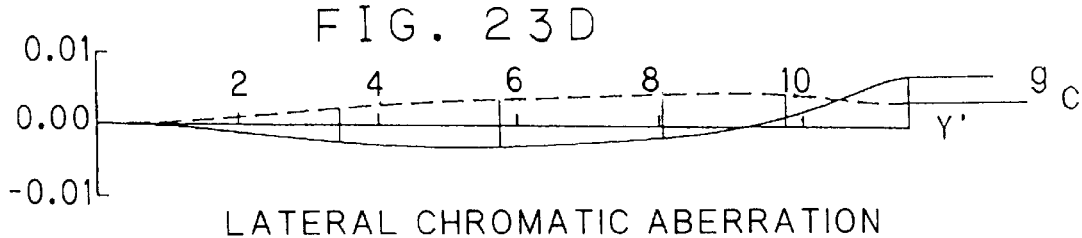
Figure 24A:
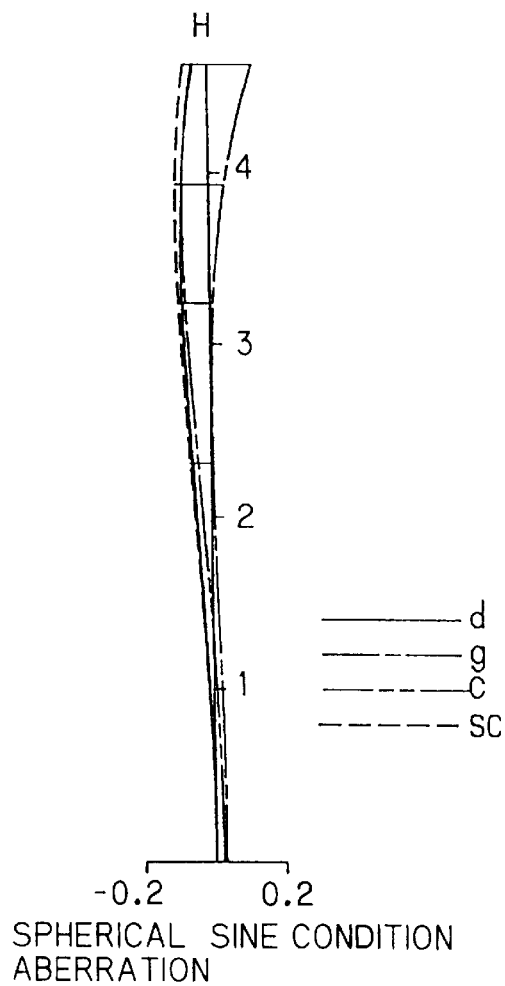
FIGS. 24A to 24D are aberration diagrams obtained at the wide-angle end in Example 4.
Figure 24B:
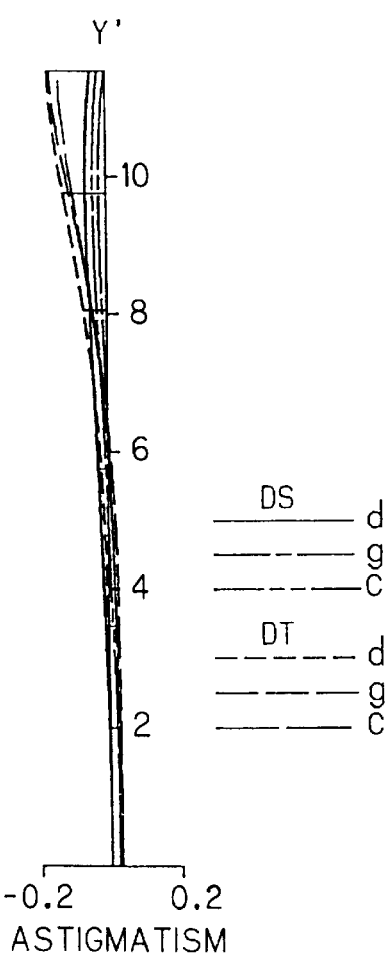
Figure 24C:
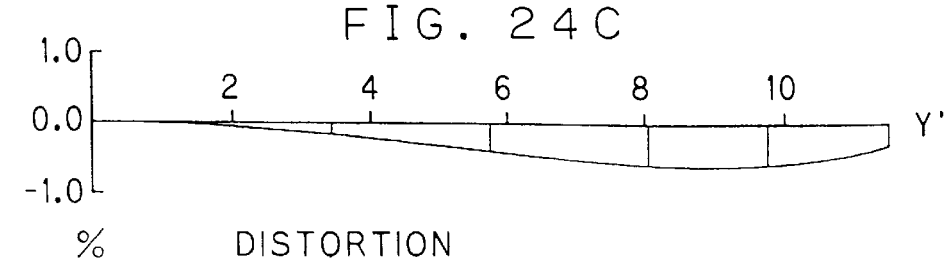
Figure 24D:
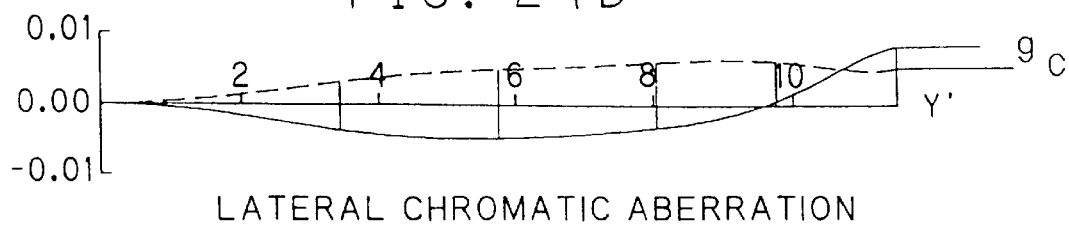
Figure 25A:
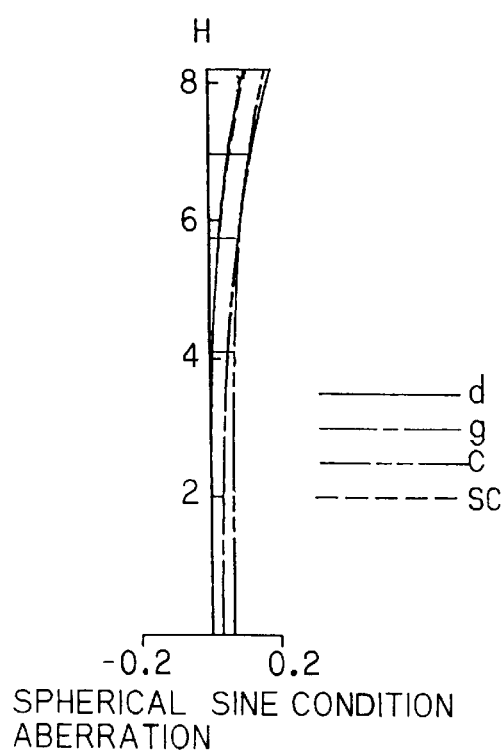
FIGS. 25A to 25D are aberration diagrams obtained at the telephoto end in Example 5.
Figure 25B:
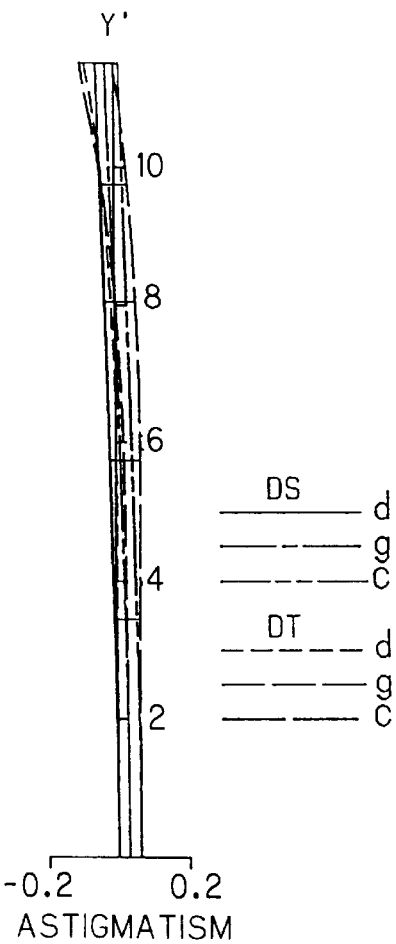
Figure 25C:
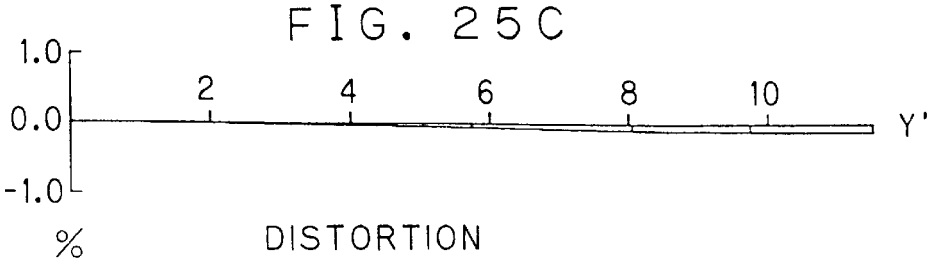
Figure 25D:
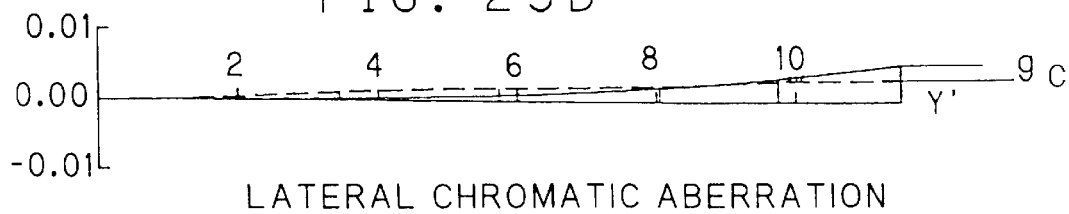
Figure 28A:
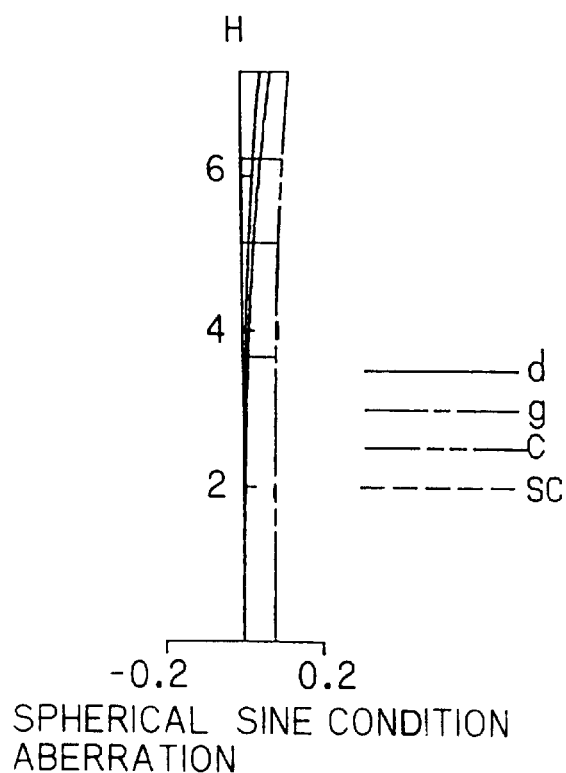
FIGS. 28A to 28D are aberration diagrams obtained at the telephoto end in Example 6.
Figure 28B:
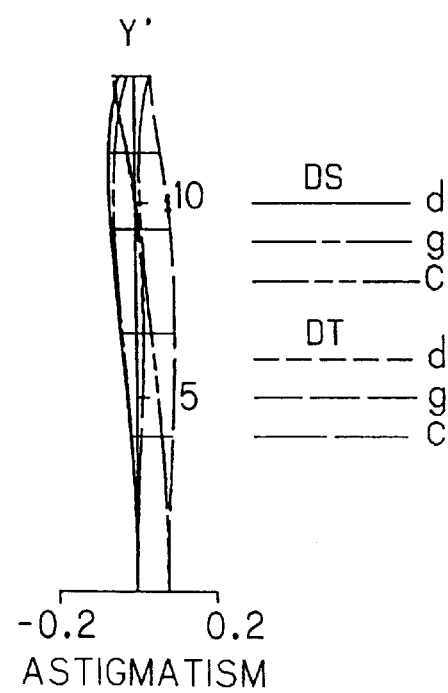
Figure 28C:
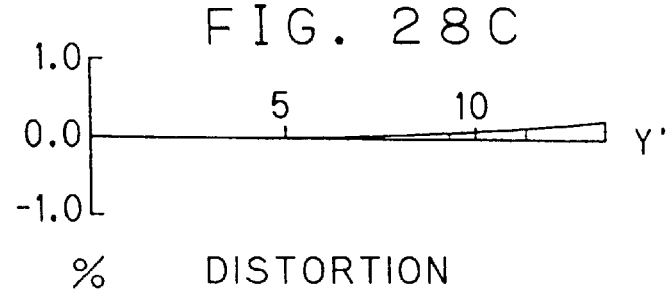
Figure 28D:
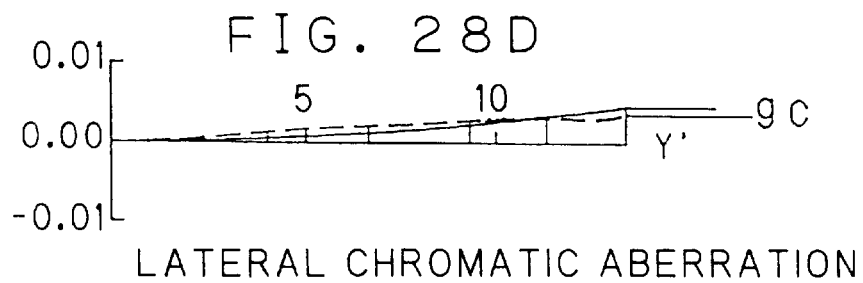
Figure 29A:
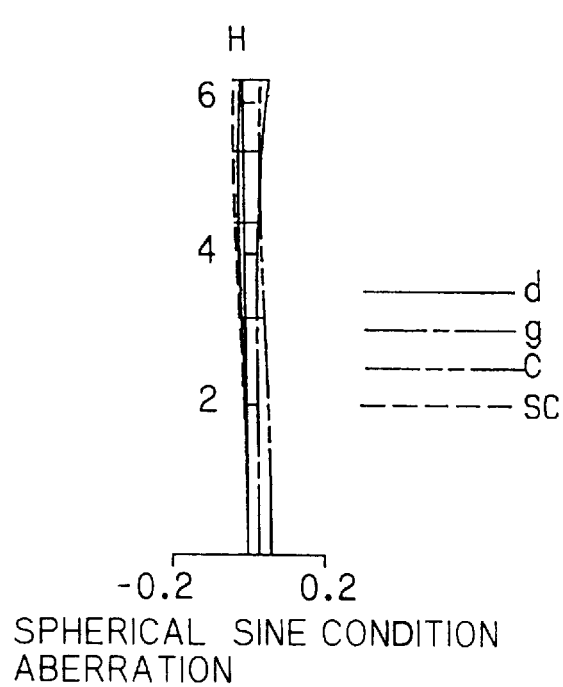
FIGS. 29A to 29D are aberration diagrams obtained at the middle in Example 6.
Figure 29B:
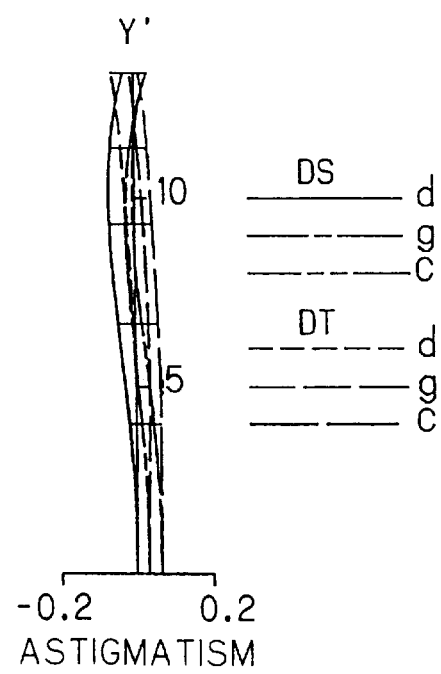
Figure 29C:
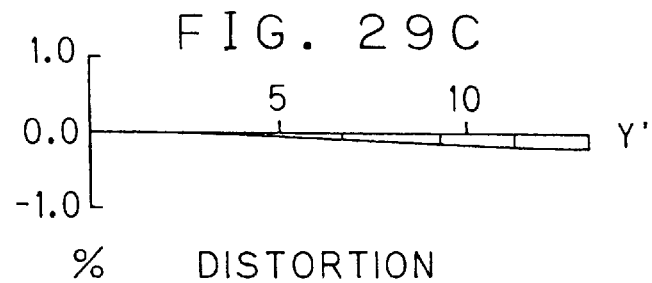
Figure 29D:
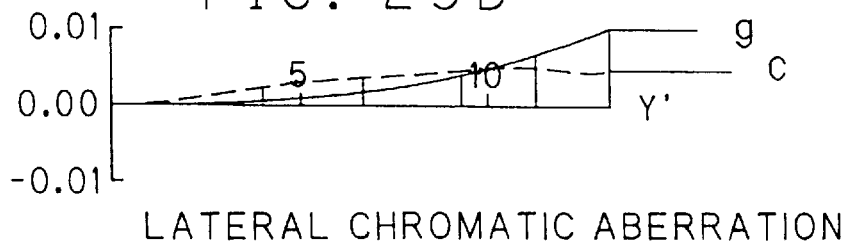
Figure 30A:
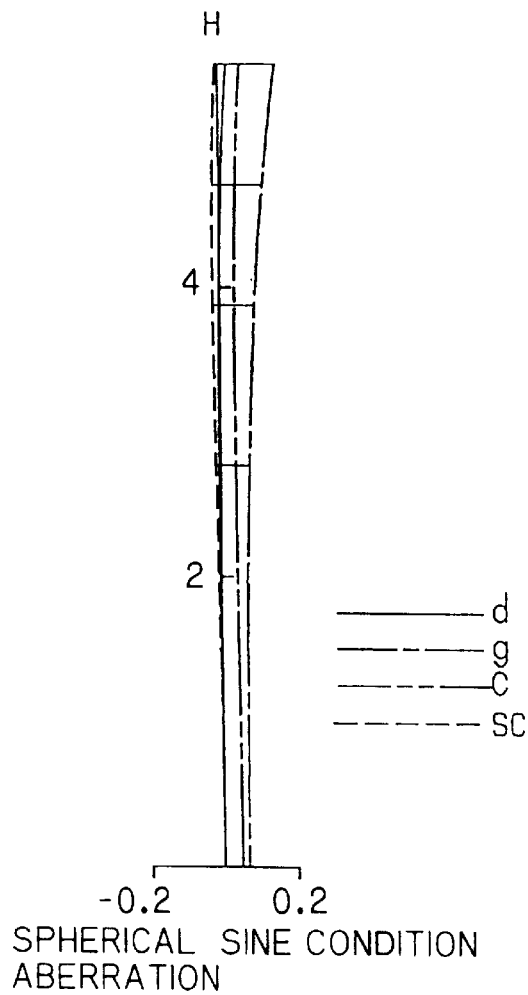
FIGS. 30A to 30D are aberration diagrams obtained at the wide-angle end in Example 6.
Figure 30B:
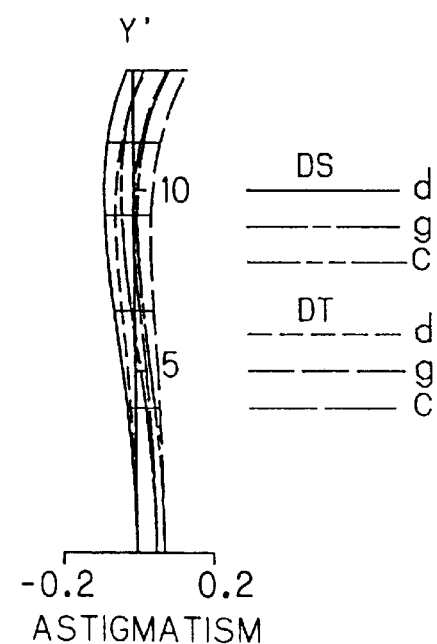
Figure 30C:
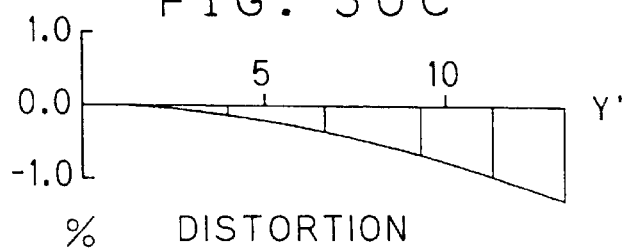
Figure 30D:
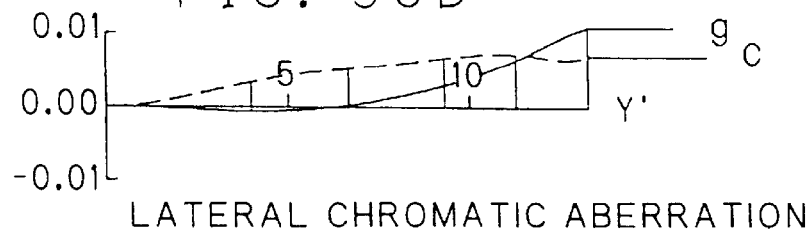
Figure 31A:
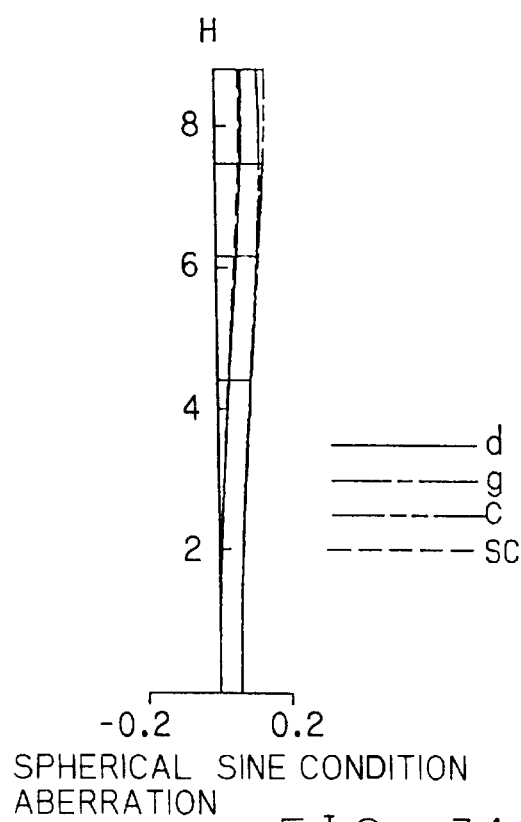
FIGS. 31A to 31D are aberration diagrams obtained at the telephoto end in Example 7.
Figure 31B:
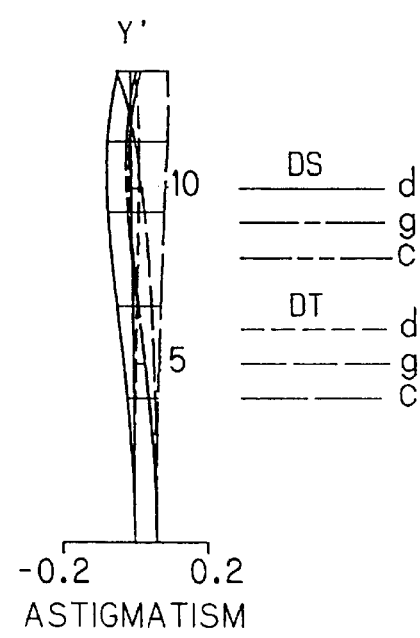
Figure 31C:
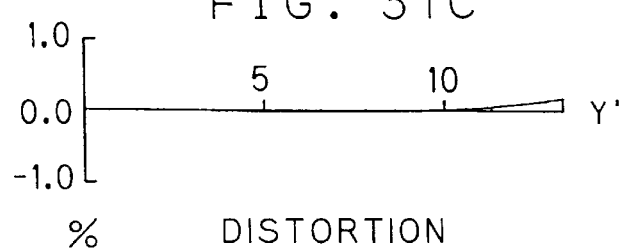
Figure 31D:
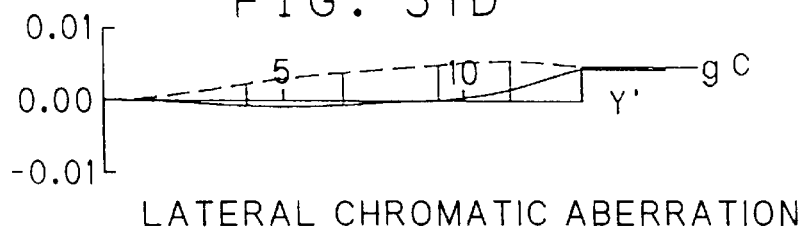
Figure 32A:
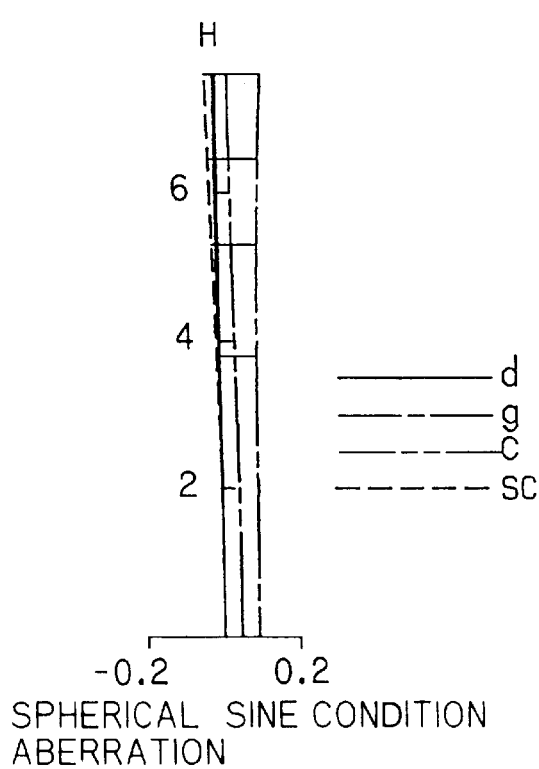
FIGS. 32A to 32D are aberration diagrams obtained at the middle in Example 7.
Figure 32B:
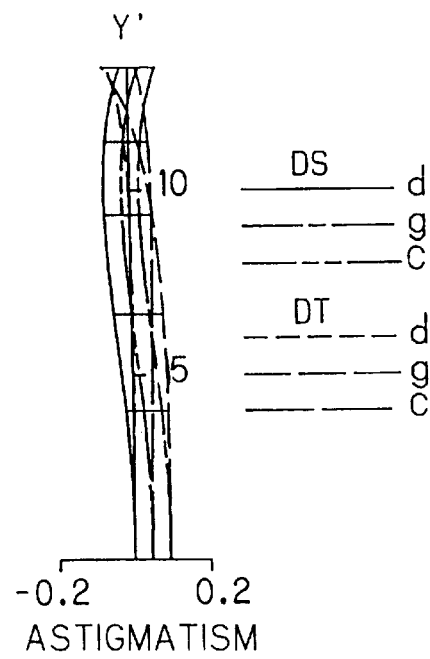
Figure 32C:
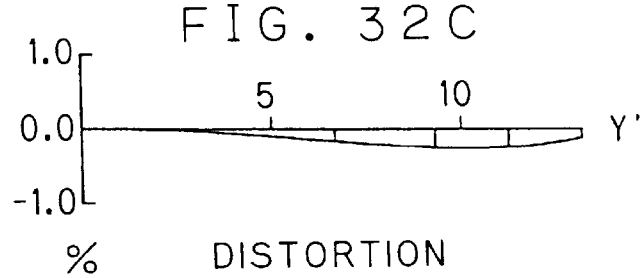
Figure 32D:
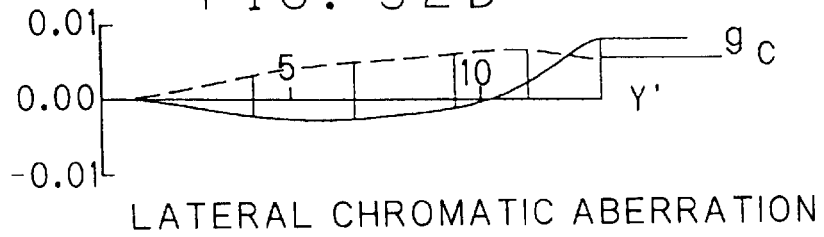
Figure 35A:
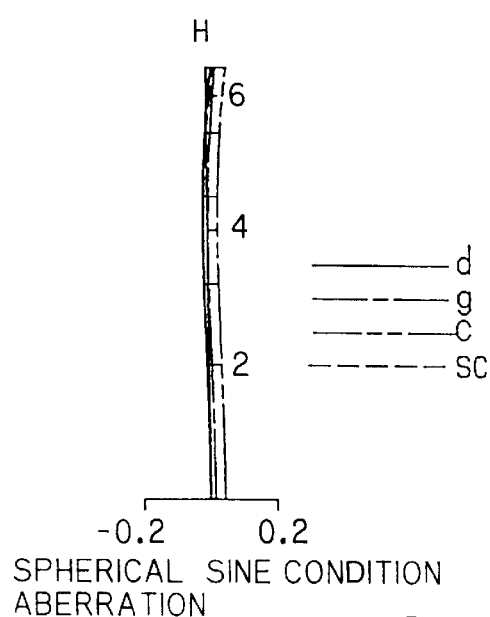
FIGS. 35A to 35D are aberration diagrams obtained at the middle in Example 8.
Figure 35B:
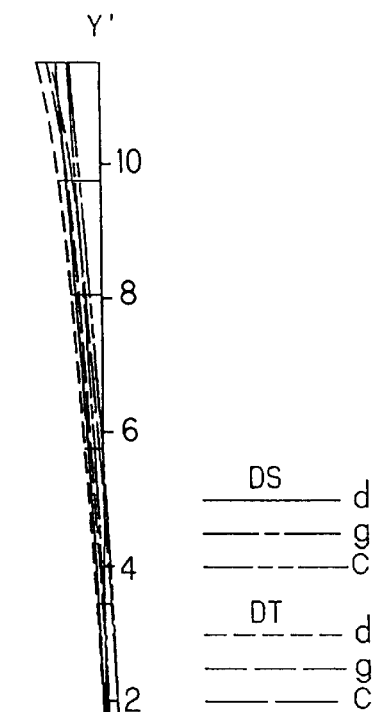
Figure 35C:
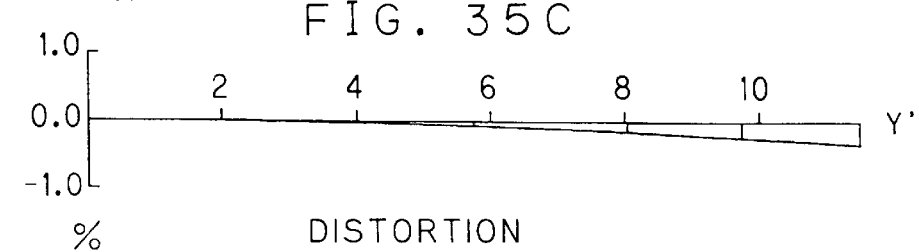
Figure 35D:
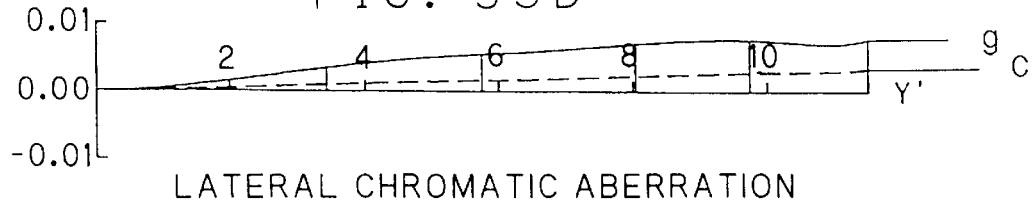
Figure 36A:
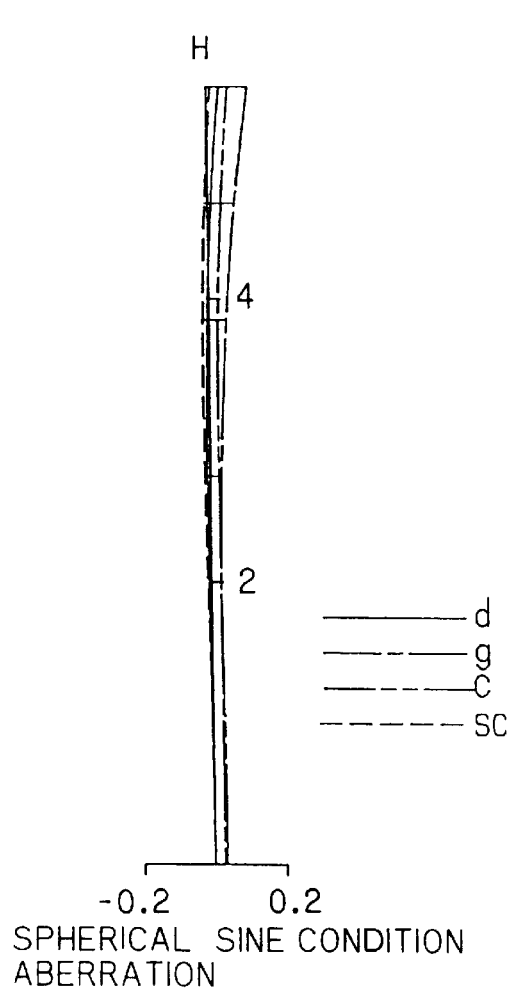
FIGS. 36A to 36D are aberration diagrams obtained at the wide-angle end in Example 8.
Figure 36B:
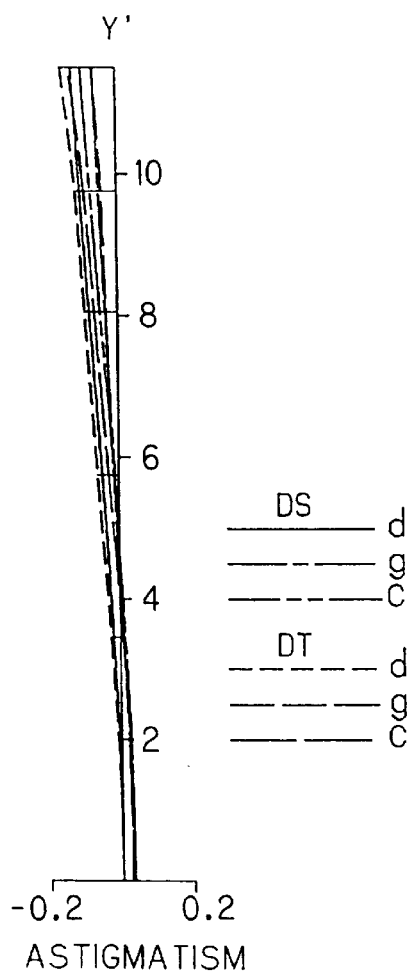
Figure 36C:
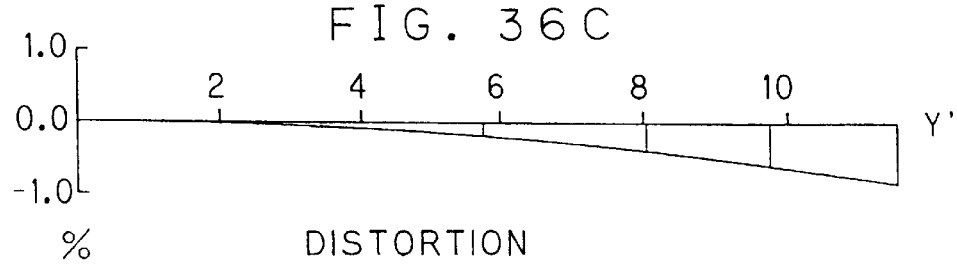
Figure 36D:
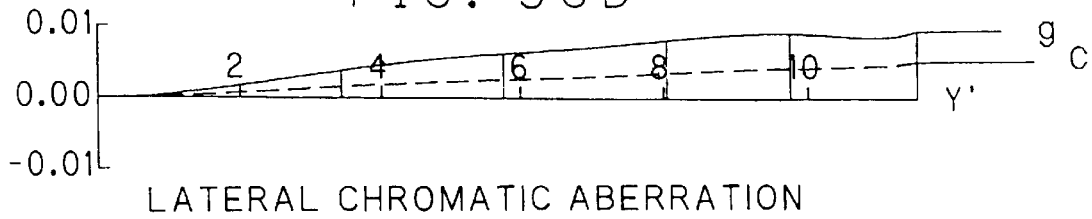
Figure 37A:
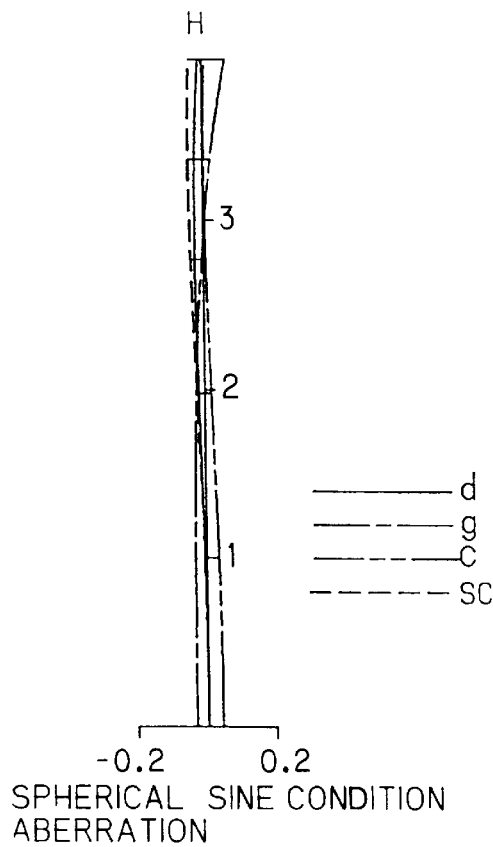
FIGS. 37A to 37D are aberration diagrams obtained at the telephoto end in Example 9.
Figure 37B:
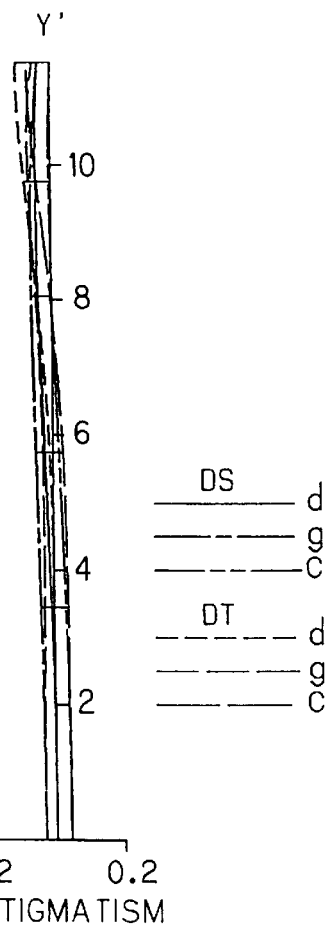
Figure 37C:
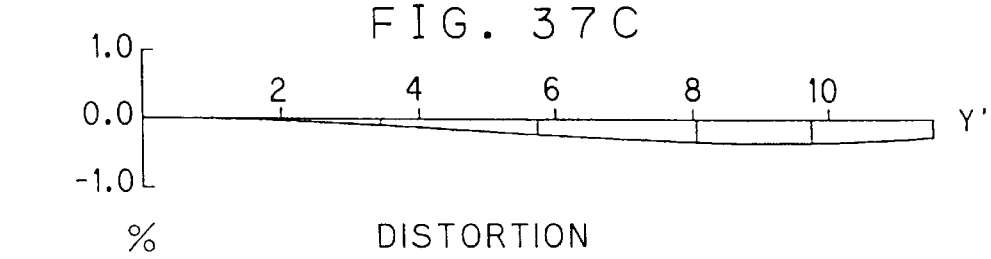
Figure 37D:
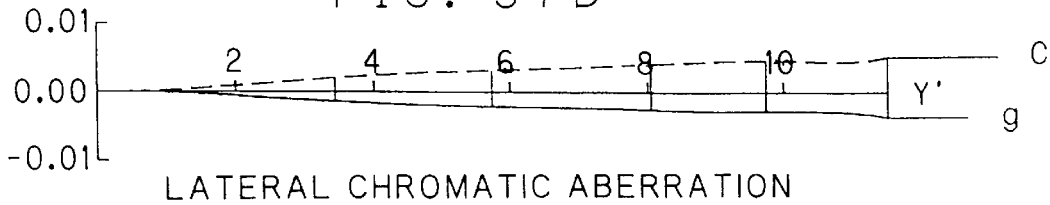
Figure 38A:
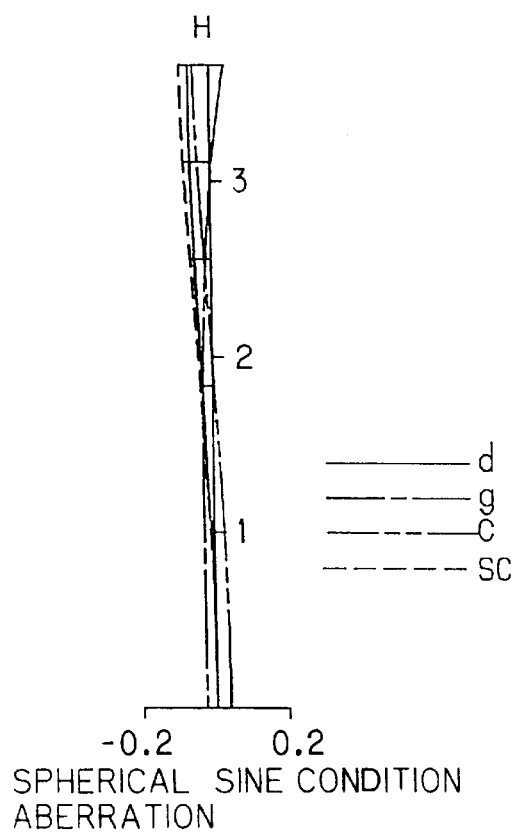
FIGS. 38A to 38D are aberration diagrams obtained at the middle in Example 9.
Figure 38B:
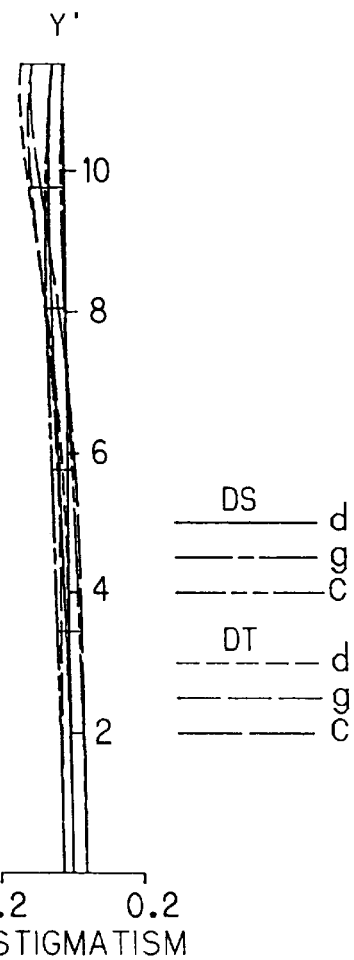
Figure 38C:
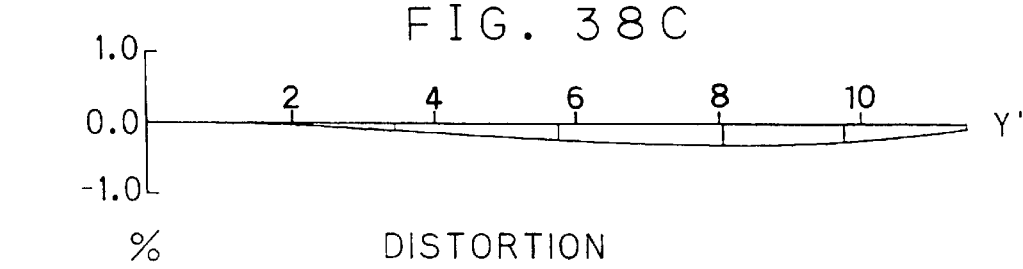
Figure 38D:
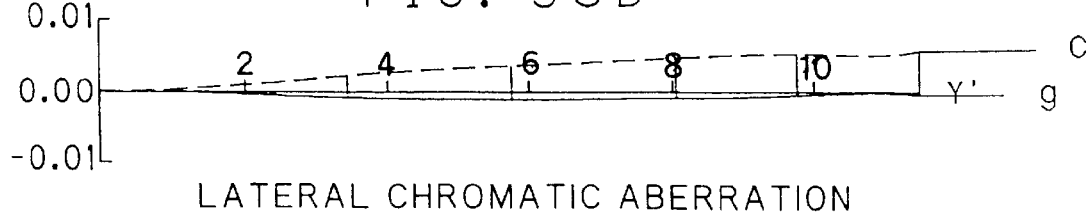
Figure 40A:
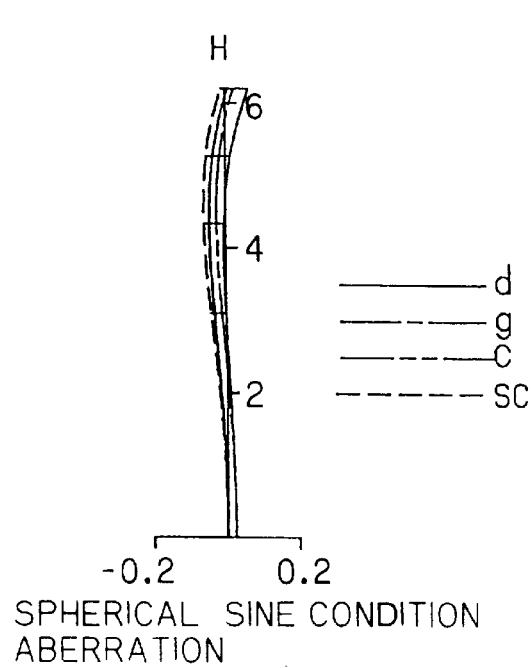
FIGS. 40A to 40D are aberration diagrams obtained at the telephoto end in Example 10.
Figure 40B:
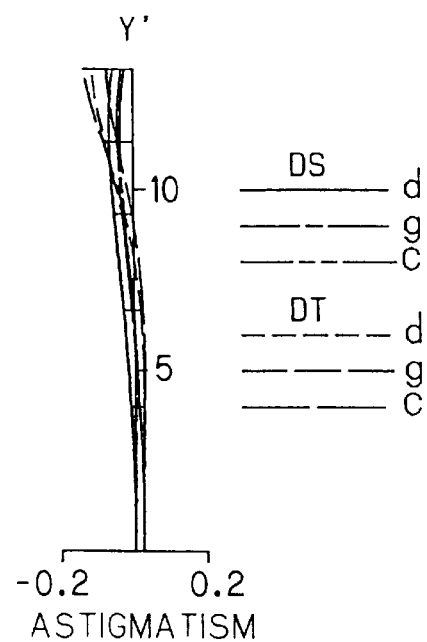
Figure 40C:
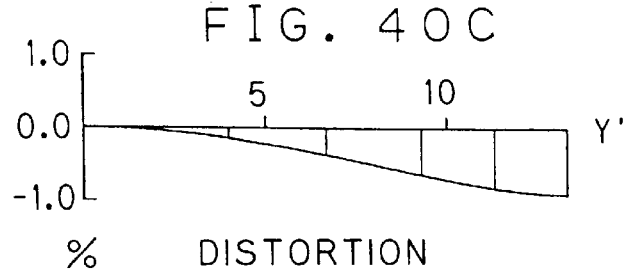
Figure 40D:
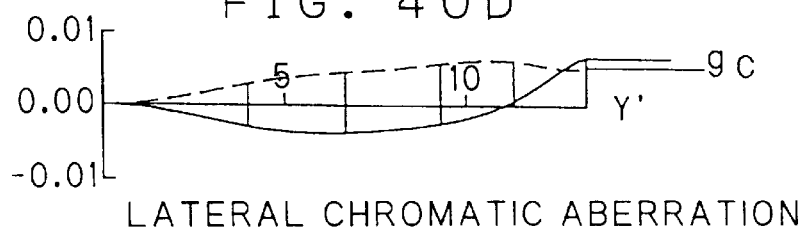
Figure 41A:
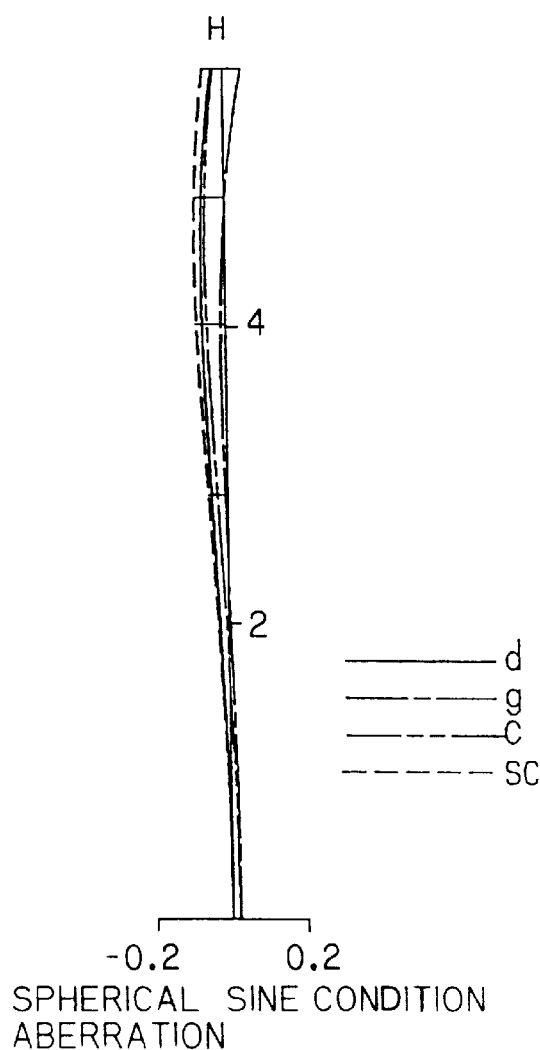
FIGS. 41A to 41D are aberration diagrams obtained at the middle in Example 10.
Figure 41B:
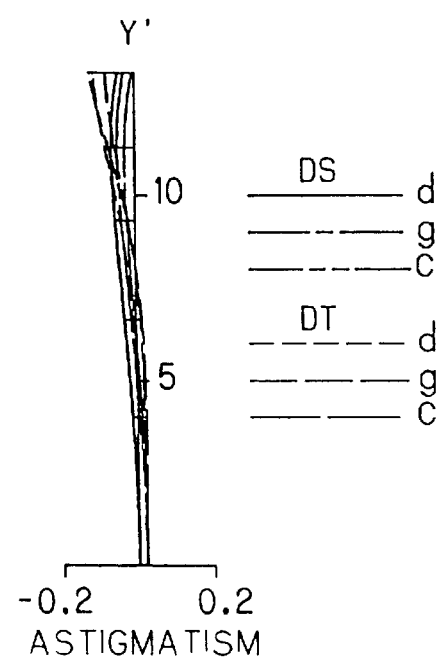
Figure 41C:
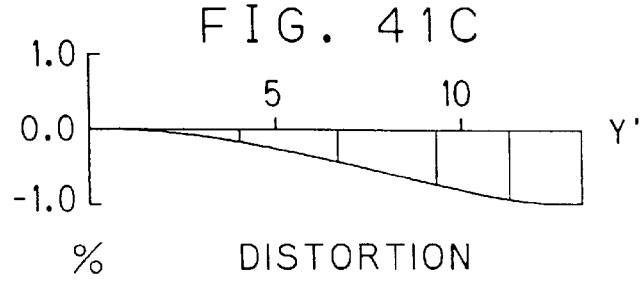
Figure 41D:
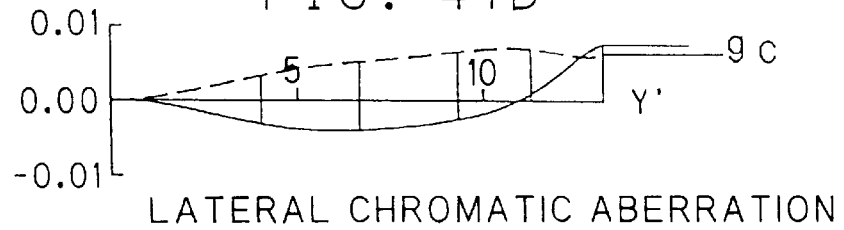
Figure 42A:
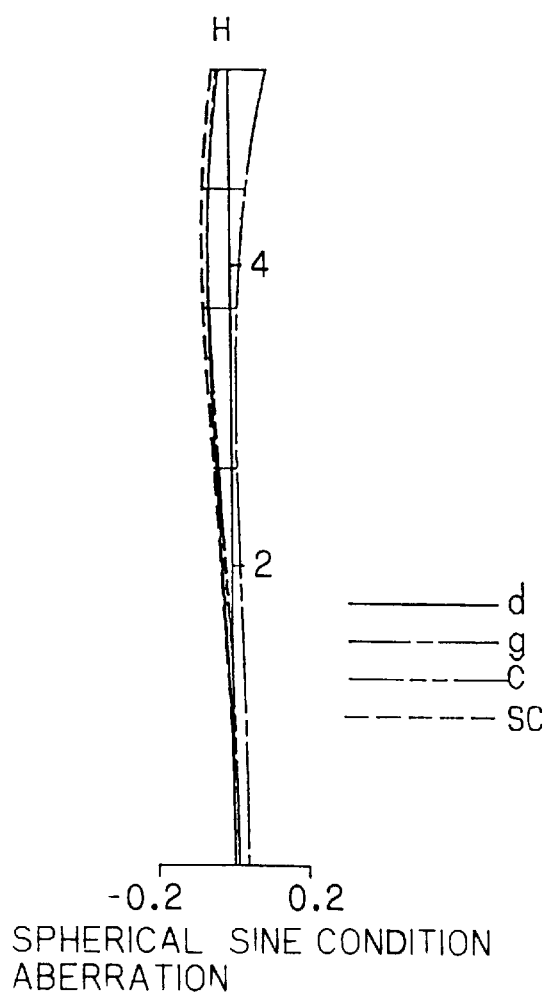
FIGS. 42A to 42D are aberration diagrams obtained at the wide-angle end in Example 10.
Figure 42B:
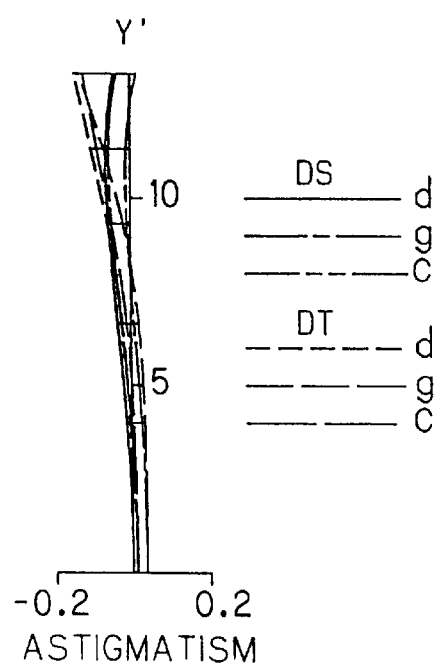
Figure 42C:
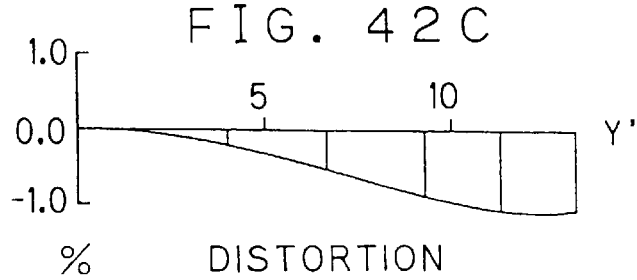
Figure 42D:
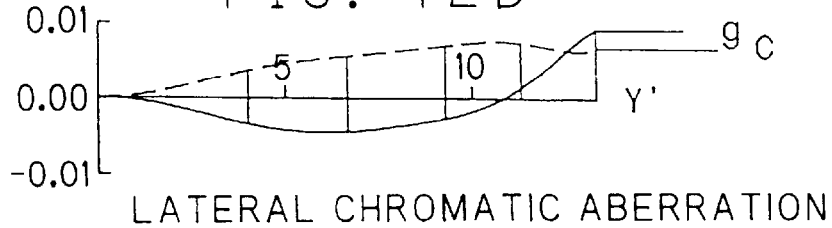
Figure 43A:
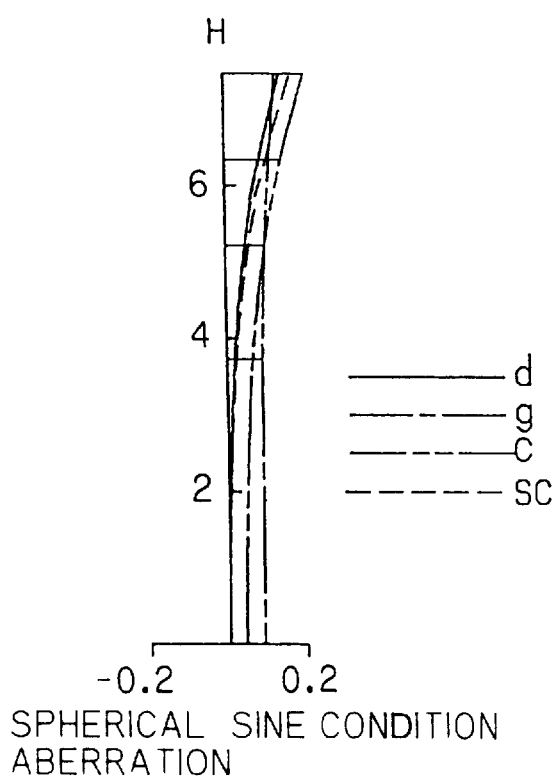
FIGS. 43A to 43D are aberration diagrams obtained at the telephoto end in Example 11.
Figure 43B:
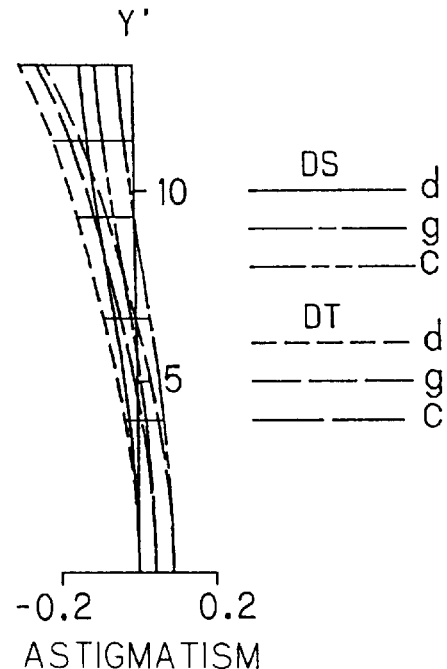
Figure 43C:
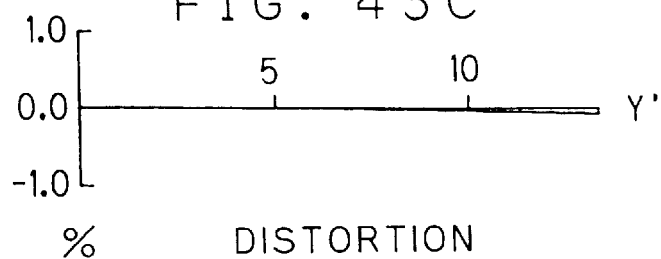
Figure 43D:
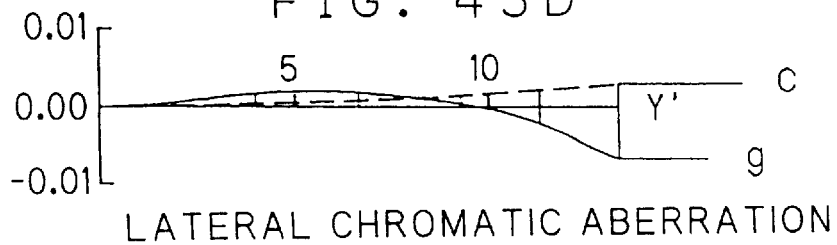
Figure 45A:
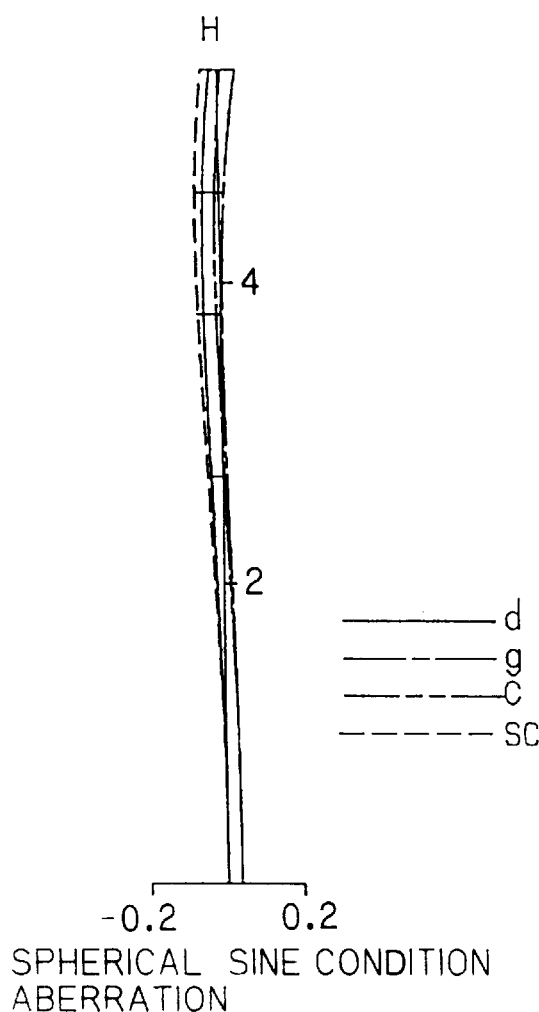
FIGS. 45A to 45D are aberration diagrams obtained at the wide-angle end in Example 11.
Figure 45B:
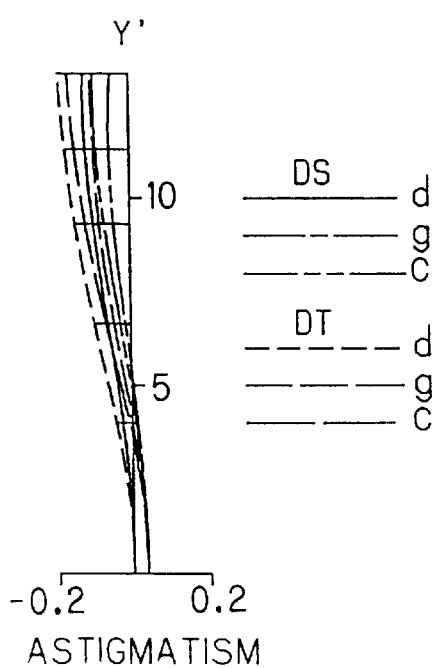
Figure 45C:
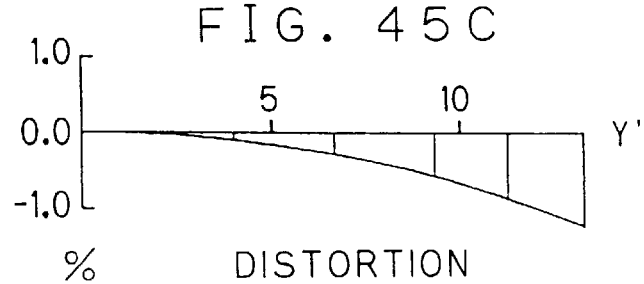
Figure 45D:
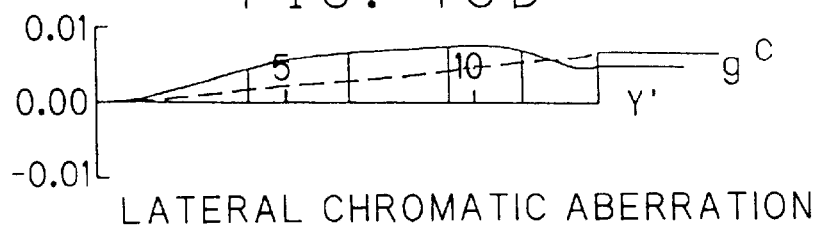
Figure 46A:
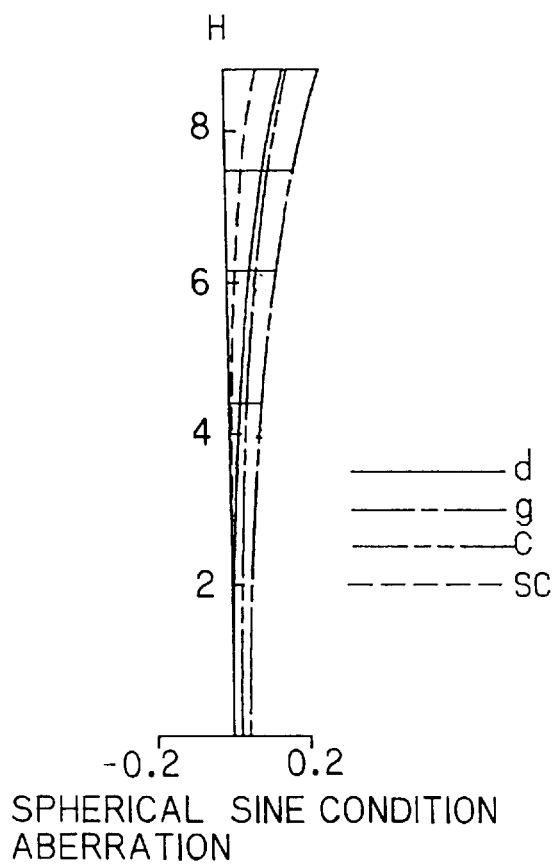
FIGS. 46A to 46D are aberration diagrams obtained at the telephoto end in Example 12.
Figure 46B:
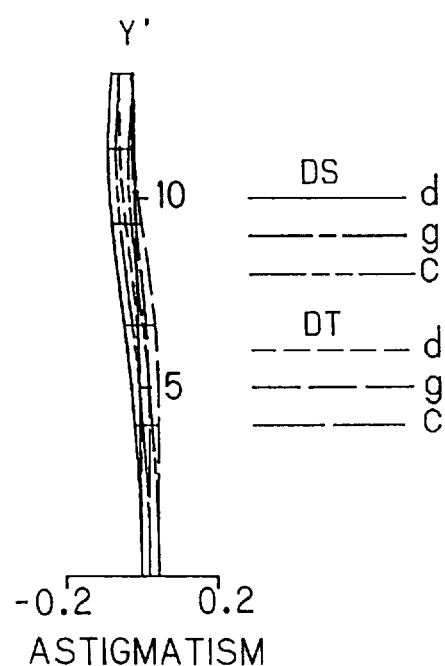
Figure 46C:
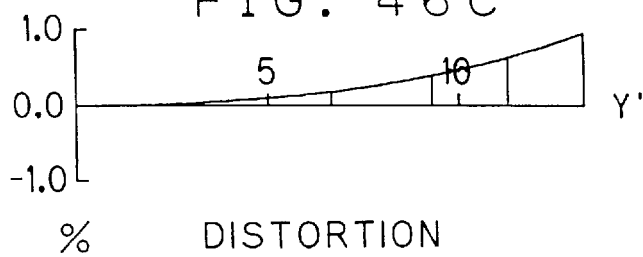
Figure 46D:
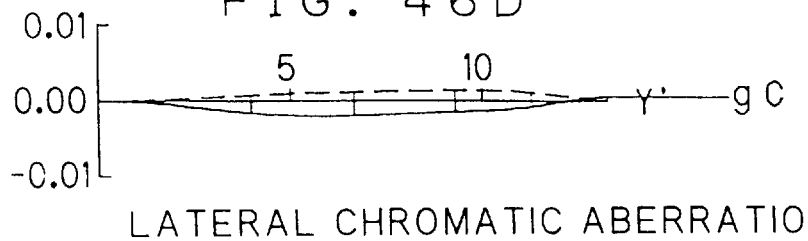
Figure 47A:
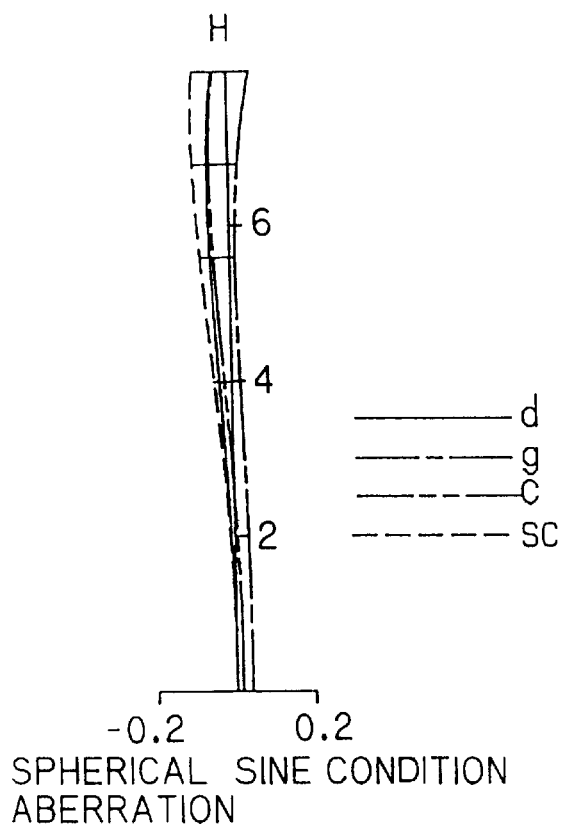
FIGS. 47A to 47D are aberration diagrams obtained at the middle in Example 12.
Figure 47B:
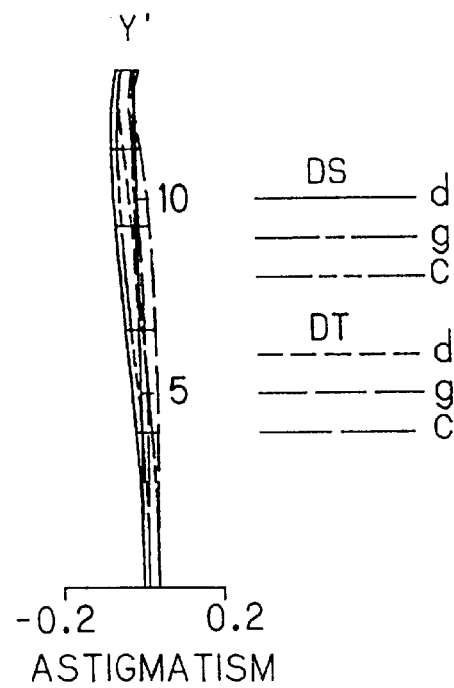
Figure 47C:
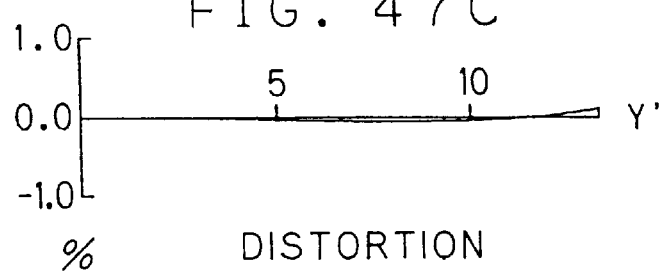
Figure 47D:
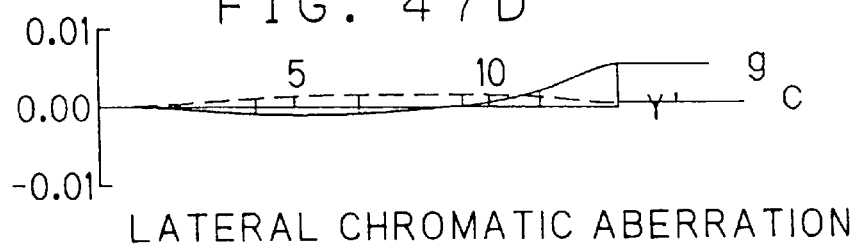
Figure 48A:
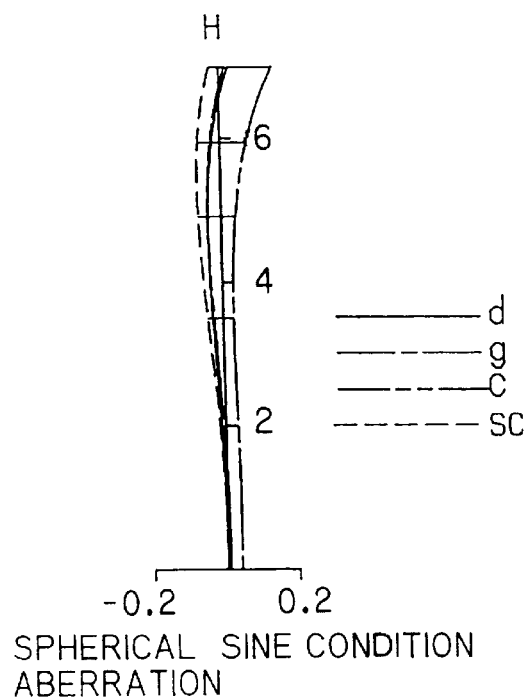
FIGS. 48A to 48D are aberration diagrams obtained at the wide-angle end in Example 12.
Figure 48B:
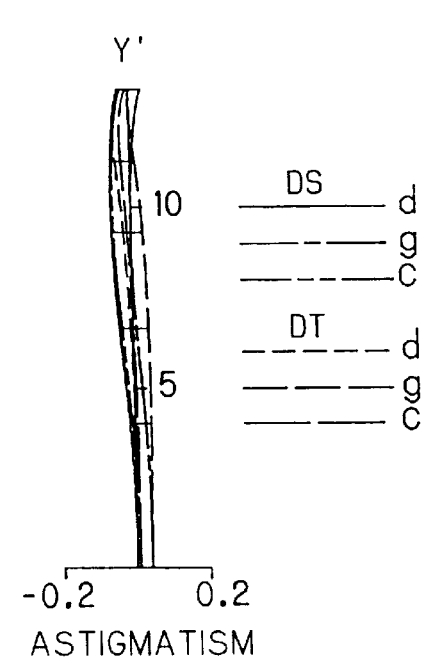
Figure 48C:
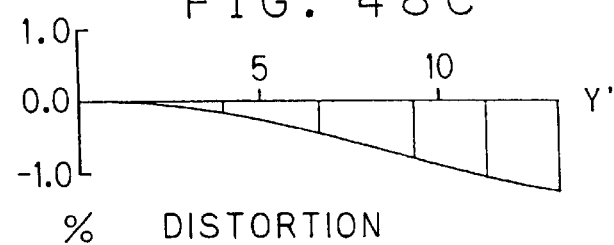
Figure 48D:
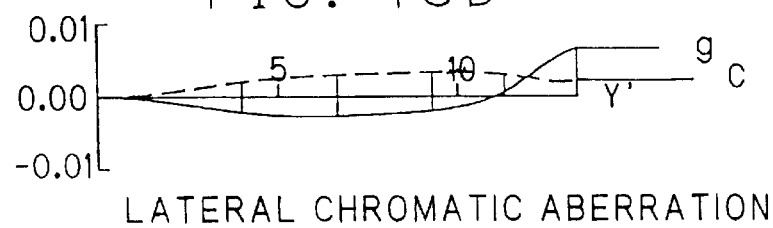

With respect to the correction of various aberrations such as distortion and lateral chromatic aberration, it is preferable that the first lens unit (Gr1) include at least one aspherical surface on a negative lens element (FIGS. 6, 8, and 11), and it is preferable that the fourth lens unit (Gr4) include at least one aspherical surface (FIG. 8). The use of one or more aspherical surfaces makes it possible to correct various aberrations satisfactorily with a small number of lens elements.

In all embodiments, only refractive lens elements are used that deflect the light incident thereon by the action of refraction (i.e. lens elements of the type in which light deflects at the interface between two media having different refractive indices), that is, the optical power of each lens unit is derived from the refractive powers of the lens elements constituting it. However, the present invention is not confined to these specific constructions. For example, it is also possible to use diffractive lens elements that deflect incident light by the action of diffraction, or refractive/diffractive hybrid lens elements that deflect incident light by the combined action of diffraction and refraction, or gradient index lens elements that deflect incident light by the effect of distribution of varying refractive indices within a medium. Moreover, for more effective correction of aberrations, at least one aspherical surface may be included in each of the lens units (Gr1 to Gr6). Moreover, a surface having no optical power (i.e. a reflective, refractive, or diffractive surface) may be arranged in the optical path to turn the optical path in front of, behind, or in the middle of the zoom lens system. Where to turn the optical path may be determined as required. By turning the optical path appropriately, it is possible to achieve miniaturization and slimming-down of projecting apparatus.

EXAMPLES

Hereinafter, practical examples of zoom lens systems embodying the present invention will be presented with reference to their construction data and other data. Examples 1 to 12 presented below respectively correspond to the first the twelfth embodiments described earlier, and the lens constriction diagrams (FIGS. 1 to 12) showing the first to twelfth embodiments respectively show the lens constructions of the corresponding Examples 1 to 12 as well.

Tables 2 to 13 respectively show the construction data of Examples 1 to 12. In the construction data of each example, $ri$ ($i=1, 2, 3, \ldots$) represents the radius of curvature (mm) of the i-th surface as counted from the enlargement side, di ($i=1, 2, 3, \ldots$) represents the i-th axial distance (mm) as counted from the enragement side, and Ni ($i=1, 2, 3, \ldots$) and vi ($i=1, 2, 3, \ldots$) respectively represent the refractive index (Nd) for the d-line and the Abbe number (vd) of the i-th optical element as counted from the enlargement side. A surface of which the radius of curvature ri is marked with an asterisk (*) is an aspherical surface, of which the surface shape is defined by formula (AS) shown below. Moreover, in the construction data, for each of those axial distances which vary with zooming, three values are given, which are the axial distance observed at the telephoto end (longest-focal-length end, T), that observed at the middle (middle-focal-length point, M), and that observed at the wide-angle end (shortest-focal-length end, W). Listed together are, for each of the three focal-length points (T, M, and W) mentioned just above, the focal length (f, mm) of the zoom lens system as a whole, the distance (S', mm) from the reduction-side surface of the plane parallel plate (P2) to the display surface (for example, the display surface of a DMD), the f-number (FNO), and the angle of view (2ω, °). Also listed together are the aspherical surface data of each aspherical surface. Tables 14 to 18 show the values of the conditional formulae as actually observed in each example and data related thereto. It is to be noted that, in all the examples, the projection distance=∞ (infinite).

$$X(H) = (C \cdot H^2)/(1 + \sqrt{1 - \varepsilon \cdot C^2 \cdot H^2}) + (A4 \cdot H^4 + A6 \cdot H^6 + A8 \cdot H^8) \quad \text{(AS)}$$

where

X(H) represents the displacement along the optical axis (AX) at the height H (relative to the vertex);

H represents the height in a direction perpendicular to the optical axis (AX),

C represents the paraxial curvature (=the reciprocal of the radius of curvature);

$\varepsilon$ represents the quadric surface parameter; and

Ai represents the aspherical surface coefficient of i-th order (i=4, 6, 8).

FIGS. 13A to 15D, 16A to 18D, 19A to 21D, 22A to 24D, 25A to 27D, 28A to 30D, 31A to 33D, 34A to 36D, 37A to 39D, 40A to 42D, 43A to 45D, and 46A to 48D are aberration diagrams obtained in Examples 1 to 12, respectively. Of these aberration diagrams, FIGS. 13A to 13D, 16A to 16D, 19A to 19D, 22A to 22D, 25A to 25D, 28A to 28D, 31A to 31D, 34A to 34D, 37A to 37D, 40A to 40D, 43A to 43D, and 46A to 46D are aberration diagram obtained at the telephoto end (T), FIGS. 14A to 14D, 17A to 17D, 20A to 20D, 23A to 23D, 26A to 26D, 29A to 29D, 32A to 32D, 35A to 35D, 38A to 38D, 41A to 41D, 44A to 44D, and 47A to 47D are aberration diagram obtained at the middle (M), and FIGS. 15A to 15D, 18A to 18D, 21A to 21D, 24A to 24D, 27A to 27D, 30A to 30D, 33A to 33D, 36A to 36D, 39A to 39D, 42A to 42D, 45A to 45D, and 48A to 48D are aberration diagram obtained at the wide-angle end (W). These aberration diagrams show various aberrations observed at the reduction end of the zoom lens systems with respect to an object at infinity, specifically spherical aberration and sine condition (mm) (in diagrams whose number ends with "A"), astigmatism (mm) (in diagrams whose number ends with "B"), distortion (%) (in diagrams whose number ends with "C"), and lateral chromatic aberration (mm) (in diagrams whose number ends with "D"). In these diagrams, H represents the incident height (mm), and Y' represents the image height (mm). In the diagrams showing spherical aberration, the solid, dash-and-dot, and dash-dot-dot lines represent the spherical aberration for the d-, g-, and C-lines, respectively, and the broken line represents sine condition (SC). In the diagrams showing astigmatism, the solid, dash-and-dot, and dash-dot-dot lines represent the astigmatism for the d-, g-, and C-lines, respectively, on the sagittal plane (DS), and the broken lines with different stroke lengths represent, in order of increasing length, the astigmatism for the d-, g-, and C-lines, respectively, on the tangential plane (DT). In the diagrams showing lateral chromatic aberration, the solid and broken lines represent the lateral chromatic aberration for the g- and C-lines, respectively.

In reality, when the zoom lens system of any of these examples is used in a projecting apparatus (for example, a projector employing a DMD), the screen surface (the surface onto which an image is projected) is the image plane and the display device surface (for example, the display surface of the DMD) is the object plane. Here, however, the zoom lens systems of these examples are all assumed to be designed as reduction optical systems in optical terms, and their optical performance is evaluated on the display device surface, with the screen surface regarded as the object plane.

As described above, according to the present invention, in a six-unit zoom lens system composed of a negative, a positive, a positive, a negative, a positive or negative, and a positive lens unit, it is possible to appropriately determine which lens units to move for zooming and how optical powers are distributed among the lens units. In this way, it is possible to realize a compact zoom lens system having a long back focal length and satisfactorily corrected for various aberrations. When used in a projecting apparatus employing a DMD, a zoom lens system embodying the present invention not only helps miniaturize the projecting apparatus and enhance the performance thereof, but also makes it possible to project high-quality images.

TABLE 1

Distribution of Optical Powers Among Lens Units

| FIG. | 1st Lens Unit | 2nd Lens Unit | 3rd Lens Unit | 4th Lens Unit | 5th Lens Unit | 6th Lens Unit |
|---|---|---|---|---|---|---|
| 1 | [Negative] | Positive | Positive | [Negative] | Positive | [Positive] |
| 2 | [Negative] | Positive | Positive | [Negative] | Positive | [Positive] |
| 3 | [Negative] | Positive | Positive | [Negative] | Negative | [Positive] |
| 4 | [Negative] | Positive | Positive | [Negative] | Negative | [Positive] |
| 5 | [Negative] | Positive | Positive | [Negative] | Positive | [Positive] |
| 6 | [Negative] | Positive | Positive | Negative | Positive | [Positive] |
| 7 | [Negative] | Positive | Positive | [Negative] | Positive | [Positive] |
| 8 | [Negative] | Positive | Positive | [Negative] | Negative | [Positive] |
| 9 | [Negative] | Positive | Positive | [Negative] | Negative | [Positive] |
| 10 | [Negative] | Positive | Positive | [Negative] | Negative | [Positive] |
| 11 | [Negative] | Positive | Positive | [Negative] | Negative | [Positive] |
| 12 | [Negative] | Positive | Positive | [Negative] | Positive | [Positive] |

TABLE 2

Construction Data of Example 1 f = 43.976(T)~38.250(M)~32.500(W)
S ' = 0.520(T)~0.520(M)~0.520(W)
FNO = 3.00(T)~2.95(M)~2.89(W)
$\omega$ =0 33.6(T)~38.3(M)~44.6(W)

| Radius of Curvature | Axial Distance | Refractive Index | Abbe Number |
|---|---|---|---|
| r1 = 157.440 | d1 = 4.700 | N1 = 1.62041 | v1 = 60.34 |
| r2 = −157.440 | d2 = 0.200 | | |
| r3 = 98.548 | d3 = 2.000 | N2 = 1.62041 | v2 = 60.34 |
| r4 = 27.738 | d4 = 15.300 | | |
| r5 = −27.075 | d5 = 1.600 | N3 = 1.51680 | v3 = 64.20 |
| r6 = 132.895 | d6 = 3.990~6.053~9.148 | | |
| r7 = ∞ | d7 = 6.000 | N4 = 1.77250 | v4 = 49.77 |
| r8 = −25.510 | d8 = 1.600 | N5 = 1.75520 | v5 = 27.53 |
| r9 = 5.607 | d9 = 0.700~2.747~4.128 | | |
| r10 = 44.493 | d10 = 4.600 | N6 = 1.77250 | v6 = 49.77 |
| r11 = 161.152 | d11 = 11.300~7.190~2.714 | | |
| r12 = ∞ (ST) | d12 = 9.200 | | |
| r13 = 0.663 | d13 = 1.500 | N7 = 1.48749 | v7 = 70.44 |
| r14 = 40.663 | d14 = 5.500~9.610~14.086 | | |
| r15 = 323.724 | d15 = 4.500 | N8 = 1.61800 | v8 = 63.39 |
| r16 = −52.163 | d16 = 1.600 | N9 = 1.80518 | v9 = 25.46 |
| r17 = 96.651 | d17 = 3.000 | | |
| r18 = ∞ | d18 = 7.000 | N10 = 1.49310 | v10 = 83.58 |
| r19 = −34.312 | d19 = 9.200~5.090~0.614 | | |
| r20 = 103.351 | d20 = 5.300 | N11 = 1.51680 | v11 = 64.20 |
| r21 = 103.351 | d21 = 0.300 | | |
| r22 = 46.574 | d22 = 4.500 | N12 = 1.58913 | v12 = 61.25 |
| r23 = 206.718 | d23 = 11.160 | | |
| r24 = ∞ | d24 = 25.000 | N13 = 1.51680 | v13 = 64.20 |
| r25 = ∞ | d25 = 5.000 | | |
| r26 = ∞ | d26 = 3.000 | N14 = 1.50847 | v14 = 61.19 |
| r27 = ∞ | | | |

TABLE 3

Construction Data of Example 2 f = 43.982(T)~37.395(M)~32.500(W)
S' =0.522(T)~0.522(M)~0.522(W)
FNO = 2.50(T)~2.44(M)~2.39(W)
2ω = 33.6(T)~39.2(M)~44.6(W)

| Radius of Curvature | Axial Distance | Refractive Index | Abbe Number |
|---|---|---|---|
| r1 = 170.267 | d1 = 4.700 | N1 = 1.62041 | v1 = 60.34 |
| r2 = −142.864 | d2 = 0.200 | | |
| r3 = 111.8 | d3 = 2.000 | N2 = 1.62041 | v2 = 60.34 |
| r4 = 27.949 | d4 = 15.300 | | |
| r5 = −26.370 | d5 = 1.600 | N3 = 1.51680 | v3 = 64.20 |
| r6 = 155.726 | d6 = 4.000~6.375~8.955 | | |
| r7 = 290.859 | d7 = 6.000 | N4 = 1.77250 | v4 = 49.77 |
| r8 = −26.171 | d8 = 1.600 | N5 = 1.75520 | v5 = 27.53 |
| r9 = 6.689 | d9 = 0.700~3.228~4.607 | | |
| r10 = 47.945 | d10 = 4.600 | N6 = 1.77250 | v6 = 49.77 |
| r11 = 190.385 | d11 = 11.200~6.298~2.338 | | |
| r12 = (ST) | d12 = 9.300 | | |
| r13 = −39.747 | d13 = 1.590 | N7 = 1.48749 | v7 = 70.44 |
| r14 = 42.005 | d14 = 5.500~10.300~14.200 | | |
| r15 = 315.649 | d15 = 4.500 | N8 = 1.61800 | v8 = 63.39 |
| r16 = −52.432 | d16 = 1.200 | | |
| r17 = −51.878 | d17 = 1.600 | N9 = 1.80518 | v9 = 25.46 |
| r18 = 100.566 | d18 = 3.000 | N10 = 1.49310 | v10 = 83.58 |
| r19 = 677.878 | d19 = 7.500 | | |
| r20 = −34.047 | d20 = −9.200~4.400~0.500 | | |
| r21 = 94.582 | d21 = 5.300 | N11 = 1.51680 | v11 = 64.20 |
| r22 = −96.689 | d22 = 0.300 | | |
| r23 = 46.938 | d23 = 4.500 | N12 = 1.58913 | v12 = 61.25 |
| r24 = 153.416 | d24 = 11.200 | | |
| r25 = ∞ | d25 = 25.000 | N13 = 1.51680 | v13 = 64.20 |
| r26 = ∞ | d26 = 5.000 | | |
| r27 = ∞ | d27 = 3.000 | N14 = 1.50847 | v14 = 61.19 |
| r28 = ∞ | | | |

TABLE 4

Construction Data of Example 3 f = 30.690(T)~28.552(M)~26.500(W)
S' = 0.574(T)~0.574(M)~0.574(W)
FNO = 2.48(T)~2.49(M)~2.50(W)
2ω = 46.8(T)~50.0(M)~53.3(W)

| Radius of Curvature | Axial Distance | Refractive Index | Abbe Number |
|---|---|---|---|
| r1 = 69.900 | d1 = 2.500 | N1 = 1.71300 | v1 = 53.93 |
| r2 = 33.336 | d2 = 7.700 | | |
| r3 = 138.360 | d3 = 5.700 | N2 = 1.74400 | v2 = 44.93 |
| r4 = −89.420 | d4 = 0.200 | | |
| r5 = 95.654 | d5 = 1.900 | N3 = 1.62041 | v3 = 60.29 |
| r6 = 26.475 | d6 = 12.500 | | |
| r7 = −26.986 | d7 = 1.700 | N4 = 1.71300 | v4 = 53.93 |
| r8 = −57.186 | d8 = 3.000~3.201~3.672 | | |
| r9 = 6.699 | d9 = 1.800 | N5 = 1.71736 | v5 = 29.50 |
| r10 = 98.548 | d10 = 9.500 | N6 = 1.77250 | v6 = 49.77 |
| r11 = −36.381 | d11 = 3.000~7.087~10.920 | | |
| r12 = 51.000 | d12 = 5.200 | N7 = 1.80500 | v7 = 40.97 |
| r13 = 560.030 | d13 = 1.500~7.212~2.908 | | |
| r14 = 89.780 | d14 = 1.400 | N8 = 1.62041 | v8 = 60.29 |
| r15 = 20.52 | d15 = 2.100 | | |
| r16 = 24.578 | d16 = 2.800 | N9 = 1.75520 | v9 = 27.53 |
| r17 = 39.25 | d17 = 6.000 | | |
| r18 = (ST) | d18 = 14.600~17.352~20.220 | | |
| r19 = 289.436 | d19 = 8.200 | N10 = 1.49310 | v10 = 83.58 |
| r20 = −26.602 | d20 = 1.200 | | |
| r21 = −28.898 | d21 = 1.900 | N11 = 1.80610 | v11 = 33.27 |
| r22 = 108.692 | d22 = 4.600 | | |
| r23 = 387.627 | d23 = 7.800 | N12 = 1.49310 | v12 = 83.58 |
| r24 = −39.054 | d24 = 6.400~3.648~0.780 | | |
| r25 = 318.607 | d25 = 7.500 | N13 = 1.49310 | v13 = 83.58 |

TABLE 4-continued

Construction Data of Example 3

| | | | |
|---|---|---|---|
| r26 = −59.950 | d26 = 0.200 | | |
| r27 = 67.334 | d27 = 7.900 | N14 = 1.49310 | v14 = 83.58 |
| r28 = 153.244 | d28 = 25.610 | | |
| r29 = ∞ | d29 = 26.000 | N15 = 1.51680 | v15 = 64.20 |
| r30 = ∞ | d30 = 5.000 | | |
| r31 = ∞ | d31 = 3.000 | N16 = 1.50847 | v16 = 61.19 |
| r32 = ∞ | | | |

TABLE 5

Construction Data of Example 4 f = 30.500(T)~26.800(M)~23.100(W)
S' = 0.571(T)~0.571(M)~0.571(W)
FNO = 247(T)~2.48(M)~2.50(W)
2ω −41.3(T)~46.4(M)~52.9(W)

| Radius of Curvature | Axial Distance | Refractive Index | Abbe Number |
|---|---|---|---|
| r1 = 63.552 | d1 = 2.500 | N1 = 1.71300 | v1 = 53.93 |
| r2 = 33.994 | d2 = 9.700 | | |
| r3 = 577.854 | d3 = 5.700 | N2 = 1.74400 | v2 = 44.93 |
| r4 = −76.970 | d4 = 0.200 | | |
| r5 = 103.447 | d5 = 1.900 | N3 = 1.62041 | v3 = 60.29 |
| r6 = 30.908 | d6 = 13.500 | | |
| r7 = −28.574 | d7 = 1.700 | N4 = 1.71300 | v4 = 53.93 |
| r8 = 3.63 | d8 = 7.000~6.790~7.448 | | |
| r9 = −55.000 | d9 = 1.800 | N5 = 1.71736 | v5 = 29.50 |
| r10 = 113.083 | d10 = 10.500 | N6 = 1.77250 | v6 = 49.77 |
| r11 = −39.853 | d11 = 2.000~13.234~24.689 | | |
| r12 = 72.056 | d12 = 5.200 | N7 = 1.80500 | v7 = 40.97 |
| r13 = 545.560 | d13 = 25.000~13.976~1.863 | | |
| r14 = 110.079 | d14 = 1.400 | N8 = 1.61800 | v8 = 63.39 |
| r15 = 21.779 | d15 = 2.100 | | |
| r16 = 25.792 | d16 = 2.800 | N9 = 1.71736 | v9 = 29.50 |
| r17 = 49.270 | d17 = 5.500 | | |
| r18 = −54.680 | d18 = 2.500 | N10 = 1.62004 | v10 = 36.30 |
| r19 = −50.703 | d19 = 3.000 | | |
| r20 = ∞ (ST) | d20 = 14.000~19.500~25.700 | | |
| r21 = −212.160 | d21 = 6.700 | N11 = 1.49310 | v11 = 83.58 |
| r22 = −28.307 | d22 = 1.200 | | |
| r23 = −30.675 | d23 = 1.900 | N12 = 1.80610 | v12 = 33.27 |
| r24 = 141.748 | d24 = 3.000 | | |
| r25 = 598.695 | d25 = 7.000 | N13 = 1.49310 | v13 = 83.58 |
| r26 = −37.736 | d26 = 2.600~7.100~0.900 | | |
| r27 = 360.531 | d27 = 6.000 | N14 = 1.49310 | v14 = 83.58 |
| r28 = 2.252 | d28 = 0.200 | | |
| r29 = 60.139 | d29 = 6.400 | N15 = 1.49310 | v15 = 83.58 |
| r30 = 319.917 | d30 = 25.600 | | |
| r31 = ∞ | d31 = 32.500 | N16 = 1.51680 | v16 = 64.20 |
| r32 = ∞ | d32 = 4.000 | | |
| r33 = ∞ | d33 = 3.000 | N17 = 1.50847 | v17 = 61.19 |
| r34 = ∞ | | | |

TABLE 6

Construction Data of Example 5 f = 41.000(T)~35.800(M)~30.500(W)
S' = 0.583(T)~0.583(M)~0.583(W)
FNO = 2.50(T)~2.48(M)~2.46(W)
2ω = 31.3(T)~35.6(M)~41.3(W)

| Radius of Curvature | Axial Distance | Refractive Index | Abbe Number |
|---|---|---|---|
| r1 = 66.473 | d1 = 2.500 | N1 = 1.71300 | v1 = 53.93 |
| r2 = 34.806 | d2 = 7.800 | | |
| r3 = 416.488 | d3 = 4.500 | N2 = 1.74400 | v2 = 44.93 |
| r4 = −83.141 | d4 = 0.200 | | |
| r5 = 85.436 | d5 = 1.900 | N3 = 1.62041 | v3 = 60.29 |

TABLE 6-continued

Construction Data of Example 5

| | | | |
|---|---|---|---|
| r6 = 32.544 | d6 = 11.500 | | |
| r7 = −31.946 | d7 = 1.700 | N4 = 1.71300 | ν4 = 53.93 |
| r8 = −78.335 | d8 = 7.000~7.848~9.992 | | |
| r9 = −52.459 | d9 = 1.800 | N5 = 1.71736 | ν5 = 29.50 |
| r10 = 100.565 | d10 = 10.500 | N6 = 1.77250 | ν6 = 49.77 |
| r11 = 0.691 | d11 = 2.000~.743~17.237 | | |
| r12 = 59.893 | d12 = 5.200 | N7 = 1.89500 | ν7 = 40.97 |
| r13 = 1284.192 | d13 = 25.000~16.409~6.771 | | |
| r14 = 52.466 | d14 = 1.400 | N8 = 1.61800 | ν8 = 63.39 |
| r15 = 22.203 | d15 = 2.100 | | |
| r16 = 23.906 | d16 = 2.800 | N9 = 1.71736 | ν9 = 29.50 |
| r17 = 35.109 | d17 = 3.200 | | |
| r18 = ∞ (ST) | d18 = 2.300 | | |
| r19 = 5.428 | d19 = 1.600 | N10 = 1.62041 | ν10 = 60.29 |
| r20 = −69.566 | d20 = 13.800~19.300~25.800 | | |
| r21 = 1421.787 | d21 = 6.700 | N11 = 1.49310 | ν11 = 83.58 |
| r22 = −35.490 | d22 = 1.200 | | |
| r23 = −36.103 | d23 = 1.900 | N12 = 1.71736 | ν12 = 29.50 |
| r24 = 130.639 | d24 = 3.000 | | |
| r25 = 459.385 | d25 = 7.000 | N13 = 1.49310 | ν13 = 83.58 |
| r26 = 1.960 | d26 = 12.500~7.000~0.500 | | |
| r27 = 263.123 | d27 = 4.300 | N14 = 1.49310 | ν14 = 83.58 |
| r28 = 122.474 | d28 = 0.200 | | |
| r29 = 75.142 | d29 = 5.500 | N15 = 1.61800 | ν15 = 63.39 |
| r30 = 241.963 | d30 = 25.600 | | |
| r31 = ∞ | d31 = 32.500 | N16 = 1.51680 | ν16 = 64.20 |
| r32 = ∞ | d32 = 4.000 | | |
| r33 = ∞ | d33 = 3.000 | N17 = 1.50847 | ν17 = 61.19 |
| r34 = ∞ | | | |

TABLE 7

Construction Data of Example 6 f = 43.982(T)~37.395(M)~32.500(W)
S' = 0.591(T)~0.591(M)~0.591(W)
FNO = 3.00(T)~2.96(M)~2.94(W)
2ω = 33.6(T)~39.2(M)~44.6(W)

| Radius of Curvature | Axial Distance | Refractive Index | Abbe Number |
|---|---|---|---|
| r1 = 54.423 | d1 = 3.500 | N1 = 1.52510 | ν1 = 56.38 |
| r2 = 26.005 | d2 = 2.700 | | |
| r3 = −38.275 | d3 = 1.600 | N2 = 1.51680 | ν2 = 64.20 |
| r4 = 89.420 | d4 = 4.000~6.825~9.852 | | |
| r5 = 321.559 | d5 = 6.300 | N3 = 1.77250 | ν3 = 49.77 |
| r6 = −27.940 | d6 = 1.600 | N4 = 1.75520 | ν4 = 27.53 |
| r7 = 7.029 | d7 = 0.700~3.056~4.39 | | |
| r8 = 37.124 | d8 = 4.600 | N5 = 1.77250 | ν5 = 49.77 |
| r9 = 519.300 | d9 = 13.000~7.819~3.709 | | |
| r10 = ∞ (ST) | d10 = 7.500 | | |
| r11 = 6.283 | d11 = 1.500 | N6 = 1.48749 | ν6 = 70.44 |
| r12 = 38.554 | d12 = 6.000~11.200~15.200 | | |
| r13 = 648.408 | d13 = 4.500 | N7 = 1.61800 | ν7 = 63.39 |
| r14 = −52.643 | d14 = 1.600 | N8 = 1.80518 | ν8 = 25.46 |
| r15 = 85.586 | d15 = 3.000 | | |
| r16 = −1862.891 | d16 = 7.000 | N9 = 1.49310 | ν9 = 83.58 |
| r17 = −34.588 | d17 = 9.700~4.500~0.500 | | |
| r18 = 127.941 | d18 = 4.800 | N10 = 1.48749 | ν10 = 70.44 |
| r19 = −96.723 | d19 = 0.300 | | |
| r20 = 51.305 | d20 = 5.700 | N11 = 1.58913 | ν11 = 61.25 |
| r21 = 56.840 | d21 = 11.000 | | |
| r22 = ∞ | d22 = 25.000 | N12 = 1.51680 | ν12 = 64.20 |
| r23 = ∞ | d23 = 5.000 | | |
| r24 = ∞ | d24 = 3.000 | N13 = 1.50847 | ν13 = 61.19 |
| r25 = ∞ | | | |

Aspherical Surface Data of Surface r2
ϵ = 0.0, A4 = 0.40641 × 10⁻⁵, A6 = 0.30482 × 10⁻⁹,
A8 = 0.68891 × 10⁻¹¹

TABLE 8

Construction Data of Example 7
f = 44.000(T) ~ 37.395(M) ~ 32.500(W)
S' = 0.574(T) ~ 0.574(M) ~ 0.574(W)
FNO = 2.50(T) ~ 2.46(M) ~ 2.43(W)
2ω = 33.6(T) ~ 39.2(M) ~ 44.6(W)

| Radius of Curvature | Axial Distance | Refractive Index | Abbe Number |
|---|---|---|---|
| r1 = 168.556 | | | |
| | d1 = 4.700 | N1 = 1.71300 | ν1 = 53.93 |
| r2 = −168.556 | | | |
| | d2 = 0.200 | | |
| r3 = 81.445 | | | |
| | d3 = 2.000 | N2 = 1.58913 | ν2 = 61.25 |
| r4 = 27.995 | | | |
| | d4 = 15.200 | | |
| r5 = −29.718 | | | |
| | d5 = 1.600 | N3 = 1.58913 | ν3 = 61.25 |
| r6 = 153.249 | | | |
| | d6 = 4.000 ~ 6.660 ~ 9.388 | | |
| r7 = −322.127 | | | |
| | d7 = 6.000 | N4 = 1.77250 | ν4 = 49.77 |
| r8 = −25.133 | | | |
| | d8 = 1.600 | N5 = 1.71736 | ν5 = 29.50 |
| r9 = −46.129 | | | |
| | d9 = 0.500 ~ 2.440 ~ 4.312 | | |
| r10 = 42.357 | | | |
| | d10 = 4.800 | N6 = 1.77250 | ν6 = 49.77 |
| r11 = −225.222 | | | |
| | d11 = 12.500 ~ 7.159 ~ −3.133 | | |
| r12 = ∞ (ST) | | | |
| | d12 = 8.000 | | |
| r13 = −43.916 | | | |
| | d13 = 1.500 | N7 = 1.48749 | ν7 = 70.44 |
| r14 = 43.916 | | | |
| | d14 = 4.500 ~ 9.441 ~ 12.867 | | |
| r15 = −1155.095 | | | |
| | d15 = 6.000 | N8 = 1.61800 | ν8 = 63.39 |
| r16 = −45.884 | | | |
| | d16 = 1.600 | N9 = 1.80518 | ν9 = 25.43 |
| r17 = 104.016 | | | |
| | d17 = 3.000 | | |
| r18 = 784.394 | | | |
| | d18 = 7.200 | N10 = 1.49310 | ν10 = 83.58 |
| r19 = −34.259 | | | |
| | d19 = 9.000 ~ 4.800 ~ 0.800 | | |
| r20 = 93.617 | | | |
| | d20 = 5.000 | N11 = 1.51680 | ν11 = 64.20 |
| r21 = −93.617 | | | |
| | d21 = 0.300 | | |
| r22 = 45.495 | | | |
| | d22 = 4.600 | N12 = 1.71300 | ν12 = 53.98 |
| r23 = 117.540 | | | |
| | d23 = 12.900 | | |
| r24 = ∞ | | | |
| | d24 = 25.000 | N13 = 1.51680 | ν13 = 64.20 |
| r25 = ∞ | | | |
| | d25 = 4.200 | | |
| r26 = ∞ | | | |
| | d26 = 2.750 | N14 = 1.50847 | ν14 = 61.19 |
| r27 = ∞ | | | |

TABLE 9

Construction Data of Example 8
f = 43.000(T) ~ 38.000(M) ~ 33.000(W)
S' = 0.538(T) ~ 0.538(M) ~ 0.538(W)
FNO = 2.92(T) ~ 2.96(M) ~ 3.00(W)
2ω = 29.9(T) ~ 33.7(M) ~ 38.4(W)

| Radius of Curvature | Axial Distance | Refractive Index | Abbe Number |
|---|---|---|---|
| r1* = 44.752 | | | |
| | d1 = 4.000 | N1 = 1.52510 | ν1 = 56.38 |

TABLE 9-continued

Construction Data of Example 8
f = 43.000(T) ~ 38.000(M) ~ 33.000(W)
S' = 0.538(T) ~ 0.538(M) ~ 0.538(W)
FNO = 2.92(T) ~ 2.96(M) ~ 3.00(W)
2ω = 29.9(T) ~ 33.7(M) ~ 38.4(W)

| Radius of Curvature | Axial Distance | Refractive Index | Abbe Number |
|---|---|---|---|
| r2 = 31.565 | | | |
| | d2 = 5.800 | | |
| r3 = 110.847 | | | |
| | d3 = 2.300 | N2 = 1.48749 | ν2 = 70.44 |
| r4 = 31.316 | | | |
| | d4 = 13.000 ~ 13.493 ~ 17.440 | | |
| r5 = −39.478 | | | |
| | d5 = 1.800 | N3 = 1.71736 | ν3 = 29.50 |
| r6 = 163.977 | | | |
| | d6 = 1.800 | | |
| r7 = 153.340 | | | |
| | d7 = 7.500 | N4 = 1.77250 | ν4 = 49.77 |
| r8 = −44.714 | | | |
| | d8 = 5.000 ~ 14.338 ~ 20.577 | | |
| r9 = 62.107 | | | |
| | d9 = 5.200 | N5 = 1.80500 | ν5 = 40.97 |
| r10 = −931.541 | | | |
| | d10 = 25.000 ~ 15.168 ~ 4.983 | | |
| r11 = 66.136 | | | |
| | d11 = 1.400 | N6 = 1.62041 | ν6 = 60.29 |
| r12 = 22.130 | | | |
| | d12 = 2.100 | | |
| r13* = 23.718 | | | |
| | d13 = 2.800 | N7 = 1.80518 | ν7 = 25.43 |
| r14 = 33.672 | | | |
| | d14 = 2.200 | | |
| r15 = ∞ (ST) | | | |
| | d15 = 19.100 ~ 24.600 ~ 30.100 | | |
| r16 = −105.660 | | | |
| | d16 = 6.700 | N8 = 1.49700 | ν8 = 81.61 |
| r17 = −28.799 | | | |
| | d17 = 1.200 | | |
| r18 = −30.626 | | | |
| | d18 = 1.900 | N9 = 1.71736 | ν9 = 29.50 |
| r19 = 166.242 | | | |
| | d19 = 3.000 | | |
| r20 = −212.494 | | | |
| | d20 = 7.000 | N10 = 1.49700 | ν10 = 81.61 |
| r21 = −37.942 | | | |
| | d21 = 12.500 ~ 7.000 ~ 1.500 | | |
| r22 = 151.852 | | | |
| | d22 = 6.000 | N11 = 1.49700 | ν11 = 81.61 |
| r23 = −65.922 | | | |
| | d23 = 0.200 | | |
| r24 = 58.021 | | | |
| | d24 = 5.000 | N12 = 1.49700 | ν12 = 81.61 |
| r25 = 817.027 | | | |
| | d25 = 25.700 | | |
| r26 = ∞ | | | |
| | d26 = 32.500 | N13 = 1.51680 | ν13 = 64.20 |
| r27 = ∞ | | | |
| | d27 = 4.000 | | |
| r28 = ∞ | | | |
| | d28 = 3.000 | N14 = 1.50847 | ν14 = 61.19 |
| r29 = ∞ | | | |

*Aspherical Surface Data of Surface r1
ε = 0.0, A4 = 0.24917 × $10^{-5}$, A6 = 0.20214 × $10^{-9}$, A8 = 0.10558 × $10^{-11}$
*Aspherical Surface Data of Surface r13
ε = 0.10000 × 10, A4 = −0.97030 × $10^{-6}$, A6 = −0.21292 × $10^{-8}$, A8 = −0.14844 × $10^{-11}$

TABLE 10

Construction Data of Example 9
f = 23.500(T) ~ 21.800(M) ~ 20.100(W)
S' = 0.526(T) ~ 0.526(M) ~ 0.526(W)
FNO = 2.97(T) ~ 2.98(M) ~ 3.00(W)
2ω = 52.5(T) ~ 56.0(M) ~ 60.0(W)

| Radius of Curvature | Axial Distance | Refractive Index | Abbe Number |
|---|---|---|---|
| r1 = 93.585 | | | |
| | d1 = 3.800 | N1 = 1.62041 | ν1 = 60.29 |
| r2 = 44.703 | | | |
| | d2 = 8.000 | | |
| r3 = 98.975 | | | |
| | d3 = 3.500 | N2 = 1.71300 | ν2 = 53.93 |
| r4 = 46.710 | | | |
| | d4 = 9.700 | | |
| r5 = −1527.207 | | | |
| | d5 = 6.500 | N3 = 1.74400 | ν3 = 44.93 |
| r6 = −71.833 | | | |
| | d6 = 0.200 | | |
| r7 = 100.293 | | | |
| | d7 = 2.700 | N4 = 1.61800 | ν4 = 63.39 |
| r8 = 35.625 | | | |
| | d8 = 15.500 | | |
| r9 = −30.347 | | | |
| | d9 = 2.500 | N5 = 1.61800 | ν5 = 63.39 |
| r10 = −39.987 | | | |
| | d10 = 8.000 ~ 8.139 ~ 8.747 | | |
| r11 = −49.434 | | | |
| | d11 = 1.800 | N6 = 1.71736 | ν6 = 29.50 |
| r12 = 306.872 | | | |
| | d12 = 10.000 | N7 = 1.77250 | ν7 = 49.77 |
| r13 = −41.284 | | | |
| | d13 = 5.000 ~ 14.897 ~ 24.759 | | |
| r14 = 84.145 | | | |
| | d14 = 5.200 | N8 = 1.80500 | ν8 = 40.97 |
| r15 = 5043.373 | | | |
| | d15 = 17.000 ~ 9.964 ~ 2.494 | | |
| r16 = 2627.707 | | | |
| | d16 = 1.400 | N9 = 1.61800 | ν9 = 63.39 |
| r17 = 29.115 | | | |
| | d17 = 3.300 | | |
| r18 = 54.653 | | | |
| | d18 = 2.800 | N10 = 1.75520 | ν10 = 27.53 |
| r19 = 213.662 | | | |
| | d19 = 5.500 | | |
| r20 = −40.728 | | | |
| | d20 = 2.500 | N11 = 1.62004 | ν11 = 36.30 |
| r21 = −34.056 | | | |
| | d21 = 14.800 | | |
| r22 = ∞ (ST) | | | |
| | d22 = 21.000 ~ 25.000 ~ 29.000 | | |
| r23 = −269.004 | | | |
| | d23 = 6.700 | N12 = 1.49310 | ν12 = 83.58 |
| r24 = −32.073 | | | |
| | d24 = 1.200 | | |
| r25 = −36.756 | | | |
| | d25 = 1.900 | N13 = 1.80610 | ν13 = 33.27 |
| r26 = 160.778 | | | |
| | d26 = 3.000 | | |
| r27 = −190.364 | | | |
| | d27 = 7.000 | N14 = 1.49310 | ν14 = 83.58 |
| r28 = −37.692 | | | |
| | d28 = 8.600 ~ 4.600 ~ 0.600 | | |
| r29 = 193.765 | | | |
| | d29 = 6.000 | N15 = 1.49310 | ν15 = 83.58 |
| r30 = −72.488 | | | |
| | d30 = 0.200 | | |
| r31 = 55.839 | | | |
| | d31 = 6.400 | N16 = 1.49310 | ν16 = 83.58 |
| r32 = −645.299 | | | |
| | d32 = 25.800 | | |
| r33 = ∞ | | | |
| | d33 = 32.500 | N17 = 1.51680 | ν17 = 64.20 |
| r34 = ∞ | | | |
| | d34 = 4.000 | | |

TABLE 10-continued

Construction Data of Example 9  
f = 23.500(T) ~ 21.800(M) ~ 20.100(W)  
S' = 0.526(T) ~ 0.526(M) ~ 0.526(W)  
FNO = 2.97(T) ~ 2.98(M) ~ 3.00(W)  
2ω = 52.5(T) ~ 56.0(M) ~ 60.0(W)

| Radius of Curvature | Axial Distance | Refractive Index | Abbe Number |
|---|---|---|---|
| r35 = ∞ | | | |
|  | d35 = 3.000 | N18 = 1.50847 | ν18 = 61.19 |
| r36 = ∞ | | | |

TABLE 11

Construction Data of Example 10  
f = 30.700(T) ~ 28.552(M) ~ 26.500(W)  
S' = 0.544(T) ~ 0.544(M) ~ 0.544(W)  
FNO = 2.48(T) ~ 2.49(M) ~ 2.50(W)  
2ω = 46.8(T) ~ 50.0(M) ~ 53.3(W)

| Radius of Curvature | Axial Distance | Refractive Index | Abbe Number |
|---|---|---|---|
| r1 = 68.058 | | | |
|  | d1 = 2.400 | N1 = 1.71300 | ν1 = 53.93 |
| r2 = 33.084 | | | |
|  | d2 = 7.500 | | |
| r3 = 169.680 | | | |
|  | d3 = 5.400 | N2 = 1.74400 | ν2 = 44.93 |
| r4 = −83.378 | | | |
|  | d4 = 0.200 | | |
| r5 = 95.571 | | | |
|  | d5 = 1.800 | N3 = 1.71300 | ν3 = 53.93 |
| r6 = 28.321 | | | |
|  | d6 = 11.800 | | |
| r7 = −26.153 | | | |
|  | d7 = 1.700 | N4 = 1.71300 | ν4 = 53.93 |
| r8 = −48.980 | | | |
|  | d8 = 4.000 ~ 3.729 ~ 3.688 | | |
| r9 = −46.410 | | | |
|  | d9 = 1.800 | N5 = 1.71736 | ν5 = 29.50 |
| r10 = 145.725 | | | |
|  | d10 = 8.500 | N6 = 1.77250 | ν6 = 49.77 |
| r11 = −35.976 | | | |
|  | d11 = 3.000 ~ 8.425 ~ 13.622 | | |
| r12 = 52.776 | | | |
|  | d12 = 5.000 | N7 = 1.80500 | ν7 = 40.97 |
| r13 = −3005.892 | | | |
|  | d13 = 12.000 ~ 6.846 ~ 1.690 | | |
| r14 = 93.398 | | | |
|  | d14 = 1.400 | N8 = 1.62041 | ν8 = 60.34 |
| r15 = 21.695 | | | |
|  | d15 = 2.100 | | |
| r16 = 25.925 | | | |
|  | d16 = 2.800 | N9 = 1.80518 | ν9 = 25.46 |
| r17 = 41.165 | | | |
|  | d17 = 4.800 | | |
| r18 = ∞ (ST) | | | |
|  | d18 = 16.400 ~ 19.143 ~ 22.000 | | |
| r19 = 302.837 | | | |
|  | d19 = 8.200 | N10 = 1.49310 | ν10 = 83.58 |
| r20 = −27.451 | | | |
|  | d20 = 1.200 | | |
| r21 = −29.332 | | | |
|  | d21 = 1.900 | N11 = 1.74000 | ν11 = 31.72 |
| r22 = 102.243 | | | |
|  | d22 = 4.600 | | |
| r23 = −208.870 | | | |
|  | d23 = 6.900 | N12 = 1.49310 | ν12 = 83.58 |
| r24 = −42.466 | | | |
|  | d24 = 6.200 ~ 3.457 ~ 0.600 | | |
| r25 = 328.754 | | | |
|  | d25 = 7.600 | N13 = 1.49310 | ν13 = 83.58 |
| r26 = −56.545 | | | |
|  | d26 = 0.200 | | |
| r27 = 68.314 | | | |
|  | d27 = 7.900 | N14 = 1.49310 | ν14 = 83.58 |
| r28 = −160.366 | | | |
|  | d28 = 27.600 | | |
| r29 = ∞ | | | |
|  | d29 = 26.000 | N15 = 1.51680 | ν15 = 64.20 |
| r30 = ∞ | | | |
|  | d30 = 5.000 | | |
| r31 = ∞ | | | |
|  | d31 = 3.000 | N16 = 1.50847 | ν16 = 61.19 |
| r32 = ∞ | | | |

TABLE 12

Construction Data of Example 11  
f = 44.000(T) ~ 38.000(M) ~ 32.500(W)  
S' = 0.555(T) ~ 0.555(M) ~ 0.555(W)  
FNO = 2.95(T) ~ 2.98(M) ~ 3.00(W)  
2ω = 33.6(T) ~ 38.6(M) ~ 44.6(W)

| Radius of Curvature | Axial Distance | Refractive Index | Abbe Number |
|---|---|---|---|
| r1 = 70.205 | | | |
|  | d1 = 4.000 | N1 = 1.52510 | ν1 = 56.38 |
| r2* = 22.403 | | | |
|  | d2 = 13.000 ~ 15.683 ~ 24.208 | | |
| r3 = −40.685 | | | |
|  | d3 = 1.800 | N2 = 1.71736 | ν2 = 29.50 |
| r4 = 83.082 | | | |
|  | d4 = 1.800 | | |
| r5 = 96.998 | | | |
|  | d5 = 8.500 | N3 = 1.77250 | ν3 = 49.77 |
| r6 = −47.067 | | | |
|  | d6 = 3.000 ~ 9.356 ~ 9.229 | | |
| r7 = 53.655 | | | |
|  | d7 = 5.200 | N4 = 1.80500 | ν4 = 40.97 |
| r8 = −670.758 | | | |
|  | d8 = 25.000 ~ 15.960 ~ 7.563 | | |
| r9 = 9149.131 | | | |
|  | d9 = 1.400 | N5 = 1.62041 | ν5 = 60.29 |
| r10 = 24.351 | | | |
|  | d10 = 1.800 | | |
| r11 = ∞ (ST) | | | |
|  | d11 = 0.300 | | |
| r12 = 29.176 | | | |
|  | d12 = 2.800 | N6 = 1.80518 | ν6 = 25.43 |
| r13 = 66.529 | | | |
|  | d13 = 18.200 ~ 23.200 ~ 27.200 | | |
| r14 = −122.854 | | | |
|  | d14 = 6.700 | N7 = 1.49700 | ν7 = 81.61 |
| r15 = −26.507 | | | |
|  | d15 = 1.200 | | |
| r16 = −26.625 | | | |
|  | d16 = 1.900 | N8 = 1.71736 | ν8 = 29.50 |
| r17 = 151.055 | | | |
|  | d17 = 3.000 | | |
| r18 = −1224.560 | | | |
|  | d18 = 7.000 | N9 = 1.49700 | ν9 = 81.61 |
| r19 = −36.846 | | | |
|  | d19 = 10.000 ~ 5.000 ~ 1.000 | | |
| r20 = 154.012 | | | |
|  | d20 = 7.000 | N10 = 1.49700 | ν10 = 81.61 |
| r21 = −71.853 | | | |
|  | d21 = 0.200 | | |
| r22 = 55.199 | | | |
|  | d22 = 6.000 | N11 = 1.49700 | ν11 = 81.61 |

TABLE 12-continued

Construction Data of Example 11
f = 44.000(T) ~ 38.000(M) ~ 32.500(W)
S' = 0.555(T) ~ 0.555(M) ~ 0.555(W)
FNO = 2.95(T) ~ 2.98(M) ~ 3.00(W)
2ω = 33.6(T) ~ 38.6(M) ~ 44.6(W)

| Radius of Curvature | Axial Distance | Refractive Index | Abbe Number |
|---|---|---|---|
| r23 = 471.091 | | | |
| | d23 = 27.200 | | |
| r24 = ∞ | | | |
| | d24 = 26.000 | N12 = 1.51680 | ν12 = 64.20 |
| r25 = ∞ | | | |
| | d25 = 5.000 | | |
| r26 = ∞ | | | |
| | d26 = 3.000 | N13 = 1.50847 | ν13 = 61.19 |
| r27 = ∞ | | | |

*Aspherical Surface Data of Surface r2
ε = 0.30000, A4 = 0.24530 × $10^{-5}$, A6 = 0.32006 × $10^{-8}$, A8 = −0.43579 × $10^{-12}$

TABLE 13

Construction Data of Example 12
f = 44.005(T) ~ 38.306(M) ~ 32.509(W)
S' = 0.597(T) ~ 0.594(M) ~ 0.589(W)
FNO = 2.50(T) ~ 2.40(M) ~ 2.33(W)
2ω = 33.6(T) ~ 38.3(M) ~ 44.5(W)

| Radius of Curvature | Axial Distance | Refractive Index | Abbe Number |
|---|---|---|---|
| r1 = 307.028 | | | |
| | d1 = 2.600 | N1 = 1.51680 | ν1 = 64.20 |
| r2 = 37.837 | | | |
| | d2 = 7.000 | | |
| r3 = 644.841 | | | |
| | d3 = 5.800 | N2 = 1.71300 | ν2 = 53.93 |
| r4 = −61.528 | | | |
| | d4 = 0.218 | | |
| r5 = 111.915 | | | |
| | d5 = 2.000 | N3 = 1.62041 | ν3 = 60.29 |
| r6 = 33.953 | | | |
| | d6 = 12.500 | | |
| r7 = −24.243 | | | |
| | d7 = 1.800 | N4 = 1.51680 | ν4 = 64.20 |
| r8 = −77.516 | | | |
| | d8 = 4.400 ~ 5.802 ~ 8.265 | | |
| r9 = −56.566 | | | |
| | d9 = 1.900 | N5 = 1.71736 | ν5 = 29.50 |
| r10 = 142.293 | | | |
| | d10 = 9.200 | N6 = 1.77250 | ν6 = 49.77 |
| r11 = −36.032 | | | |
| | d11 = 1.000 ~ 6.215 ~ 12.040 | | |
| r12 = 50.807 | | | |
| | d12 = 7.500 | N7 = 1.49310 | ν7 = 83.58 |
| r13 = −126.893 | | | |
| | d13 = 25.800 ~ 19.182 ~ 10.896 | | |
| r14 = −56.864 | | | |
| | d14 = 1.500 | N8 = 1.48749 | ν8 = 70.44 |
| r15 = 32.311 | | | |
| | d15 = 2.000 | | |
| r16 = 38.040 | | | |
| | d16 = 3.500 | N9 = 1.75520 | ν9 = 27.53 |
| r17 = 122.104 | | | |
| | d17 = 0.650 | | |
| r18 = ∞ (ST) | | | |
| | d18 = 9.850 ~ 19.350 ~ 27.650 | | |
| r19 = 213.814 | | | |
| | d19 = 1.600 | N10 = 1.83400 | ν10 = 37.05 |
| r20 = 84.160 | | | |
| | d20 = 1.000 | | |
| r21 = 63.286 | | | |
| | d21 = 4.800 | N11 = 1.49310 | ν11 = 83.58 |

TABLE 13-continued

Construction Data of Example 12
f = 44.005(T) ~ 38.306(M) ~ 32.509(W)
S' = 0.597(T) ~ 0.594(M) ~ 0.589(W)
FNO = 2.50(T) ~ 2.40(M) ~ 2.33(W)
2ω = 33.6(T) ~ 38.3(M) ~ 44.5(W)

| Radius of Curvature | Axial Distance | Refractive Index | Abbe Number |
|---|---|---|---|
| r22 = −170.997 | | | |
| | d22 = 19.700 ~ 10.200 ~ 1.900 | | |
| r23 = 129.915 | | | |
| | d23 = 7.000 | N12 = 1.49310 | ν12 = 83.58 |
| r24 = −44.651 | | | |
| | d24 = 1.700 | | |
| r25 = −46.154 | | | |
| | d25 = 2.000 | N13 = 1.83400 | ν13 = 37.05 |
| r26 = 67.991 | | | |
| | d26 = 5.700 | | |
| r27 = −186.413 | | | |
| | d27 = 3.500 | N14 = 1.49310 | ν14 = 83.58 |
| r28 = −65.463 | | | |
| | d28 = 0.300 | | |
| r29 = 140.187 | | | |
| | d29 = 6.800 | N15 = 1.49310 | ν15 = 83.58 |
| r30 = −59.074 | | | |
| | d30 = 0.200 | | |
| r31 = 50.117 | | | |
| | d31 = 6.500 | N16 = 1.49310 | ν16 = 83.58 |
| r32 = ∞ | | | |
| | d32 = 26.104 | | |
| r33 = ∞ | | | |
| | d33 = 25.000 | N17 = 1.51680 | ν17 = 64.20 |
| r34 = ∞ | | | |
| | d34 = 5.000 | | |
| r35 = ∞ | | | |
| | d35 = 3.000 | N18 = 1.50847 | ν18 = 61.19 |
| r36 = ∞ | | | |

TABLE 14

Actual Values of Conditional Formulae

| Example | (1) φ2/φ3 | (2) φ5/φ4 | (3) φ5/φ3 | (4) \|φ1\|/φ2 | (5) fw · φ3 |
|---|---|---|---|---|---|
| 1 | 0.785 | −0.226 | 0.249 | 1.899 | 0.713 |
| 2 | 0.965 | −0.254 | 0.305 | 1.726 | 0.650 |
| 3 | 0.494 | 0.120 | −0.076 | 3.662 | 0.455 |
| 4 | 0.678 | 0.196 | −0.113 | 3.454 | 0.291 |
| 5 | 0.542 | −0.151 | 0.110 | 3.381 | 0.428 |
| 6 | 0.974 | −0.142 | 0.171 | 1.672 | 0.631 |
| 7 | 0.720 | −0.183 | 0.190 | 1.906 | 0.699 |
| 8 | 0.165 | 0.337 | −0.183 | 6.798 | 0.455 |
| 9 | 0.657 | 0.207 | −0.130 | 3.744 | 0.189 |
| 10 | 0.535 | 0.183 | −0.112 | 3.675 | 0.411 |
| 11 | 0.060 | 0.191 | −0.107 | 15.979 | 0.525 |
| 12 | 0.807 | −0.502 | 0.351 | 2.762 | 0.436 |

TABLE 15

Actual Values of Conditional Formulae

| Example | (6) Tsp/(fa − FH) | (7) fw · φ5 | (8) fw · φ1–4 | (9) T4-5/Bf | (10) Bf/fw |
|---|---|---|---|---|---|
| 1 | 0.989 | 0.177 | 0.022 | 0.401 | 1.082 |
| 2 | 1.218 | 0.198 | −0.014 | 0.403 | 1.083 |
| 3 | 1.011 | −0.035 | −0.034 | 0.521 | 1.899 |
| 4 | 0.962 | −0.033 | −0.019 | 0.536 | 2.320 |
| 5 | 0.737 | 0.047 | −0.020 | 0.481 | 1.757 |
| 6 | 1.235 | 0.108 | 0.051 | 0.434 | 1.078 |
| 7 | 0.992 | 0.133 | 0.010 | 0.358 | 1.107 |
| 8 | 1.050 | −0.083 | 0.058 | 0.598 | 1.626 |

TABLE 15-continued

Actual Values of Conditional Formulae

| Example | (6) Tsp/(fa − FH) | (7) fw · φ5 | (8) fw · φ1–4 | (9) T4-5/Bf | (10) Bf/fw |
|---|---|---|---|---|---|
| 9 | 1.029 | −0.025 | −0.034 | 0.815 | 2.674 |
| 10 | 0.984 | −0.046 | −0.066 | 0.513 | 1.973 |
| 11 | 1.200 | −0.056 | 0.071 | 0.524 | 1.596 |
| 12 | 0.922 | 0.153 | 0.031 | 0.564 | 1.544 |

TABLE 16

Actual Values of Conditional Formulae

| Example | Relevant Lenses | (11) ΔP5 | (12) ν(5) | (13) ν(6') |
|---|---|---|---|---|
| 1 | G8, G10 | 0.727(G8), 3.406(G10) | 63.39(G8), 83.58(G10) | 62.73 |
| 2 | G8, G10 | 0.727(G8), 3.406(G10) | 63.39(G8), 83.58(G10) | 62.73 |
| 3 | G10, G12 | 3.406(G10), 3.406(G12) | 83.58(G10), 83.58(G12) | 83.58 |
| 4 | G11, G13 | 3.406(G11), 3.406(G13) | 83.58(G11), 83.58(G13) | 83.58 |
| 5 | G11, G13 | 3.406(G11), 3.406(G13) | 83.58(G11), 83.58(G13) | 73.48 |
| 6 | G7, G9 | 0.727(G7), 3.406(G9) | 63.39(G7), 83.58(G9) | 65.84 |
| 7 | G8, G10 | 0.727(G8), 3.406(G10) | 63.39(G8), 83.58(G10) | 59.09 |
| 8 | G8, G10 | 3.203(G8), 3.203(G10) | 81.61(G8), 81.61(G10) | 81.61 |
| 9 | G12, G14 | 3.406(G12), 3.406(G14) | 83.58(G12), 83.58(G14) | 83.58 |
| 10 | G10, G12 | 3.406(G10), 3.406(G12) | 83.58(G10), 83.58(G12) | 83.58 |
| 11 | G7, G9 | 3.203(G7), 3.203(G9) | 81.61(G7), 81.61(G9) | 81.61 |
| 12 | G11 | 3.406 | 83.58 | 83.58 |

TABLE 17

Data Related to Conditional Formulae

| Example | φ1 | φ2 | φ3 | φ4 | φ5 | φ6 | φ1–4 | fw |
|---|---|---|---|---|---|---|---|---|
| 1 | −0.03272 | 0.01723 | 0.02194 | −0.02412 | 0.00546 | 0.01969 | 0.00067 | 32.5 |
| 2 | −0.03330 | 0.01929 | 0.02000 | −0.02401 | 0.00610 | 0.01947 | −0.00042 | 32.5 |
| 3 | −0.03102 | 0.00847 | 0.01716 | −0.01091 | −0.00131 | 0.01986 | −0.00129 | 26.5 |
| 4 | −0.02950 | 0.00854 | 0.01260 | −0.00730 | −0.00143 | 0.01880 | −0.00081 | 23.1 |
| 5 | −0.02573 | 0.00761 | 0.01404 | −0.01018 | 0.00154 | 0.01646 | −0.00067 | 30.5 |
| 6 | −0.03158 | 0.01889 | 0.01940 | −0.02331 | 0.00331 | 0.02128 | 0.00156 | 32.5 |
| 7 | −0.02952 | 0.01549 | 0.02150 | −0.02233 | 0.00408 | 0.02077 | 0.00032 | 32.5 |
| 8 | −0.01550 | 0.00228 | 0.01379 | −0.00747 | −0.00252 | 0.01859 | 0.00174 | 33.0 |
| 9 | −0.02314 | 0.00618 | 0.00941 | −0.00588 | −0.00122 | 0.01870 | −0.00168 | 20.1 |
| 10 | −0.03050 | 0.00830 | 0.01551 | −0.00951 | −0.00174 | 0.02007 | −0.00251 | 26.5 |
| 11 | −0.01550 | 0.00097 | 0.01615 | −0.00902 | −0.00172 | 0.01793 | 0.00220 | 32.5 |
| 12 | −0.02989 | 0.01082 | 0.01340 | −0.00939 | 0.00471 | 0.01495 | 0.00095 | 32.5 |

TABLE 18

Data Related to Conditional Formulae

| Example | Bf | Tsp | fa | FH | T4–5 |
|---|---|---|---|---|---|
| 1 | 35.151 | 9.200 | 47.087 | 37.785 | 14.086 |
| 2 | 35.193 | 9.300 | 45.433 | 37.800 | 14.200 |
| 3 | 50.314 | 20.220 | 47.413 | 27.411 | 26.220 |
| 4 | 53.586 | 25.700 | 50.172 | 23.468 | 28.700 |
| 5 | 53.598 | 3.700 | 53.159 | 48.140 | 25.800 |
| 6 | 35.049 | 7.500 | 43.855 | 37.784 | 15.200 |
| 7 | 35.979 | 8.000 | 44.615 | 36.548 | 12.867 |
| 8 | 53.653 | 30.100 | 52.704 | 24.030 | 32.100 |
| 9 | 53.741 | 29.000 | 50.760 | 22.565 | 43.800 |
| 10 | 52.274 | 22.000 | 48.878 | 26.513 | 26.800 |
| 11 | 51.885 | 0.300 | 53.600 | 53.350 | 27.200 |
| 12 | 50.169 | 27.650 | 56.749 | 28.888 | 28.300 |

What is claimed is:

1. A zoom lens system comprising, from an enlargement side:
a first lens unit having a negative optical power;
a second lens unit having a positive optical power and disposed on an image side of the first lens unit with a first variable distance secured in between;
a third lens unit having a positive optical power and disposed on an image side of the second lens unit with a second variable distance secured in between;
a fourth lens unit having a negative optical power and disposed on an image side of the third lens unit with a third variable distance secured in between, the fourth lens unit including an aperture stop;
a fifth lens unit having a positive or negative optical power and disposed on an image side of the fourth lens unit with a fourth variable distance secured in between; and
a sixth lens unit having a positive optical power and disposed on an image side of the fifth lens unit with a fifth variable distance secured in between,
wherein zooming is achieved by varying the first to fifth variable distances,
wherein the third and fifth lens units move from the enlargement side to a reduction side during zooming from a telephoto end to a wide-angle end, and
wherein the zoom lens system is substantially telecentric toward the reduction side.

2. A zoom lens system as claimed in claim 1,
wherein the distance between the second and third lens units increases and the distance between the fourth and fifth lens units increases during zooming from the telephoto end to the wide-angle end, and wherein the following conditional formulae are fulfilled:

$$0.1 < \phi2/\phi3 < 1.1 \quad (1)$$

$$-0.6 < \phi5/\phi4 < 0.5 \quad (2)$$

$$-0.3 < \phi5/\phi3 < 0.5 \quad (3)$$

$$1.3 < |\phi1|/\phi2 < 20 \quad (4)$$

$$0.1 < fw \cdot \phi3 < 0.9 \quad (5)$$

wherein
- $\phi1$ represents the optical power of the first lens unit;
- $\phi2$ represents the optical power of the second lens unit;
- $\phi3$ represents the optical power of the third lens unit;
- $\phi4$ represents the optical power of the fourth lens unit;
- $\phi5$ represents the optical power of the fifth lens unit; and
- fw represents a focal length of the zoom lens system as a whole at the wide-angle end.

3. A zoom lens system as claimed in claim 1, wherein the aperture stop is disposed substantially at the enlargement-side focal length position of a rear lens unit, which is a lens system formed by all lens elements arranged on a reduction side of the aperture stop, wherein a lens system formed by the first through fourth lens units constitutes a substantially afocal optical system, and wherein the following conditional formulae are fulfilled:

$$0.5 < Tsp/(fa - FH) < 1.4 \quad (6)$$

$$-0.1 < fw \cdot \phi5 < 0.3 \quad (7)$$

$$-0.2 < fw \cdot \phi1\text{-}4 < 0.3 \quad (8)$$

$$0.2 < T4\text{-}5/Bf < 1.0 \quad (9)$$

$$0.8 < Bf/fw < 3.0 \quad (10)$$

where
- Tsp represents an axial distance from the aperture stop to a vertex of a lens surface +arranged immediately on a reduction side of the aperture stop at the wide-angle end;
- fa represents a focal length of the rear lens unit at the wide-angle end;
- FH represents an axial distance from the vertex of the lens surface arranged immediately on the reduction side of the aperture stop to an enlargement-side principal point position of the rear lens unit at the wide-angle end;
- fw represents a focal length of the zoom lens system as a whole at the wide-angle end;
- $\phi5$ represents the optical power of the fifth lens unit;
- $\phi1\text{-}4$ represents the composite optical power of the first through fourth lens units at the wide angle end;
- T4-5 represents a lens surface distance between the fourth and fifth lens units at the wide-angle end; and
- Bf represents a back focal length converted to an equivalent length in air.

4. A zoom lens system as claimed in claim 1, wherein the distance between the first and second lens units increases during zooming from the telephoto end to the wide-angle end.

5. A zoom lens system as claimed in claim 1, wherein the distance between the first and second lens units decreases during zooming from the telephoto end to the wide-angle end.

6. A zoom lens system as claimed in claim 1, wherein the aperture stop, together with the fourth lens unit as a whole, is kept in a fixed position during zooming.

7. A zoom lens system as claimed in claim 1, wherein the aperture stop, together with the fourth lens unit as a whole, moves during zooming.

8. A zoom lens system as claimed in claim 1, wherein the fifth lens unit includes at least one positive lens element that fulfills the following conditional formulae:

$$0.7 < \Delta P5 < 6.0 \quad (11)$$

$$60 < \nu(5) < 100 \quad (12)$$

where
- $\Delta P5 = [\Theta - (0.6444 - 0.001689) \cdot \nu(5)] \times 100$;
- $\Theta = (ng - nF)/(nF - nC)$;
- ng represents a refractive index for a g-line (having a wavelength of 435.84 nm);
- nF represents a refractive index for an F-line (having a wavelength of 486.13 nm);
- nd represents a refractive index for a d-line (having a wavelength of 587.56 nm);
- nC represents a refractive index for a C-line (having a wavelength of 656.28 nm);
- $\nu(5)$ represents an Abbe number vd of the positive lens element included in the fifth lens unit; and
- $vd = (nd - 1)/(nF - nC)$.

9. A zoom lens system as claimed in claim 8, wherein the sixth lens unit is composed solely of positive lens elements, and fulfills the following conditional formula:

$$50 < \nu(6') < 100 \quad (13)$$

wherein
- $\nu(6')$ represents an average value of the Abbe numbers vd of the positive lens elements constituting the sixth lens unit.

10. A zoom lens system as claimed in claim 1, wherein the first lens unit includes at least one aspherical surface on a negative lens element.

11. A zoom lens system as claimed in claim 1, wherein the fourth lens unit includes at least one aspherical surface.

12. A zoom lens system comprising, from an enlargement side:

a first lens unit having a negative optical power;

a second lens unit having a positive optical power and disposed on an image side of the first lens unit with a first variable distance secured in between;

a third lens unit having a positive optical power and disposed on an image side of the second lens unit with a second variable distance secured in between;

a fourth lens unit having a negative optical power and disposed on an image side of the third lens unit with a third variable distance secured in between;

a fifth lens unit having a positive or negative optical power and disposed on an image side of the fourth lens unit with a fourth variable distance secured in between; and a sixth lens unit having a positive optical power and disposed on an image side of the fifth lens unit with a fifth variable distance secured between, wherein zooming is achieved by varying the first to fifth variable distances, wherein the third and fifth lens units move from the enlargement side to a reduction side during zooming from a telephoto end to a wide-angle end, wherein the zoom lens system is substantially telecentric toward the reduction side, and wherein the distance between the first and second lens units decreases during zooming from the telephoto end the wide-angle end.

13. A zoom lens system comprising, from an enlargement side:

a first lens unit having a negative optical power;

a second lens unit having a positive optical power and disposed on an image side of the first lens unit with a first variable distance secured in between;

a third lens unit having a positive optical power and disposed on an image side of the second lens unit with a second variable distance secured in between;

a fourth lens unit having a negative optical power and disposed on an image side of the third lens unit with a third variable distance secured in between;

a fifth lens unit having a positive or negative optical power and disposed on an image side of the fourth lens unit with a fourth variable distance secured in between; and a sixth lens unit having a positive optical power and disposed on an image side of the fifth lens unit with a fifth variable distance secured in between, wherein zooming is achieved by varying the first to fifth variable distances, wherein the third and fifth lens units move from the enlargement side to a reduction side during zooming from a telephoto end to a wide-angle end, wherein the zoom lens system is substantially telecentric toward the reduction side, and wherein the fifth lens unit includes at least one positive lens element that fulfills the following conditional formulae:

$$0.7 < \Delta P5 < 6.0 \qquad (11)$$

$$60 < \nu(5) < 100 \qquad (12)$$

where $$\Delta P5 = [\Theta - (0.6444 - 0.001689) \cdot \nu(5)] \times 100;$$

$$\Theta = (ng - nF)/(nF - nC);$$

ng represents a refractive index for a g-line (having a wavelength of 435.84 nm);

nF represents a refractive index for an F-line (having a wavelength of 486.13 nm);

nd represents a refractive index for a d-line (having a wavelength of 587.56 nm);

nC represents a refractive index for a C-line (having a wavelength of 656.28 nm);

$\nu(5)$ represents an Abbe number vd of the positive lens element included in the fifth lens unit; and $$\nu d = (nd-1)/(nF-nC).$$

14. A zoom lens system as claimed in claim 13, wherein the sixth lens unit is composed solely of positive lens elements, and fulfills the following conditional formula:

$$50 < \nu(6') < 100 \qquad (13)$$

wherein $\nu(6')$ represents an average value of the Abbe numbers vd of the positive lens elements constituting the sixth lens unit.

15. A zoom lens system comprising, from an enlargement side:

a first lens unit having a negative optical power;

a second lens unit having a positive optical power and disposed on an image side of the first lens unit with a first variable distance secured in between;

a third lens unit having a positive optical power and disposed on an image of the second lens unit with a second variable distance secured in between;

a fourth lens unit having a negative optical power and disposed on an image side of the third lens unit with a third variable distance secured in between;

a fifth lens unit having a positive or negative optical power and disposed on an image side of the fourth lens unit with a fourth variable distance secured in between; and a sixth lens unit having a positive optical power and disposed on an image side of the fifth lens unit with a fifth variable distance secured in between, wherein zooming is achieved by varying the first to fifth variable distances, wherein the third and fifth lens units move from the enlargement side to a reduction side during zooming from a telephoto end to a wide-angle end, wherein the zoom lens system is substantially telecentric toward the reduction side, and wherein the first lens unit includes at least one aspherical surface on a negative lens element.

16. A zoom lens system comprising,:

a first lens unit having a negative optical power;

a second lens unit having a positive optical power and disposed on an image side of the first lens unit with a first variable distance secured in between;

a third lens unit having a positive optical power and disposed on an image side of the second lens unit with a second variable distance secured in between;

a fourth lens unit having a negative optical power and disposed on an image side of the third lens unit with a third variable distance secured in between;

a fifth lens unit having a positive or negative optical power and disposed on an image side of the fourth lens unit with a fourth variable distance secured in between; and a sixth lens unit having a positive optical power and disposed on an image side of the fifth lens unit with a fifth variable distance secured in between, wherein zooming is achieved by varying the first to fifth variable distances, wherein the third and fifth lens units move from the enlargment side to a reduction side during zooming from a telephoto end to a wide-angle end, wherein the zoom lens system is substantially telecentric toward the reduction side, and wherein the fourth lens unit includes at least one aspherical surface.

17. A zoom lens system comprising, from an enlargement size: a first lens unit having a negative optical power;

a second lens unit having a positive optical power and disposed on an image side of the first lens unit with a first variable distance secured in between;

a third lens unit having a positive optical power and disposed on an image side of the second lens unit with a second variable distance secured in between;

a fourth lens unit having a negative optical power and disposed on an image side of the third lens unit with a third variable distance secured in between;

a fifth lens unit having a positive or negative optical power and disposed on an image side of the fourth lens unit with a fourth variable distance secured in between; and a sixth lens unit having a positive optical power and disposed on an image side of the fifth lens unit with a fifth variable distance secured in between, wherein zooming is achieved by varying the first to fifth variable distances, wherein the third and fifth lens units move from the enlaregment side to a reduction side during zooming from a telephoto end to a wide-angle end, wherein the zoom lens system is substantially telecentric toward the reduction side, and wherein a most enlargement-side lens element of the first lens unit has a negative optical power.

18. A zoom lens system as claimed in claim 17, wherein the most enlargment-side lens element of the first lens unit is a negative meniscus lens element convex to the enlargement side.

19. A zoom lens system as claimed in claim 17, further comprising an aperture stop, the aperture stop being disposed between the third and fourth lens units and being moved during zooming.

* * * * *

UNITED STATES PATENT AND TRADEMARK OFFICE
CERTIFICATE OF CORRECTION

PATENT NO. : 6,785,055 B2
APPLICATION NO. : 10/147016
DATED : November 9, 2004
INVENTOR(S) : Yasushi Tanijiri et al.

It is certified that error appears in the above-identified patent and that said Letters Patent is hereby corrected as shown below:

Column 5,
Line 15, delete "shortest-focal length" and add -- shortest-focal-length --.

Column 14,
Table 2, row 5, delete "$\omega$", insert -- $2\omega$ --.
Table 2, rows 8, 10, 12, 14, 15, 17, 20, 22, 23, 25, 27, 29, 31 and 33, delete "v", insert -- $\nu$ --.
Table 2, row 14, after "r7 =", delete "<", insert -- $\infty$ --.
Table 2, row 16, after "r9 =", delete "5.607", insert -- –45.607 --.
Table 2, row 18, after "r11 =", delete "161.152", insert -- –161.152 --.
Table 2, row 19, after "r12 =", delete "<(ST)", insert -- $\infty$ (ST) --.
Table 2, row 20, after "r13 =", delete "0.663", insert -- –40.663 --.
Table 2, row 25, after "r18 =", delete "<", insert -- $\infty$ --.
Table 2, row 28, after "r21 =", delete "103.351", insert -- –103, 351 --.
Table 2, rows 31, 32, 33 and 34, delete "$\propto$", insert -- $\infty$ --.

Column 15,
Table 3, rows 8, 10, 12, 14, 15, 17, 20, 22, 24, 25, 28, 30, 32 and 34, delete "v" and add -- $\nu$ --.
Table 3, row 10, after "r3 =", delete "111.8" and add -- 111.108 --.
Table 3, row 16, after "r9 =", delete "6.689" and add -- –46.689 --.
Table 3, row 18, after "r11 =", delete "190.385" and add -- 190.385 --.
Table 3, row 19, after "r12 =", delete "(ST)" and add -- $\infty$ (ST) --.
Table 3, row 20, after "d13 =", delete "1.590" and add -- 1.500 --.
Table 3, row 26, after "r19 =", delete "677.878" and add -- 2677.878 --.
Table 3, row 27, after "d20 =", delete "–9.200~4.400~0.500" and add -- 9.200~4.400~0.500 --.
Table 3, rows 32, 33, 34 and 35, delete "$\propto$" and add -- $\infty$ --.
Table 4, rows 8, 10, 12, 14, 16, 17, 19, 21, 23, 26, 28, 30, 32, 34 and 38, delete "v" and add -- $\nu$ --.
Table 4, row 16, after "r9 =", delete "6.699" and add -- – 46.699 --.
Table 4, row 20, after "r13 =", delete "560.030" and add -- –560.030 --.
Table 4, row 20, after "d13 =", delete "1.500~7.212~2.908" and add -- 11.500~7.212~2.908 --.
Table 4, row 22, after "r15 =", delete "20.52" and add -- 20.512 --.
Table 4, row 24, after "r17 =", delete "39.25" and add -- 39.251 --.
Table 4, row 25, after "r18 =", delete "(ST)" and add -- $\infty$ (ST) --.

UNITED STATES PATENT AND TRADEMARK OFFICE
CERTIFICATE OF CORRECTION

PATENT NO. : 6,785,055 B2
APPLICATION NO. : 10/147016
DATED : November 9, 2004
INVENTOR(S) : Yasushi Tanijiri et al.

It is certified that error appears in the above-identified patent and that said Letters Patent is hereby corrected as shown below:

Column 16,
Table 4, rows 34 and 38, delete "v", insert -- $v$ --.
Table 4, row 35, after "r28 =", delete "153.244", insert -- –153.244 --.
Table 4, rows 36, 37, 38 and 39, delete "∝" and add -- ∞ --.
Table 5, row 5, after "2ω", delete "–" and add -- = --.
Table 5, rows 8, 10, 12, 14, 16, 17, 19, 21, 23, 25, 28, 30 ,32, 34, 36, 38 and 40, delete "v" and add -- $v$ --.
Table 5, row 15, after "r8 =", delete "3.63" and add -- –63.631 --.
Table 5, row 20, after "r13 =", delete "545.560" and add -- –545.560 --.
Table 5, row 27, after "r20 =", delete "∝ (ST)" and add -- ∞ (ST) --.
Table 5, row 32, after "r25 =", delete "598.695" and add -- 1598.695 --.
Table 5, row 35, after "r28 =", delete "2.252" and add -- 62.252 --.
Table 5, row 37, after "r30 =", delete "319.917" and add -- 319.917 --.
Table 5, rows 38, 39, 40 and 41, delete "∝" and add -- ∞ --.
Table 6, rows 8, 10 and 12, delete "v" and add -- $v$ --.

Column 17,
Table 6, rows 14, 16, 17, 19, 21, 23, 26, 28, 30, 32, 34, 36, 38 and 40, delete "v" and add -- $v$ --.
Table 6, row 18, after "r11 =", delete "0.691" and add -- –40.691 --.
Table 6, row 18, after "d11 =", delete "2.000~.743~17.237" and add
-- 2.000~9.743~17.237 --.
Table 6, row 19, after "N7 =", delete "1.89500" and add -- 1.80500 --.
Table 6, row 20, after "r13 =", delete "1284.192" and add -- –1284.192 --.
Table 6, row 25, after "r18 =", delete "∝ (ST)" and add -- ∞ (ST) --.
Table 6, row 26, after "r19 =", delete "5.428" and add -- –45.428 --.
Table 6, row 32, after "r25 =", delete "459.385" and add -- –1459.385 --.
Table 6, row 33, after "r26 =", delete "1.960" and add -- –41.960 --.
Table 6, row 35, after "r28 =", delete "122.474" and add -- –122.474 --.
Table 6, row 37, after "r30 =", delete "241.963" and add -- –241.963 --.
Table 6, rows 38, 39, 40 and 41, delete "∝" and add -- ∞ --.
Table 7, rows 8, 10, 12, 13, 15, 18, 20, 21, 23, 25, 27, 29 and 31, delete "v" and add -- $v$ --.
Table 7, row 9, delete "r2" and add -- r2* --.
Table 7, row 9, after "d2 =", delete "2.700" and add -- 12.700 --.
Table 7, row 14, after "r7 =", delete "7.029" and add -- –47.029 --.
Table 7, row 14, after "d7 =", delete "0.700~3.056~4.39" and add -- 0.700~3.056~4.139 --.
Table 7, row 17, after "r10 =", delete "∝ (ST)" and add -- ∞ (ST) --.
Table 7, row 18, after "r11 =", delete "6.283" and add -- –46.283 --.
Table 7, row 28, after "r21 =", delete "56.840" and add -- –456.840 --.
Table 7, rows 29, 30, 31 and 32, delete "∝" and add -- ∞ --.
Table 7, row 34, after "A6 =", delete "0.30482 x $10^{-9}$" and add -- –0.30482 x $10^{-9}$ --.

UNITED STATES PATENT AND TRADEMARK OFFICE
CERTIFICATE OF CORRECTION

PATENT NO. : 6,785,055 B2
APPLICATION NO. : 10/147016
DATED : November 9, 2004
INVENTOR(S) : Yasushi Tanijiri et al.

It is certified that error appears in the above-identified patent and that said Letters Patent is hereby corrected as shown below:

Column 18,
Table 8, row 29, after "d11 =", delete "12.500~7.159~3.133" and add -- 12.500~7.159~3.133 --.

Column 25,
Table 16, row 3, delete "v5" and add -- $v5$ --.
Table 16, row 3, delete "v6" and add -- $v6'$ --.

Column 29,
Line 66, delete "vd" and add -- $vd$ --.

Column 30,
Line 45, after "comprising," add -- from an enlargement side --.

Column 31,
Line 9, delete "size" and add -- side --.

Column 32,
Line 7, delete "enlaregment" and add -- enlargement --.

Signed and Sealed this

Twenty-fifth Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 6,785,055 B2
APPLICATION NO. : 10/147016
DATED : August 31, 2004
INVENTOR(S) : Yasushi Tanijiri et al.

It is certified that error appears in the above-identified patent and that said Letters Patent is hereby corrected as shown below:

Column 5,
Line 15, delete "shortest-focal length" and add -- shortest-focal-length --.

Column 14,
Table 2, row 5, delete "ω", insert -- 2ω --.
Table 2, rows 8, 10, 12, 14, 15, 17, 20, 22, 23, 25, 27, 29, 31 and 33, delete "v", insert -- $v$ --.
Table 2, row 14, after "r7 =", delete "<", insert -- ∞ --.
Table 2, row 16, after "r9 =", delete "5.607", insert -- –45.607 --.
Table 2, row 18, after "r11 =", delete "161.152", insert -- –161.152 --.
Table 2, row 19, after "r12 =", delete "<(ST)", insert -- ∞ (ST) --.
Table 2, row 20, after "r13 =", delete "0.663", insert -- –40.663 --.
Table 2, row 25, after "r18 =", delete "<", insert -- ∞ --.
Table 2, row 28, after "r21 =", delete "103.351", insert -- –103, 351 --.
Table 2, rows 31, 32, 33 and 34, delete "∝", insert -- ∞ --.

Column 15,
Table 3, rows 8, 10, 12, 14, 15, 17, 20, 22, 24, 25, 28, 30, 32 and 34, delete "v" and add -- $v$ --.
Table 3, row 10, after "r3 =", delete "111.8" and add -- 111.108 --.
Table 3, row 16, after "r9 =", delete "6.689" and add -- –46.689 --.
Table 3, row 18, after "r11 =", delete "190.385" and add -- 190.385 --.
Table 3, row 19, after "r12 =", delete "(ST)" and add -- ∞ (ST) --.
Table 3, row 20, after "d13 =", delete "1.590" and add -- 1.500 --.
Table 3, row 26, after "r19 =", delete "677.878" and add -- 2677.878 --.
Table 3, row 27, after "d20 =", delete "–9.200~4.400~0.500" and add -- 9.200~4.400~0.500 --.
Table 3, rows 32, 33, 34 and 35, delete "∝" and add -- ∞ --.
Table 4, rows 8, 10, 12, 14, 16, 17, 19, 21, 23, 26, 28, 30, 32, 34 and 38, delete "v" and add -- $v$ --.
Table 4, row 16, after "r9 =", delete "6.699" and add -- – 46.699 --.
Table 4, row 20, after "r13 =", delete "560.030" and add -- –560.030 --.
Table 4, row 20, after "d13 =", delete "1.500~7.212~2.908" and add -- 11.500~7.212~2.908 --.
Table 4, row 22, after "r15 =", delete "20.52" and add -- 20.512 --.
Table 4, row 24, after "r17 =", delete "39.25" and add -- 39.251 --.
Table 4, row 25, after "r18 =", delete "(ST)" and add -- ∞ (ST) --.

UNITED STATES PATENT AND TRADEMARK OFFICE
CERTIFICATE OF CORRECTION

PATENT NO. : 6,785,055 B2
APPLICATION NO. : 10/147016
DATED : August 31, 2004
INVENTOR(S) : Yasushi Tanijiri et al.

It is certified that error appears in the above-identified patent and that said Letters Patent is hereby corrected as shown below:

Column 16,
Table 4, rows 34 and 38, delete "v", insert -- $v$ --.
Table 4, row 35, after "r28 =", delete "153.244", insert -- –153.244 --.
Table 4, rows 36, 37, 38 and 39, delete "∝" and add -- ∞ --.
Table 5, row 5, after "2ω", delete "–" and add -- = --.
Table 5, rows 8, 10, 12, 14, 16, 17, 19, 21, 23, 25, 28, 30, 32, 34, 36, 38 and 40, delete "v" and add -- $v$ --.
Table 5, row 15, after "r8 =", delete "3.63" and add -- –63.631 --.
Table 5, row 20, after "r13 =", delete "545.560" and add -- –545.560 --.
Table 5, row 27, after "r20 =", delete "∝ (ST)" and add -- ∞ (ST) --.
Table 5, row 32, after "r25 =", delete "598.695" and add -- 1598.695 --.
Table 5, row 35, after "r28 =", delete "2.252" and add -- 62.252 --.
Table 5, row 37, after "r30 =", delete "319.917" and add -- 319.917 --.
Table 5, rows 38, 39, 40 and 41, delete "∝" and add -- ∞ --.
Table 6, rows 8, 10 and 12, delete "v" and add -- $v$ --.

Column 17,
Table 6, rows 14, 16, 17, 19, 21, 23, 26, 28, 30, 32, 34, 36, 38 and 40, delete "v" and add -- $v$ --.
Table 6, row 18, after "r11 =", delete "0.691" and add -- –40.691 --.
Table 6, row 18, after "d11 =", delete "2.000~.743~17.237" and add
-- 2.000~9.743~17.237 --.
Table 6, row 19, after "N7 =", delete "1.89500" and add -- 1.80500 --.
Table 6, row 20, after "r13 =", delete "1284.192" and add -- –1284.192 --.
Table 6, row 25, after "r18 =", delete "∝ (ST)" and add -- ∞ (ST) --.
Table 6, row 26, after "r19 =", delete "5.428" and add -- –45.428 --.
Table 6, row 32, after "r25 =", delete "459.385" and add -- –1459.385 --.
Table 6, row 33, after "r26 =", delete "1.960" and add -- –41.960 --.
Table 6, row 35, after "r28 =", delete "122.474" and add -- –122.474 --.
Table 6, row 37, after "r30 =", delete "241.963" and add -- –241.963 --.
Table 6, rows 38, 39, 40 and 41, delete "∝" and add -- ∞ --.
Table 7, rows 8, 10, 12, 13, 15, 18, 20, 21, 23, 25, 27, 29 and 31, delete "v" and add -- $v$ --.
Table 7, row 9, delete "r2" and add -- r2* --.
Table 7, row 9, after "d2 =", delete "2.700" and add -- 12.700 --.
Table 7, row 14, after "r7 =", delete "7.029" and add -- –47.029 --.
Table 7, row 14, after "d7 =", delete "0.700~3.056~4.39" and add -- 0.700~3.056~4.139 --.
Table 7, row 17, after "r10 =", delete "∝ (ST)" and add -- ∞ (ST) --.
Table 7, row 18, after "r11 =", delete "6.283" and add -- –46.283 --.
Table 7, row 28, after "r21 =", delete "56.840" and add -- –456.840 --.
Table 7, rows 29, 30, 31 and 32, delete "∝" and add -- ∞ --.
Table 7, row 34, after "A6 =", delete "0.30482 x $10^{-9}$" and add -- –0.30482 x $10^{-9}$ --.

UNITED STATES PATENT AND TRADEMARK OFFICE
CERTIFICATE OF CORRECTION

PATENT NO. : 6,785,055 B2
APPLICATION NO. : 10/147016
DATED : August 31, 2004
INVENTOR(S) : Yasushi Tanijiri et al.

It is certified that error appears in the above-identified patent and that said Letters Patent is hereby corrected as shown below:

Column 18,
Table 8, row 29, after "d11 =", delete "12.500~7.159~3.133" and add -- 12.500~7.159~3.133 --.

Column 25,
Table 16, row 3, delete "v5" and add -- $v5$ --.
Table 16, row 3, delete "v6" and add -- $v6'$ --.

Column 29,
Line 66, delete "vd" and add -- $vd$ --.

Column 30,
Line 45, after "comprising," add -- from an enlargement side --.

Column 31,
Line 9, delete "size" and add -- side --.

Column 32,
Line 7, delete "enlaregment" and add -- enlargement --.

This certificate supersedes Certificate of Correction issued July 25, 2006.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,785,055 B2
APPLICATION NO. : 10/147016
DATED : August 31, 2004
INVENTOR(S) : Jun Nishikawa et al.

It is certified that error appears in the above-identified patent and that said Letters Patent is hereby corrected as shown below:

<u>Column 5,</u>
Line 15, delete "shortest-focal length" and add -- shortest-focal-length --.

<u>Column 14,</u>
Table 2, row 5, delete "ω", insert -- 2ω --.
Table 2, rows 8, 10, 12, 14, 15, 17, 20, 22, 23, 25, 27, 29, 31 and 33, delete "v", insert -- $\nu$ --.
Table 2, row 14, after "r7 =", delete "<", insert -- ∞ --.
Table 2, row 16, after "r9 =", delete "5.607", insert -- –45.607 --.
Table 2, row 18, after "r11 =", delete "161.152", insert -- –161.152 --.
Table 2, row 19, after "r12 =", delete "<(ST)", insert -- ∞ (ST) --.
Table 2, row 20, after "r13 =", delete "0.663", insert -- –40.663 --.
Table 2, row 25, after "r18 =", delete "<", insert -- ∞ --.
Table 2, row 28, after "r21 =", delete "103.351", insert -- –103, 351 --.
Table 2, rows 31, 32, 33 and 34, delete "∝", insert -- ∞ --.

<u>Column 15,</u>
Table 3, rows 8, 10, 12, 14, 15, 17, 20, 22, 24, 25, 28, 30, 32 and 34, delete "v" and add -- $\nu$ --.
Table 3, row 10, after "r3 =", delete "111.8" and add -- 111.108 --.
Table 3, row 16, after "r9 =", delete "6.689" and add -- –46.689 --.
Table 3, row 18, after "r11 =", delete "190.385" and add -- 190.385 --.
Table 3, row 19, after "r12 =", delete "(ST)" and add -- ∞ (ST) --.
Table 3, row 20, after "d13 =", delete "1.590" and add -- 1.500 --.
Table 3, row 26, after "r19 =", delete "677.878" and add -- 2677.878 --.
Table 3, row 27, after "d20 =", delete "–9.200~4.400~0.500" and add -- 9.200~4.400~0.500 --.
Table 3, rows 32, 33, 34 and 35, delete "∝" and add -- ∞ --.
Table 4, rows 8, 10, 12, 14, 16, 17, 19, 21, 23, 26, 28, 30, 32, 34 and 38, delete "v" and add -- $\nu$ --.
Table 4, row 16, after "r9 =", delete "6.699" and add -- – 46.699 --.
Table 4, row 20, after "r13 =", delete "560.030" and add -- –560.030 --.
Table 4, row 20, after "d13 =", delete "1.500~7.212~2.908" and add -- 11.500~7.212~2.908 --.
Table 4, row 22, after "r15 =", delete "20.52" and add -- 20.512 --.
Table 4, row 24, after "r17 =", delete "39.25" and add -- 39.251 --.
Table 4, row 25, after "r18 =", delete "(ST)" and add -- ∞ (ST) --.

UNITED STATES PATENT AND TRADEMARK OFFICE
CERTIFICATE OF CORRECTION

PATENT NO. : 6,785,055 B2
APPLICATION NO. : 10/147016
DATED : August 31, 2004
INVENTOR(S) : Jun Nishikawa et al.

It is certified that error appears in the above-identified patent and that said Letters Patent is hereby corrected as shown below:

Column 16,
Table 4, rows 34 and 38, delete "v", insert -- $v$ --.
Table 4, row 35, after "r28 =", delete "153.244", insert -- –153.244 --.
Table 4, rows 36, 37, 38 and 39, delete "∝" and add -- ∞ --.
Table 5, row 5, after "2ω", delete "–" and add -- = --.
Table 5, rows 8, 10, 12, 14, 16, 17, 19, 21, 23, 25, 28, 30 ,32, 34, 36, 38 and 40, delete "v" and add -- $v$ --.
Table 5, row 15, after "r8 =", delete "3.63" and add -- –63.631 --.
Table 5, row 20, after "r13 =", delete "545.560" and add -- –545.560 --.
Table 5, row 27, after "r20 =", delete "∝ (ST)" and add -- ∞ (ST) --.
Table 5, row 32, after "r25 =", delete "598.695" and add -- 1598.695 --.
Table 5, row 35, after "r28 =", delete "2.252" and add -- 62.252 --.
Table 5, row 37, after "r30 =", delete "319.917" and add -- 319.917 --.
Table 5, rows 38, 39, 40 and 41, delete "∝" and add -- ∞ --.
Table 6, rows 8, 10 and 12, delete "v" and add -- $v$ --.

Column 17,
Table 6, rows 14, 16, 17, 19, 21, 23, 26, 28, 30, 32, 34, 36, 38 and 40, delete "v" and add -- $v$ --.
Table 6, row 18, after "r11 =", delete "0.691" and add -- –40.691 --.
Table 6, row 18, after "d11 =", delete "2.000~.743~17.237" and add
-- 2.000~9.743~17.237 --.
Table 6, row 19, after "N7 =", delete "1.89500" and add -- 1.80500 --.
Table 6, row 20, after "r13 =", delete "1284.192" and add -- –1284.192 --.
Table 6, row 25, after "r18 =", delete "∝ (ST)" and add -- ∞ (ST) --.
Table 6, row 26, after "r19 =", delete "5.428" and add -- –45.428 --.
Table 6, row 32, after "r25 =", delete "459.385" and add -- –1459.385 --.
Table 6, row 33, after "r26 =", delete "1.960" and add -- –41.960 --.
Table 6, row 35, after "r28 =", delete "122.474" and add -- –122.474 --.
Table 6, row 37, after "r30 =", delete "241.963" and add -- –241.963 --.
Table 6, rows 38, 39, 40 and 41, delete "∝" and add -- ∞ --.
Table 7, rows 8, 10, 12, 13, 15, 18, 20, 21, 23, 25, 27, 29 and 31, delete "v" and add -- $v$ --.
Table 7, row 9, delete "r2" and add -- r2* --.
Table 7, row 9, after "d2 =", delete "2.700" and add -- 12.700 --.
Table 7, row 14, after "r7 =", delete "7.029" and add -- –47.029 --.
Table 7, row 14, after "d7 =", delete "0.700~3.056~4.39" and add -- 0.700~3.056~4.139 --.
Table 7, row 17, after "r10 =", delete "∝ (ST)" and add -- ∞ (ST) --.
Table 7, row 18, after "r11 =", delete "6.283" and add -- –46.283 --.
Table 7, row 28, after "r21 =", delete "56.840" and add -- –456.840 --.
Table 7, rows 29, 30, 31 and 32, delete "∝" and add -- ∞ --.
Table 7, row 34, after "A6 =", delete "0.30482 x $10^{-9}$" and add -- –0.30482 x $10^{-9}$ --.

UNITED STATES PATENT AND TRADEMARK OFFICE
CERTIFICATE OF CORRECTION

PATENT NO. : 6,785,055 B2
APPLICATION NO. : 10/147016
DATED : August 31, 2004
INVENTOR(S) : Jun Nishikawa et al.

It is certified that error appears in the above-identified patent and that said Letters Patent is hereby corrected as shown below:

Column 18,
Table 8, row 29, after "d11 =", delete "12.500~7.159~3.133" and add -- 12.500~7.159~3.133 --.

Column 25,
Table 16, row 3, delete "v5" and add -- $v5$ --.
Table 16, row 3, delete "v6" and add -- $v6'$ --.

Column 29,
Line 66, delete "vd" and add -- $vd$ --.

Column 30,
Line 45, after "comprising," add -- from an enlargement side --.

Column 31,
Line 9, delete "size" and add -- side --.

Column 32,
Line 7, delete "enlaregment" and add -- enlargement --.

This certificate supersedes Certificate of Correction issued July 25, 2006 and August 22, 2006.

Signed and Sealed this

Twenty-eighth Day of November, 2006

JON W. DUDAS
*Director of the United States Patent and Trademark Office*